(12) United States Patent
Tu et al.

(10) Patent No.: US 12,314,007 B2
(45) Date of Patent: May 27, 2025

(54) SYSTEM AND METHOD FOR FABRICATING LIQUID CRYSTAL POLARIZATION HOLOGRAMS

(71) Applicant: Meta Platforms Technologies, LLC, Menlo Park, CA (US)

(72) Inventors: Xingzhou Tu, Redmond, WA (US); Yun-Han Lee, Redmond, WA (US); Mengfei Wang, Kirkland, WA (US); Stephen Choi, Seattle, WA (US); Lu Lu, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 1094 days.

(21) Appl. No.: 17/217,249

(22) Filed: Mar. 30, 2021

(65) Prior Publication Data
US 2022/0317624 A1    Oct. 6, 2022

(51) Int. Cl.
*G03H 1/04*    (2006.01)
*G02B 5/18*    (2006.01)
*G02F 1/1337*    (2006.01)
*G03H 1/02*    (2006.01)

(52) U.S. Cl.
CPC .......... *G03H 1/041* (2013.01); *G02B 5/1833* (2013.01); *G02F 1/1337* (2013.01); *G03H 2001/0216* (2013.01); *G03H 2001/0441* (2013.01)

(58) Field of Classification Search
CPC ............ G03H 1/02; G03H 1/04; G03H 1/041; G03H 1/0402; G03H 1/0276; G03H 2001/0441; G03H 2222/40–45; G03H 2223/20; G03H 2223/22; G03H 2225/36; G03H 2225/52; G03H 2227/05; G02F 1/1337; G02B 5/18; G02B 5/30; G02B 5/1833; G02B 5/3016
USPC ........................................................ 359/15
See application file for complete search history.

(56) References Cited

U.S. PATENT DOCUMENTS

| | | | |
|---|---|---|---|
| 7,589,876 B2 * | 9/2009 | Tsukagoshi | G11B 7/1362 359/24 |
| 10,197,715 B1 * | 2/2019 | Tabirian | B29D 11/00432 |
| 2008/0088898 A1 * | 4/2008 | Szarvas | G03H 1/0402 359/24 |
| 2008/0278675 A1 * | 11/2008 | Escuti | G02B 27/283 359/485.02 |

(Continued)

OTHER PUBLICATIONS

Hsu et al (Prism-hologram-prism sandwiched recording method for polarization-selective substrate-mode volume holograms with a large diffraction angle, Optics Express, vol. 26, No. 16, Aug. 6, 2018, pp. 20534-20542) (Year: 2018).*

(Continued)

*Primary Examiner* — Jyotsna V Dabbi
(74) *Attorney, Agent, or Firm* — Greenberg Traurig, LLP

(57) ABSTRACT

A system includes a light outputting element configured to output a first beam propagating toward a beam interference zone from a first side of the beam interference zone. The system also includes a reflective assembly configured to reflect the first beam back as a second beam propagating toward the beam interference zone from a second side of the beam interference zone. The first beam and the second beam interfere with one another within the beam interference zone to generate a polarization interference pattern.

13 Claims, 26 Drawing Sheets

(56) References Cited

U.S. PATENT DOCUMENTS

2009/0262408 A1\* 10/2009 Ogasawara .......... G11B 7/0065
                                                                            359/30
2011/0134497 A1\* 6/2011 Horimai .................. G03H 1/30
                                                                            359/30
2019/0317450 A1 10/2019 Yaroshchuk et al.

OTHER PUBLICATIONS

Sheridon, N.K., "Production of Blazed Holograms," Applied Physics Letters, vol. 12, No. 9, 1968, pp. 316-318 (3 pages).
International Preliminary Report on Patentability for International Application No. PCT/US2022/022081, mailed Oct. 12, 2023, 8 pages.
International Search report and Written Opinion for International Application No. PCT/US2022/022081, mailed Jul. 13, 2022, 9 pages.
Xiong J., et al., "A Scanning Waveguide AR Display with 100° Fov," Algorithms and Technologies Formultispectral, Hyperspectral, and Ultraspectral Imagery XIX—Proceedings of Spie, vol. 11765, Mar. 28, 2021, 6 pages.

\* cited by examiner

1200

Directing a first beam to propagate through a beam interference zone toward a reflective assembly, wherein the first beam propagates toward the beam interference zone from a first side of the beam interference zone — 1210

Reflecting, by the reflective assembly, the first beam back toward the beam interference zone as a second beam propagating toward the beam interference zone from a second side of the beam interference zone, and wherein the first beam and the second beam interfere with one another within the beam interference zone to generate a polarization interference pattern — 1220

FIG. 12

SYSTEM AND METHOD FOR FABRICATING LIQUID CRYSTAL POLARIZATION HOLOGRAMS

TECHNICAL FIELD

The present disclosure generally relates to systems and methods and, more specifically, to a system and a method for fabricating liquid crystal polarization holograms.

BACKGROUND

Liquid crystal polarization holograms ("LCPHs") refer to the intersection of liquid crystal devices and polarization holograms. Liquid crystal displays ("LCDs"), having grown to a trillion dollar industry over the past decades, are the most successful example of liquid crystal devices. The LCD industry has made tremendous investments to scale manufacturing, from the low end G2.5 manufacturing line to the high end G10.5+ to meet the market demands for displays. However, the LCD industry has recently faced competition from Organic Light Emitting Diodes ("OLED"), e-paper and other emerging display technologies, that has flattened the growth rate of LCD industry and has rendered significant early generation capacity redundant. This provides an opportunity to repurpose the LCD idle capacity and existing supply chain to manufacture novel LC optical devices characterized by their polarization holograms.

LCPHs have features such as small thickness (~1 μm), light weight, compactness, high efficiency, etc. Thus, LCPHs have gained increasing interests in optical device and system applications, e.g., near-eye displays ("NEDs"), head-up displays ("HUDs"), head-mounted displays ("HMDs"), smart phones, laptops, or televisions, etc. For example, LCPHs may be used for addressing accommodation-vergence conflict, enabling thin and highly efficient eye-tracking and depth sensing in space constrained optical systems, developing optical combiners for image formation, correcting chromatic aberrations for image resolution enhancement of refractive optical elements in compact optical systems, and improving the efficiency and reducing the size of optical systems.

SUMMARY OF THE DISCLOSURE

Consistent with a disclosed embodiment of the present disclosure, a system is provided. The system includes a light outputting element configured to output a first beam propagating toward a beam interference zone from a first side of the beam interference zone. The system also includes a reflective assembly configured to reflect the first beam back as a second beam propagating toward the beam interference zone from a second side of the beam interference zone. The first beam and the second beam interfere with one another within the beam interference zone to generate a polarization interference pattern.

Consistent with another aspect of the present disclosure, a method is provided. The method includes directing a first beam to propagate through a beam interference zone toward a reflective assembly. The first beam propagates toward the beam interference zone from a first side of the beam interference zone. The method also includes reflecting, by the reflective assembly, the first beam back toward the beam interference zone as a second beam. The second beam propagates toward the beam interference zone from a second side of the beam interference zone. The first beam and the second beam interfere with one another within the beam interference zone to generate a polarization interference pattern.

Other aspects of the present disclosure can be understood by those skilled in the art in light of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings:

FIG. 12 illustrates a flowchart showing a method for fabricating an LCPH element, according to an embodiment of the present disclosure.

DETAILED DESCRIPTION

Figure 1A:
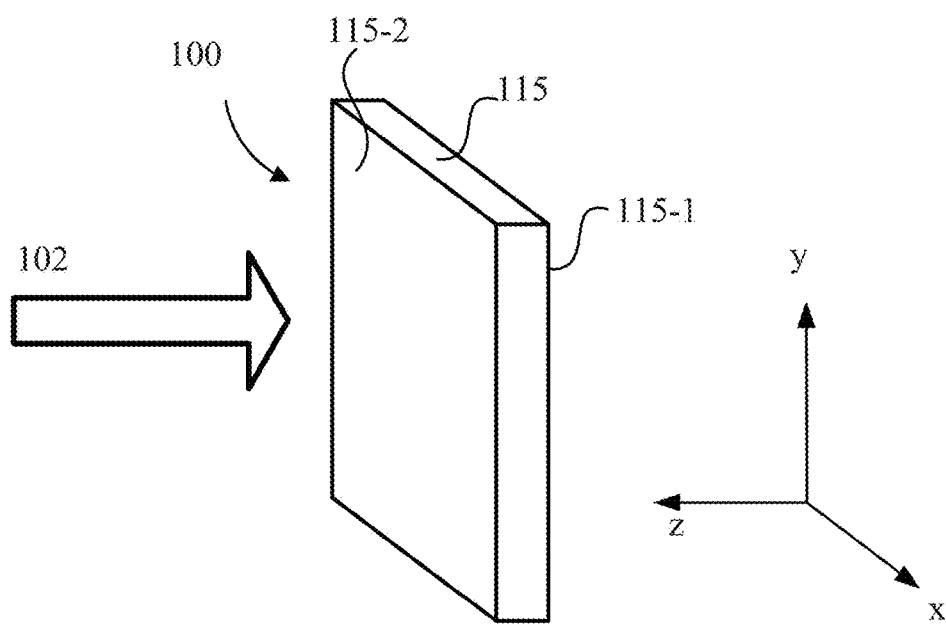
FIG. 1A schematically illustrates a three-dimensional ("3D") view of a liquid crystal polarization hologram ("LCPH") element, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable.

The phrases "in-plane direction," "in-plane orientation," "in-plane rotation," "in-plane alignment pattern," and "in-plane pitch" refer to a direction, an orientation, a rotation, an alignment pattern, and a pitch in a plane of a film or a layer (e.g., a surface plane of the film or layer, or a plane parallel to the surface plane of the film or layer), respectively. The term "out-of-plane direction" or "out-of-plane orientation" indicates a direction or orientation that is non-parallel to the plane of the film or layer (e.g., perpendicular to the surface plane of the film or layer, e.g., perpendicular to a plane parallel to the surface plane). For example, when an "in-plane" direction or orientation refers to a direction or orientation within a surface plane, an "out-of-plane" direction or orientation may refer to a thickness direction or orientation perpendicular to the surface plane, or a direction or orientation that is not parallel with the surface plane.

The term "orthogonal" as used in "orthogonal polarizations" or the term "orthogonally" as used in "orthogonally polarized" means that an inner product of two vectors representing the two polarizations is substantially zero. For example, two lights or beams with orthogonal polarizations (or two orthogonally polarized lights or beams) may be two linearly polarized lights (or beams) with two orthogonal polarization directions (e.g., an x-axis direction and a y-axis direction in a Cartesian coordinate system) or two circularly polarized lights with opposite handednesses (e.g., a left-handed circularly polarized light and a right-handed circularly polarized light).

In the present disclosure, an angle of a beam (e.g., a diffraction angle of a diffracted beam or an incidence angle of an incident beam) with respect to a normal of a surface can be defined as a positive angle or a negative angle, depending on the angular relationship between a propagating direction of the beam and the normal of the surface. For example, when the propagating direction of the beam is clockwise (or counter-clockwise) from the normal, the angle of the propagating direction may be defined as a positive angle, and when the propagating direction of the beam is counter-clockwise (or clockwise) from the normal, the angle of the propagating direction may be defined as a negative angle.

The fabrication process of liquid crystal polarization holograms ("LCPHs") may involve cleaning a substrate, coating a photo-alignment material ("PAM") on the substrate, patterning the PAM, coating reactive mesogens ("RMs") on the patterned PAM, polymerizing the RMs, and checking the quality of the fabricated LCPHs. Compared to the existing fabrication process of passive matrix LCDs, the major change in the fabrication process of LCPHs is the PAM patterning process, which may be a significant process in the LCPH manufacturing. The PAM may be patterned using various methods, e.g., direct duplication or projection duplication involving polarization interference or holography, laser direct writing, and various other forms of lithography. In direct duplication, an exposure area of the PAM may be reduced as the gap between a mask and the PAM increases. A sample pitch (that is a pitch of a pattern recorded on the PAM) may be fixed unless the mask is changed. In projection duplication, when the mask is fixed, due to the etendue limit, the exposure area of the PAM may be reduced as a desirable sample pitch increases. The design difficulty may increase as a mask pitch (that is, the pitch of the pattern in the mask) decreases. The sample pitch may be fixed unless the lens system used in the fabrication is reconfigured. In addition, both direct duplication and projection duplication may involve two-beam interference, in which a beam is divided into two beams for generating a polarization interference. A two-beam interferometer may occupy a large space in the fabrication system, and may need a fringe stabilization system for quality control. In addition, the energy of the two beams transmitted through the PAM may be wasted.

In view of the limitations in the conventional technologies, the present disclosure provides simple, compact, efficient, and cost-effective systems and methods for fabricating LCPH elements. The system may include a light outputting element configured to output a first beam propagating toward a beam interference zone from a first side of the beam interference zone. The system may also include a reflective assembly configured to reflect the first beam back as a second beam propagating toward the beam interference zone from a second side of the beam interference zone. The first beam and the second beam may interfere with one another within the beam interference zone to generate a polarization interference pattern. A first wavefront of the first beam may substantially match with a second wavefront of the second beam. The first beam and the second beam may be polarized beams having the same handedness. In some embodiments, the reflective assembly may include a reflector. In some embodiments, the reflective assembly may also include a waveplate. In some embodiments, the system may also include a lens assembly disposed between the light outputting element and the reflective assembly. In some embodiments, the lens assembly may include a lens and a substrate, the substrate is configured to support a recording medium layer disposed within the beam interference zone for recording the polarization interference pattern, and the lens is disposed between the substrate and the light outputting element. In some embodiments, the lens assembly may include a first lens and a second lens, the second lens may be configured to support a recording medium layer disposed within the beam interference zone for recording the polarization interference pattern, and the first lens may be disposed between the second lens and the light outputting element. In some embodiments, the lens assembly may include a lens configured to support a recording medium layer for recording the polarization interference pattern. In some embodiments, the lens assembly may be a converging lens assembly, and the reflective assembly may include a reflector having a flat reflective surface. In some embodiments, the reflector may be disposed at or adjacent to a focal plane of the lens assembly. In some embodiments, the lens assembly may be a diverging lens assembly, and the reflective assembly may include a reflector having a curved reflective surface. In some embodiments, the lens assembly may include a first spatial light modulator ("SLM"), and the reflective assembly may include a second SLM. The first SLM may be a transmissive SLM, and the second SLM may be a reflective SLM. Such a system may be also referred to as a single-beam interferometer as the second beam is a reflected beam of the first beam.

The method may include directing a first beam to propagate through a beam interference zone toward a reflective assembly, wherein the first beam propagates toward the beam interference zone from a first side of the beam interference zone. The method may also include reflecting, by the reflective assembly, the first beam back toward the beam interference zone as a second beam. The second beam may propagate toward the beam interference zone from a second side of the beam interference zone. The first beam and the second beam may interfere with one another within the beam interference zone to generate a polarization interference pattern. A first wavefront of the first beam may substantially match with a second wavefront of the second beam. The first beam and the second beam may be polarized beams having the same handedness. In some embodiments, the method may also include directing the first beam to propagate through a lens assembly toward the reflective assembly. In some embodiments, the method may also include exposing a recording medium layer disposed within the beam interference zone to the polarization interference pattern to record the polarization interference pattern. In some embodiments, the recording medium layer may include a surface photo-alignment material, and the method may also include forming a birefringent medium layer on the recording medium layer after polarization interference pattern is recorded in the recording medium layer. In some embodiments, the recording medium layer may include a bulk photo-alignment material, and exposing the recording medium layer disposed within the beam interference zone to the polarization interference pattern may include recording the polarization interference pattern in the bulk photo-alignment material.

Compared to conventional technologies, the complexity of the disclosed system and method may be significantly reduced. The build space and build cost for the disclosed system may be significantly reduced. With the disclosed system and method, LCPH elements with different sample pitches and/or different patterns may be fabricated with limited reconfiguration of the system. The disclosed system may include fewer optical elements than the conventional two-beam interferometer and, thus, may be less sensitive to external vibrations. In addition, through recycling the reflected beam, the exposing efficiency may be increased, e.g., doubled. Polarization hologram elements based on birefringent photo-refractive holographic materials other than liquid crystals ("LCs") may also be fabricated using the disclosed system and method.

Figure 1B:
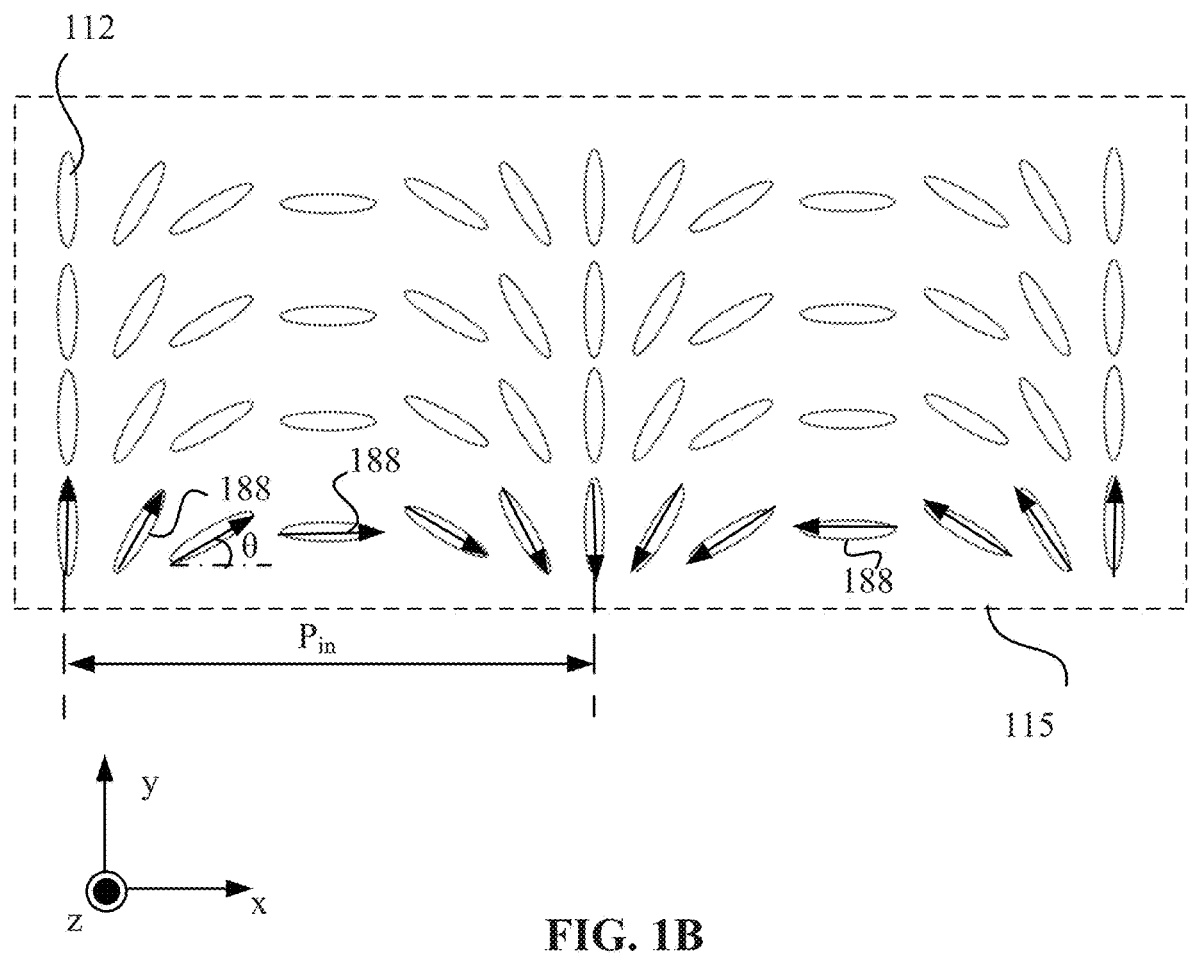
FIGS. 1B-1D schematically illustrate various views of a portion of the LCPH element shown in FIG. 1A, showing in-plane orientations of optically anisotropic molecules in the LCPH element, according to various embodiments of the present disclosure.
Figure 1C:
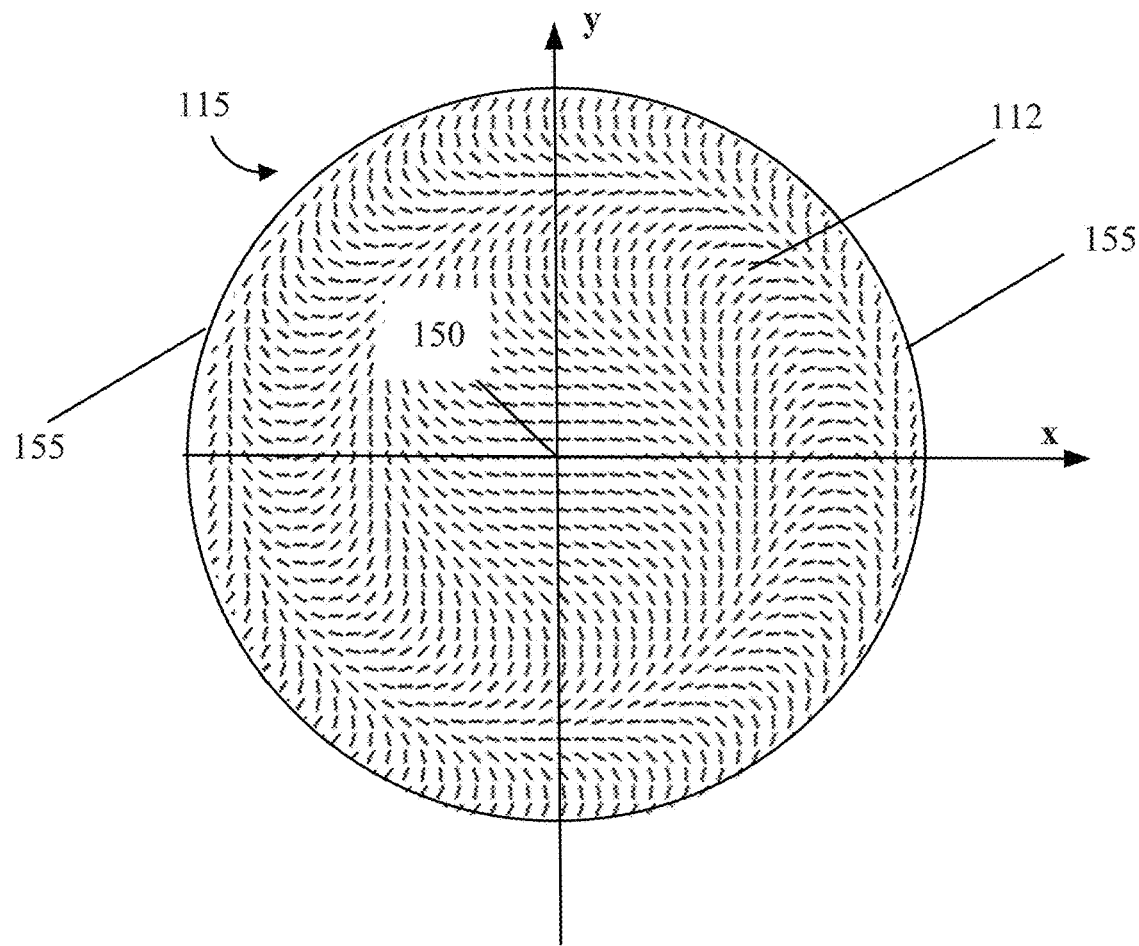
Figure 1D:
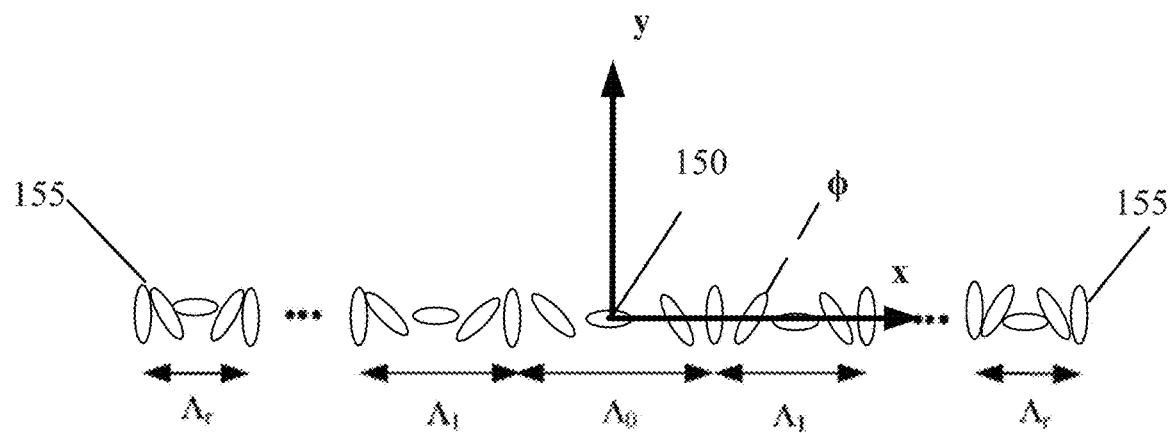

FIG. 1A illustrates a schematic three-dimensional ("3D") view of a liquid crystal polarization hologram ("LCPH") element 100 with a light 102 incident onto the LCPH element 100 along a –z-axis, according to an embodiment of the present disclosure. FIGS. 1B-1D schematically illustrate various views of a portion of the LCPH element 100 shown in FIG. 1A, showing in-plane orientations of optically anisotropic molecules in the LCPH element 100, according to various embodiments of the present disclosure. FIGS. 1E-1H schematically illustrate various views of a portion of the LCPH element 100 shown in FIG. 1A, showing out-of-plane orientations of optically anisotropic molecules in the LCPH element 100, according to various embodiments of the present disclosure. The disclosed system and method may be used to fabricate various LCPH elements including optically anisotropic molecules configured with different in-plane orientations and out-of-plane orientations. The LCPH element 100 including optically anisotropic molecules configured with the in-plane orientations shown in FIG. 1B or FIG. 1D and the out-of-plane orientations shown in FIG. 1E, FIG. 1F, FIG. 1G, or FIG. 1H is used as an example LCPH element that may be fabricated based on the disclosed system and method.

As shown in FIG. 1A, although the LCPH element 100 is shown as a rectangular plate shape for illustrative purposes, the LCPH element 100 may have any suitable shape, such as a circular shape. In some embodiments, one or both surfaces along the light propagating path of the light 102 may have curved shapes. In some embodiments, the LCPH element 100 may be fabricated based on a birefringent medium, e.g., liquid crystal ("LC") materials, which may have an intrinsic orientational order of optically anisotropic molecules that may be locally controlled during the fabrication process. In some embodiments, the LCPH element 100 may be fabricated based on a photosensitive polymer, such as an amorphous polymer, an LC polymer, etc., which may generate an induced (e.g., photo-induced) optical anisotropy and/or an induced (e.g., photo-induced) optic axis orientation.

In some embodiments, the LCPH element 100 may include a birefringent medium (e.g., an LC material) in a form of a layer, which may be referred to as a birefringent medium layer (e.g., an LC layer) 115. The birefringent medium layer 115 may have a first surface 115-1 on one side and a second surface 115-2 on an opposite side. The first surface 115-1 and the second surface 115-2 may be surfaces along the light propagating path of the incident light 102. The birefringent medium layer 115 may include optically anisotropic molecules (e.g., LC molecules) configured with a three-dimensional ("3D") orientational pattern to provide a polarization selective optical response. In some embodiments, an optic axis of the LC material may be configured with a spatially varying orientation in at least one in-plane direction. For example, the optic axis of the LC material may periodically or non-periodically vary in at least one in-plane linear direction, in at least one in-plane radial direction, in at least one in-plane circumferential (e.g., azimuthal) direction, or a combination thereof. The LC molecules may be configured with an in-plane orientation pattern, in which the directors of the LC molecules may periodically or non-periodically vary in the at least one in-plane direction. In some embodiments, the optic axis of the LC material may also be configured with a spatially varying orientation in an out-of-plane direction. The directors of the LC molecules may also be configured with spatially varying orientations in an out-of-plane direction. For example, the optic axis of the LC material (or directors of the LC molecules) may twist in a helical fashion in the out-of-plane direction.

FIGS. 1B-1D schematically illustrate x-y sectional views of a portion of the LCPH element 100 shown in FIG. 1A, showing in-plane orientations of the optically anisotropic molecules 112 in the LCPH element 100, according to various embodiments of the present disclosure. For discussion purposes, rod-like LC molecules 112 are used as examples of the optically anisotropic molecules 112 of the birefringent medium layer 115. The rod-like LC molecule 112 may have a longitudinal direction (or a length direction) and a lateral direction (or a width direction). The longitudinal direction of the LC molecule 112 may be referred to as a director of the LC molecule 112 or an LC director. An orientation of the LC director may determine a local optic axis orientation or an orientation of the optic axis at a local point of the birefringent medium layer 115. The term "optic axis" may refer to a direction in a crystal. A light propagating in the optic axis direction may not experience birefringence (or double refraction). An optic axis may be a direction rather than a single line: lights that are parallel to that direction may experience no birefringence. The local optic axis may refer to an optic axis within a predetermined region of a crystal. For illustrative purposes, the LC directors of the LC molecules 112 shown in FIGS. 1B-1D are presumed to be in the surface of the birefringent medium layer 115 or in a plane parallel with the surface with substantially small tilt angles with respect to the surface.

FIG. 1B schematically illustrate an x-y sectional view of a portion of the LCPH element 100, showing a periodic in-plane orientation pattern of the orientations of the LC directors (indicated by arrows 188 in FIG. 1B) of the LC molecules 112 located in close proximity to or at a surface (e.g., at least one of the first surface 115-1 or the second surface 115-2) of the birefringent medium layer 115. The orientations of the LC directors located in close proximity to or at the surface (at least one of the first surface 115-1 or the second surface 115-2) of the birefringent medium layer 115 may exhibit a periodic rotation in at least one in-plane direction (e.g., an x-axis direction). The periodically varying in-plane orientations of the LC directors form a pattern. The in-plane orientation pattern of the LC directors shown in FIG. 1B may also be referred to as a grating pattern. Accordingly, the LCPH 100 may function as a polarization selective grating.

As shown in FIG. 1B, the LC molecules 112 located in close proximity to or at a surface (e.g., at least one of the first surface 115-1 or the second surface 115-2) of the birefringent medium layer 115 may be configured with orientations of LC directors continuously changing (e.g., rotating) in a predetermined direction (e.g., an x-axis direction) along the surface (or in a plane parallel with the surface). The continuous rotation of orientations of the LC directors may form a periodic rotation pattern with a uniform (e.g., same) in-plane pitch $P_{in}$. The predetermined direction may be any suitable direction along the surface (or in a plane parallel with the surface) of the birefringent medium layer 115. For illustrative purposes, FIG. 1B shows that the predetermined direction is the x-axis direction. The predetermined direction may be referred to as an in-plane direction, the pitch $P_{in}$ along the in-plane direction may be referred to as an in-plane pitch or a horizontal pitch. The pattern with the uniform (or same) in-plane pitch $P_{in}$ may be referred to as a periodic LC director in-plane orientation pattern. The in-plane pitch $P_{in}$ is defined as a distance along the in-plane direction (e.g., the x-axis direction) over which the orientations of the LC directors exhibit a rotation by a predetermined value (e.g., 180°). In other words, in a region substantially close to (including at) the surface of the birefringent medium layer 115, local optic axis orientations of the birefringent medium layer 115 may vary periodically in the in-plane direction (e.g., the x-axis direction) with a pattern having the uniform (or same) in-plane pitch $P_{in}$.

In addition, at the surface (e.g., at least one of the first surface 115-1 or the second surface 115-2) of the birefringent medium layer 115, the orientations of the directors of the LC molecules 112 may exhibit a rotation in a predetermined rotation direction, e.g., a clockwise direction or a counter-clockwise direction. Accordingly, the rotation of the orientations of the directors of the LC molecules 112 at the surface of the birefringent medium layer 115 may exhibit a handedness, e.g., right handedness or left handedness. In the embodiment shown in FIG. 1B, at the surface (e.g., at least one of the first surface 115-1 or the second surface 115-2) of the birefringent medium layer 115, the orientations of the directors of the LC molecules 112 may exhibit a rotation in a clockwise direction. Accordingly, the rotation of the orientations of the directors of the LC molecules 112 at the surface of the birefringent medium layer 115 may exhibit a left handedness.

Although not shown, in some embodiments, at the surface (e.g., at least one of the first surface 115-1 or the second surface 115-2) of the birefringent medium layer 115, the orientations of the directors of the LC molecules 112 may exhibit a rotation in a counter-clockwise direction. Accordingly, the rotation of the orientations of the directors of the LC molecules 112 at the surface of the birefringent medium layer 115 may exhibit a right handedness. Although not shown, in some embodiments, at the surface (e.g., at least one of the first surface 115-1 or the second surface 115-2) of the birefringent medium layer 115, domains in which the orientations of the directors of the LC molecules 112 exhibit a rotation in a clockwise direction (referred to as domains DL) and domains in which the orientations of the directors of the LC molecules 112 exhibit a rotation in a counter-clockwise direction (referred to as domains DR) may be alternatingly arranged in at least one in-plane direction, e.g., in x-axis and y-axis directions.

FIG. 1C schematically illustrate an x-y sectional view of a portion of the LCPH element 100, showing a radially varying in-plane orientation pattern of the orientations of the LC directors of the LC molecules 112 located in close proximity to or at a surface (e.g., at least one of the first surface 115-1 or the second surface 115-2) of the birefringent medium layer 115 shown in FIG. 1A. FIG. 1D illustrates a section of the in-plane orientation pattern taken along an x-axis in the birefringent medium layer 115 shown in FIG. 1C, according to an embodiment of the present disclosure. In a region substantially close to (including at) a surface (e.g., at least one of the first surface 115-1 or the second surface 115-2) of the birefringent medium layer 115, the orientations of the optic axis of the birefringent medium layer 115 may exhibit a continuous rotation in at least two opposite in-plane directions from a center of the birefringent medium layer 115 to opposite peripheries of the birefringent medium layer 115 with a varying pitch. In some embodiments, the in-plane orientation pattern of the orientations of the LC directors shown in FIG. 1C may also be referred to as a lens pattern. Accordingly, the LCPH element 100 with the LC director orientations shown in FIG. 1C may function as a polarization selective lens, e.g., a Pancharatnam-Berry phase ("PBP") lens, a polarization volume hologram ("PVH") lens, etc.

As shown in FIG. 1C, the orientations of the LC molecules 112 located in close proximity to or at a surface (e.g., at least one of the first surface 115-1 or the second surface 115-2) of the birefringent medium layer 115 may be configured with an in-plane orientation pattern having a varying pitch in at least two opposite in-plane directions from a lens center 150 to opposite lens peripheries 155. For example, the orientations of the LC directors of LC molecules 112 located in close proximity to or at the surface of the birefringent medium layer 115 may exhibit a continuous rotation in at least two opposite in-plane directions from the lens center 150 to the opposite lens peripheries 155 with a varying pitch. The orientations of the LC directors may exhibit a rotation in a same rotation direction (e.g., clockwise, or counter-clockwise) from the lens center 150 to the opposite lens peripheries 155. A pitch Λ of the in-plane orientation pattern may be defined as a distance in the in-plane direction (e.g., a radial direction) over which the orientations of the LC directors (or azimuthal angles φ of the LC molecules 112)

change by a predetermined angle (e.g., 180°) from a predetermined initial state. As shown in FIG. 1D, according to the LC director field along the x-axis direction, the pitch Λ may be a function of the distance from the lens center 150. The pitch Λ may monotonically decrease from the lens center 150 to the lens peripheries 155 in the at least two opposite in-plane directions (e.g., two opposite radial directions) in the x-y plane, e.g., $\Lambda_0 > \Lambda_1 > \ldots > \Lambda_r$. $\Lambda_0$ is the pitch at a central region of the lens pattern, which may be the largest. The pitch $\Lambda_r$ is the pitch at a periphery region (e.g., periphery 155) of the lens pattern, which may be the smallest. In some embodiments, the azimuthal angle φ of the LC molecule 112 may change in proportional to the distance from the lens center 150 to a local point of the birefringent medium layer 115 at which the LC molecule 112 is located.

Figure 1E:
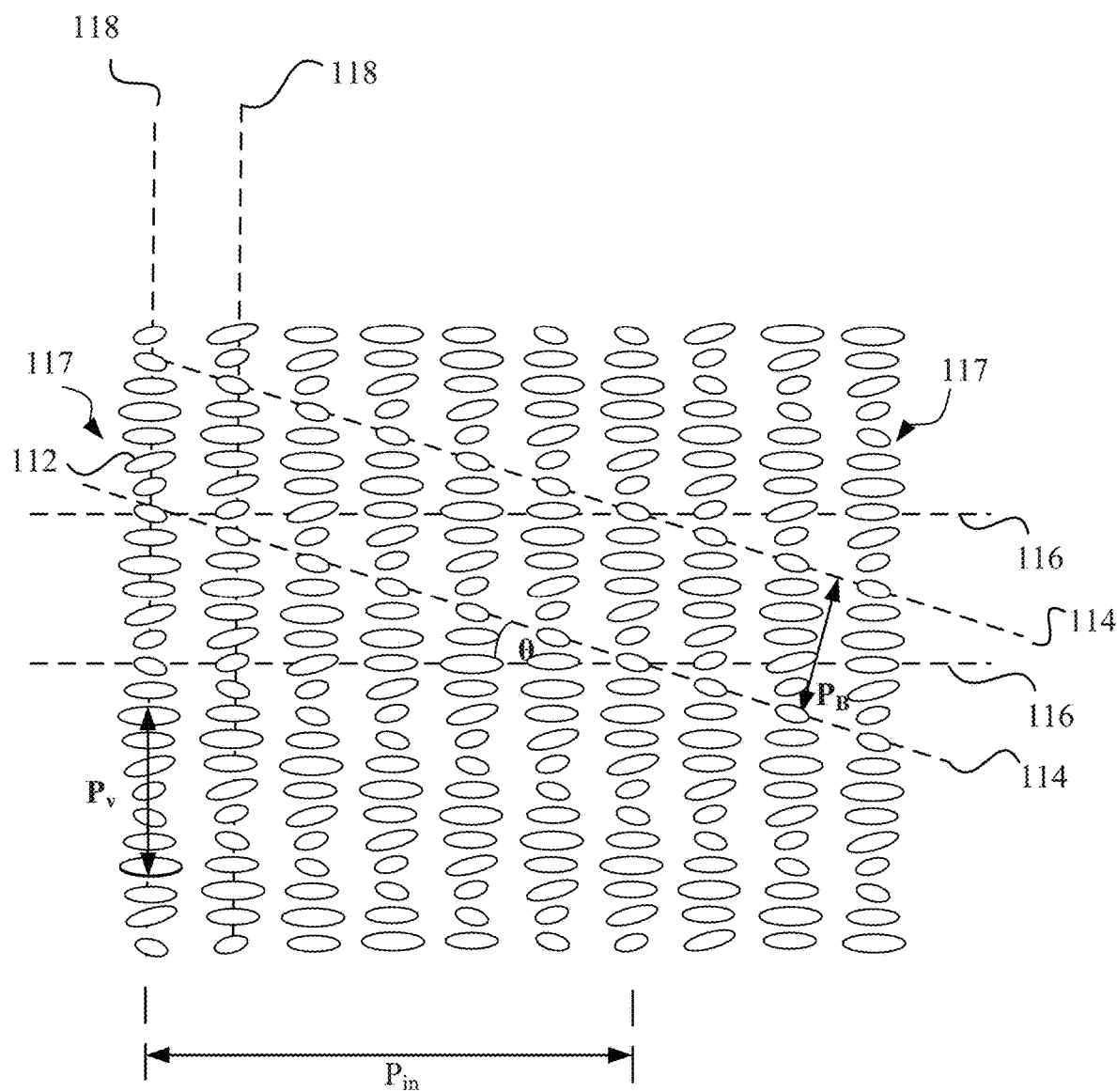
FIGS. 1E-1H schematically illustrate various views of a portion of the LCPH element shown in FIG. 1A, showing out-of-plane orientations of optically anisotropic molecules in the LCPH element, according to various embodiments of the present disclosure.

FIGS. 1E-1H schematically illustrate y-z sectional views of a portion of the LCPH element 100, showing out-of-plane orientations of the LC directors of the LC molecules 112 in the LCPH element 100, according to various embodiments of the present disclosure. For discussion purposes, FIGS. 1E-1H schematically illustrate out-of-plane orientations of the LC directors of the LC molecules 112 configured with a periodic in-plane orientation pattern shown in FIG. 1B. As shown in FIG. 1E, within a volume of the birefringent medium layer 115, the LC molecules 112 may be arranged in a plurality of helical structures 117 with a plurality of helical axes 118 and a helical pitch $P_h$ along the helical axes. The azimuthal angles of the LC molecules 112 arranged along a single helical structure 117 may continuously vary around a helical axis 118 in a predetermined rotation direction, e.g., clockwise direction or counter-clockwise direction. In other words, the orientations of the LC directors of the LC molecules 112 arranged along a single helical structure 117 may exhibit a continuous rotation around the helical axis 118 in a predetermined rotation direction. That is, the azimuthal angles associated of the LC directors may exhibit a continuous change around the helical axis in the predetermined rotation direction. Accordingly, the helical structure 117 may exhibit a handedness, e.g., right handedness or left handedness. The helical pitch $P_h$ may be defined as a distance along the helical axis 118 over which the orientations of the LC directors exhibit a rotation around the helical axis 118 by 360°, or the azimuthal angles of the LC molecules vary by 360°.

In the embodiment shown in FIG. 1E, the helical axes 118 may be substantially perpendicular to the first surface 115-1 and/or the second surface 115-2 of the birefringent medium layer 115. In other words, the helical axes 118 of the helical structures 117 may be in a thickness direction (e.g., a z-axis direction) of the birefringent medium layer 115. That is, the LC molecules 112 may have substantially small tilt angles (including zero degree tilt angles), and the LC directors of the LC molecules 112 may be substantially orthogonal to the helical axis 118. The birefringent medium layer 115 may have a vertical pitch $P_v$, which may be defined as a distance along the thickness direction of the birefringent medium layer 115 over which the orientations of the LC directors of the LC molecules 112 exhibit a rotation around the helical axis 118 by 180° (or the azimuthal angles of the LC directors vary by 180°). In the embodiment shown in FIG. 1E, the vertical pitch $P_v$ may be half of the helical pitch $P_h$.

As shown in FIG. 1E, the LC molecules 112 from the plurality of helical structures 117 having a first same orientation (e.g., same tilt angle and azimuthal angle) may form a first series of slanted and parallel refractive index planes 114 periodically distributed within the volume of the birefringent medium layer 115. Although not labeled, the LC molecules 112 with a second same orientation (e.g., same tilt angle and azimuthal angle) different from the first same orientation may form a second series of slanted and parallel refractive index planes periodically distributed within the volume of the birefringent medium layer 115. Different series of slanted and parallel refractive index planes may be formed by the LC molecules 112 having different orientations. In the same series of parallel and periodically distributed, slanted refractive index planes 114, the LC molecules 112 may have the same orientation and the refractive index may be the same. Different series of slanted refractive index planes may correspond to different refractive indices. When the number of the slanted refractive index planes (or the thickness of the birefringent medium layer) increases to a sufficient value, Bragg diffraction may be established according to the principles of volume gratings. Thus, the slanted and periodically distributed refractive index planes 114 may also be referred to as Bragg planes 114. Within the birefringent medium layer 115, there may exist different series of Bragg planes. A distance (or a period) between adjacent Bragg planes 114 of the same series may be referred to as a Bragg period PB. The different series of Bragg planes formed within the volume of the birefringent medium layer 115 may produce a varying refractive index profile that is periodically distributed in the volume of the birefringent medium layer 115. The birefringent medium layer 115 may diffract an input light satisfying a Bragg condition through Bragg diffraction.

As shown in FIG. 1E, the birefringent medium layer 115 may also include a plurality of LC molecule director planes (or molecule director planes) 116 arranged in parallel with one another within the volume of the birefringent medium layer 115. An LC molecule director plane (or an LC director plane) 116 may be a plane formed by or including the LC directors of the LC molecules 112. In the example shown in FIG. 1E, the LC directors in the LC director plane 116 have different orientations, i.e., the orientations of the LC directors vary in the x-axis direction. The Bragg plane 114 may form an angle θ with respect to the LC molecule director plane 116. In the embodiment shown in FIG. 1E, the angle θ may be an acute angle, e.g., 0°<θ<90°. The LCPH element 100 including the birefringent medium layer 115 shown in FIG. 1B may function as a transmissive PVH element, e.g., a transmissive PVH grating.

Figure 1F:
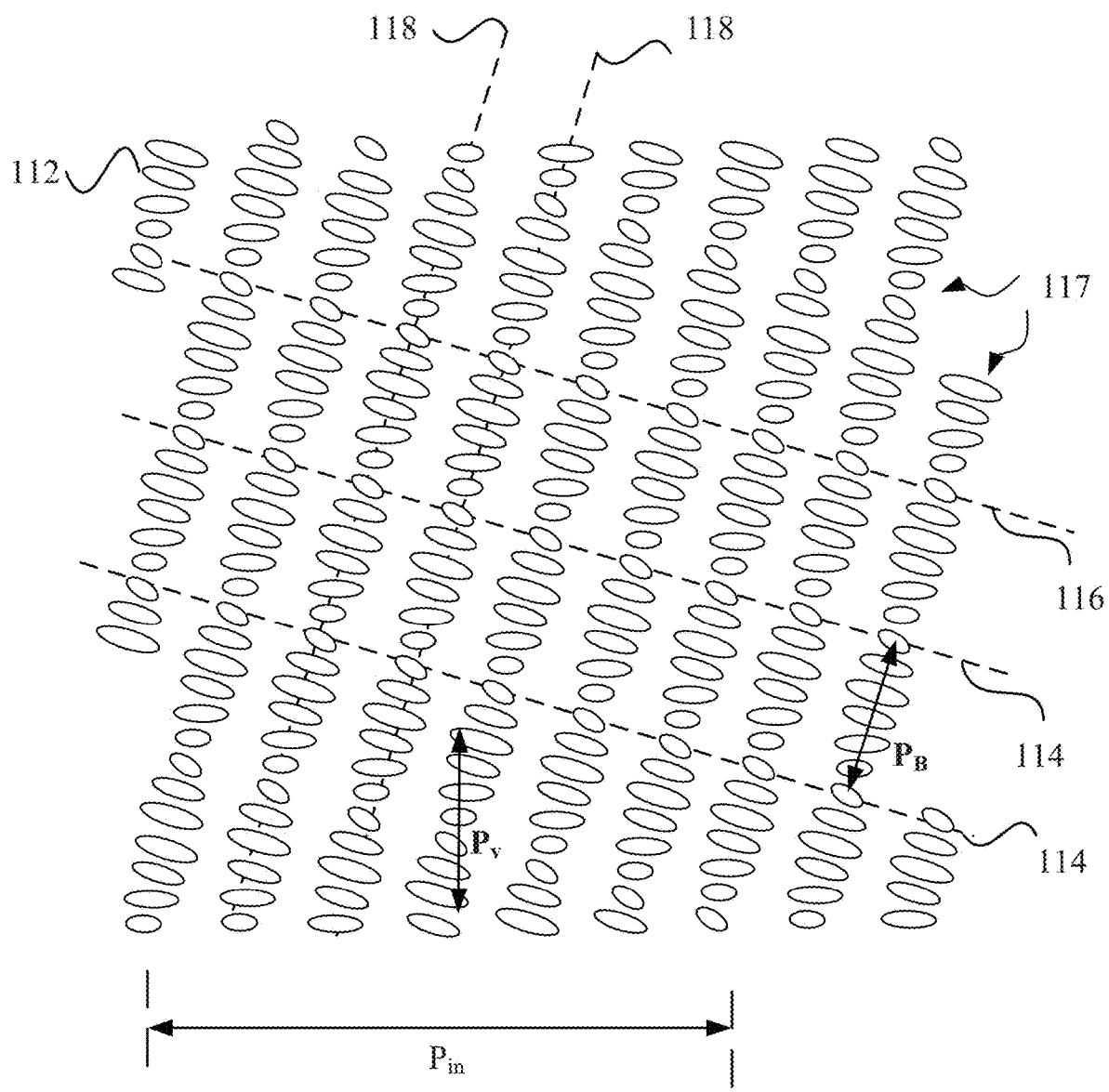

In the embodiment shown in FIG. 1F, the helical axes 118 of helical structures 117 may be tilted with respect to the first surface 115-1 and/or the second surface 115-2 of the birefringent medium layer 115 (or with respect to the thickness direction of the birefringent medium layer 115). For example, the helical axes 118 of the helical structures 117 may have an acute angle or obtuse angle with respect to the first surface 115-1 and/or the second surface 115-2 of the birefringent medium layer 115. In some embodiments, the LC directors of the LC molecule 112 may be substantially orthogonal to the helical axes 118 (i.e., the tilt angle may be substantially zero degree). In some embodiments, the LC directors of the LC molecule 112 may be tilted with respect to the helical axes 118 at an acute angle. The birefringent medium layer 115 may have a vertical periodicity (or pitch) $P_v$. In the embodiment shown in FIG. 1F, an angle θ (not shown) between the LC director plane 116 and the Bragg plane 114 may be substantially 0° or 180°. That is, the LC director plane 116 may be substantially parallel with the Bragg plane 114. In the example shown in FIG. 1F, the orientations of the directors in the molecule director plane 116 may be substantially the same. The LCPH element 100 including the birefringent medium layer 115 shown in FIG. 1F may function as a reflective PVH element, e.g., a reflective PVH grating.

Figure 1G:
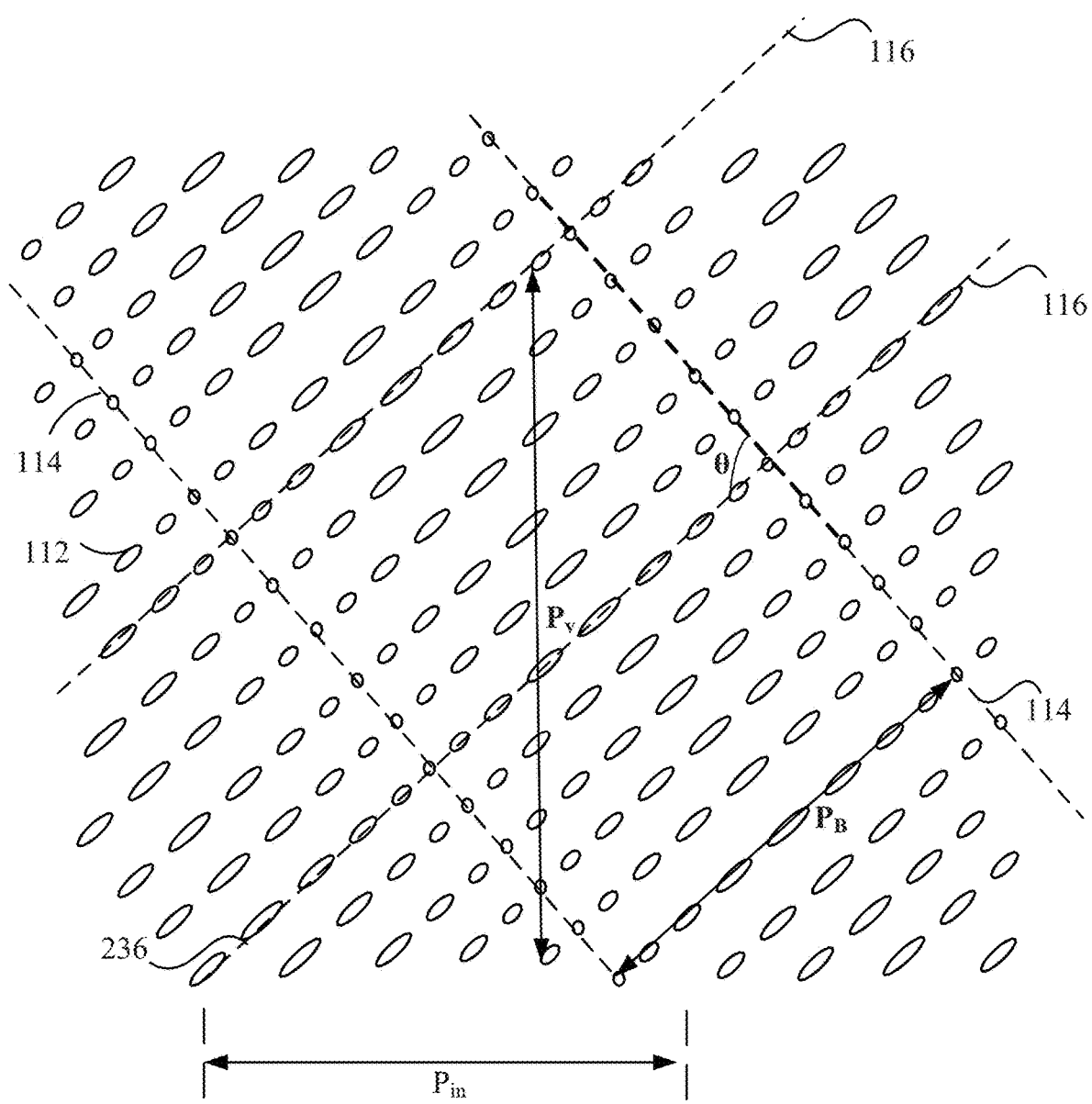

In the embodiment shown in FIG. 1G, the birefringent medium layer 115 (or the PVH including the birefringent medium layer 115) may also include a plurality of LC director planes 116 arranged in parallel within the volume of the birefringent medium layer 115. In the embodiment shown in FIG. 1F, an angle θ between the LC director plane 116 and the Bragg plane 114 may be a substantially right angle, e.g., θ=90°. That is, the LC director plane 116 may be substantially orthogonal to the Bragg plane 114. In the example shown in FIG. 1F, the LC directors in the LC director plane 116 may have different orientations. In some embodiments, the LCPH element 100 including the birefringent medium layer 115 shown in FIG. 1F may function as a transmissive PVH element, e.g., a transmissive PVH grating.

It is noted that the slanted configuration of the Bragg planes 114 is an example for illustration purposes. In some embodiments, the Bragg planes 114 may be parallel with the surfaces and/or perpendicular with the surfaces.

Figure 1H:
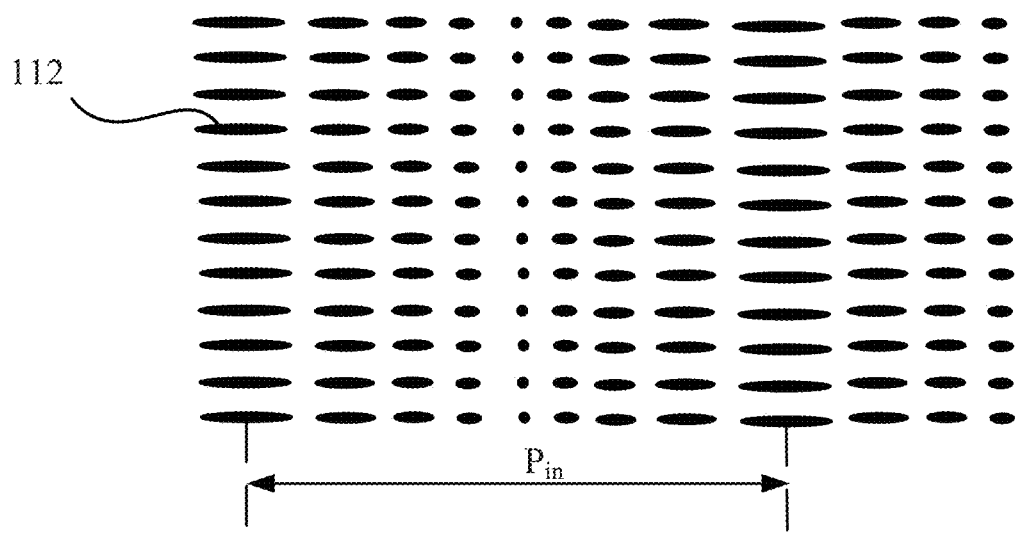

In the embodiment shown in FIG. 1H, in a volume of the birefringent medium layer 115, along the thickness direction (e.g., the z-axis direction) of the birefringent medium layer 115, the directors (or the azimuth angles) of the LC molecules 112 may remain in the same orientation (or same angle value) from the first surface 115-1 to the second surface 115-2 of the birefringent medium layer 115. In some embodiments, the thickness of the birefringent medium layer 115 may be configured as $d=\lambda/(2*\Delta n)$, where $\lambda$, is a design wavelength, $\Delta_n$ is the birefringence of the LC material of the birefringent medium layer 115, and $\Delta n=n_e-n_o$, where $n_e$ and $n_o$ are the extraordinary and ordinary refractive indices of the LC material, respectively. In some embodiments, the LCPH element 100 including the birefringent medium layer 115 shown in FIG. 1F may function as a PBP element, e.g., a PBP grating.

Figure 2A:
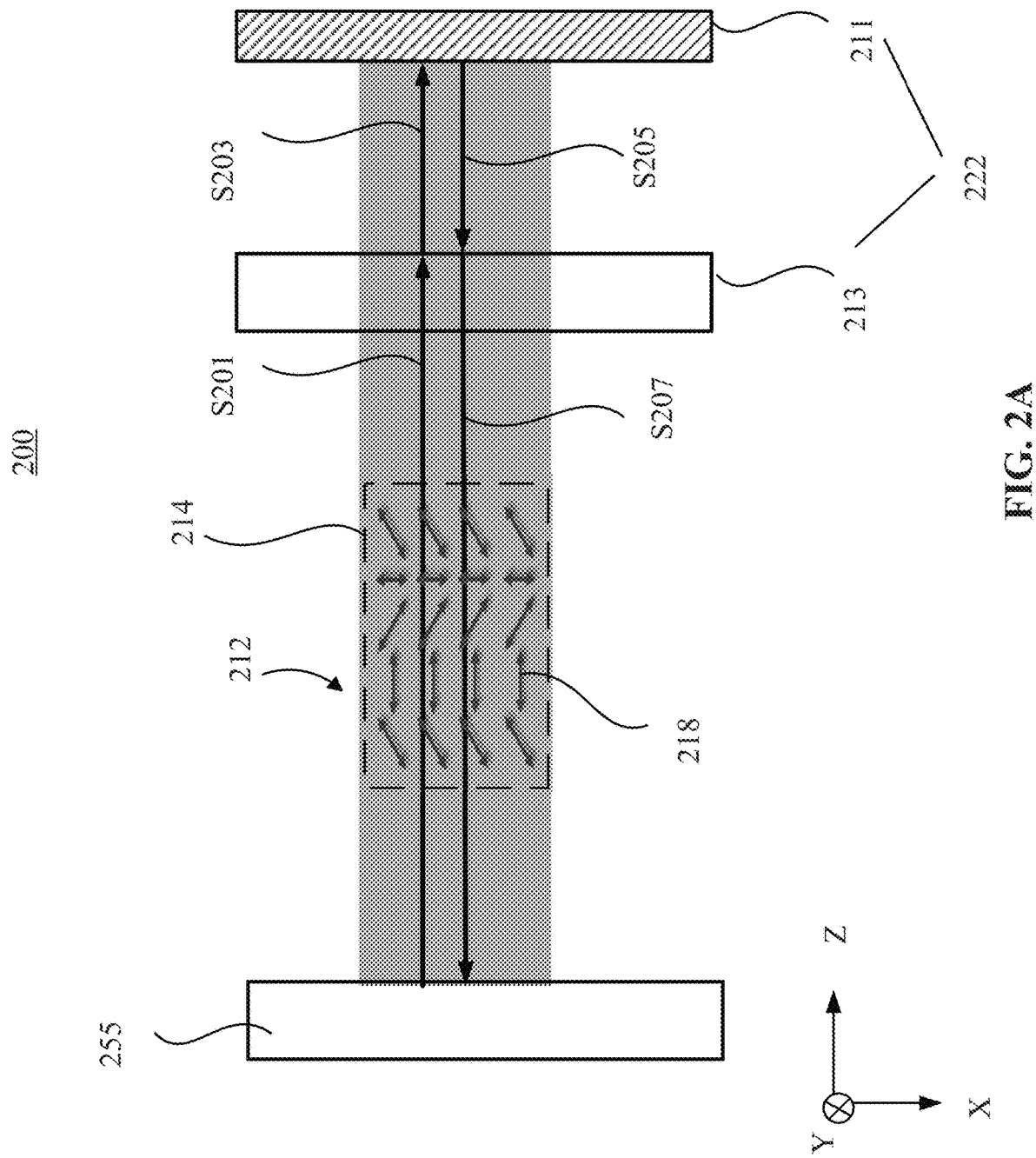
FIG. 2A schematically illustrates a system for generating a polarization interference, according to an embodiment of the present disclosure.

FIG. 2A schematically illustrates an X-Z sectional view of a system 200 configured to generate a polarization interference pattern, according to an embodiment of the present disclosure. Note that the X-Y-Z coordinate system refers to a global coordinate system for the system 200, whereas an x-y-z coordinate system may refer to a local coordinate system for a specific element included in the system 200. As shown in FIG. 2A, the system 200 may include a light outputting element 255, a reflective assembly 222 arranged in an optical series. In some embodiments, centers of the light outputting element 255 and the reflective assembly 222 may be arranged substantially on a same straight line, e.g., which may be an optical axis of the system 200. The light outputting element 255 may be a light source, or an optical element configured to output a beam with a predetermined polarization, wavefront, and propagation direction, such as a mirror, a lens, a grating, a waveguide, a waveplate, a prism, a polarizer, etc. The reflective assembly 222 may include a waveplate 213 and a reflector 211. The light outputting element 255 may output a beam S201 toward the reflective assembly 222.

In the embodiment shown in FIG. 2A, the waveplate 213 and the reflector 211 may be spaced apart from one another with a gap. Although not shown, in some embodiments, the waveplate 213 and the reflector 211 may be disposed without a gap therebetween. In some embodiments, the waveplate 213 may function as a quarter-wave plate ("QWP") for an input beam having a predetermined wavelength of $\lambda_0$ (or a predetermined wavelength range including the predetermined wavelength Xo). In some embodiments, the waveplate (e.g., QWP) 213 may be configured to convert a circularly polarized beam having the wavelength of $\lambda 0$ to a linearly polarized beam having the wavelength of $\lambda_0$, or vice versa. In the disclosed embodiments, the waveplate (e.g., QWP) 213 may be a transmissive waveplate configured to substantially maintain the wavelength and wavefront of a beam transmitted therethrough. The waveplate (e.g., QWP) 213 may be configured as a flat waveplate or a curved waveplate with at least one curved surface.

The reflector 211 may be configured to reflect an input beam having the predetermined wavelength of $\lambda_0$ (or a predetermined wavelength range including the predetermined wavelength $\lambda_0$). In some embodiments, the reflector 211 may be a retro-reflector, which may be configured to reflect a beam with minimum scattering. In the disclosed embodiments, the reflector 211 is presumed to substantially maintain the wavelength of a beam reflected thereby. In some embodiments, the reflector 211 may be configured to reflect (e.g., retro-reflect) an input beam as a reflected beam having a wavefront substantially matching with a wavefront of the input beam. That is, the wavefront of the reflected beam may be substantially the same as the wavefront of the input beam. In some embodiments, the reflector 211 may be configured to reflect an input beam as a reflected beam having a wavefront different from (e.g., slightly different from) a wavefront of the input beam. In some embodiments, the reflector 211 may include a metal or dielectric mirror. The reflector 211 may be configured to reflect a linearly polarized beam having a first polarization as a linearly polarized beam having a second polarization orthogonal to the first polarization. In some embodiments, the reflector 211 may be configured to selectively reflect (e.g., retro-reflect) a circularly polarized input beam having a predetermined handedness as a circularly polarized reflected beam having the same handedness. For example, the reflector 211 may include a circularly reflective polarizer (e.g., a reflective polarizer including cholesteric liquid crystals). The reflector 211 may be configured with a flat reflective surface or a curved reflective surface.

As shown in FIG. 2A, the waveplate 213 may be disposed between the light outputting element 255 and the reflector 211. The beam S201 output from the light outputting element 255 may be a first circularly polarized beam (e.g., a right-handed circularly polarized beam ("RHCP") beam). The first circularly polarized beam S201 may be incident onto the waveplate 213 from a first side of the waveplate 213. The first circularly polarized beam S201 may have a wavelength of $\lambda_0$ and a first wavefront. In some embodiments, the first circularly polarized beam S201 may be a collimated beam substantially normally incident onto the waveplate 213. The first circularly polarized beam S201 may be a plane wave, and the first wavefront may be a planar wavefront. The waveplate 213 may be configured to convert the first circularly polarized beam (e.g., RHCP beam) S201 to a first linearly polarized beam (e.g., an s-polarized beam) S203 while transmitting the first linearly polarized beam S203 toward the reflector 211. The first linearly polarized beam S203 may have a wavelength of $\lambda_0$, a first polarization (e.g., s-polarization), and the first wavefront.

The reflector 211 may be configured to reflect (e.g., retro-reflect) the first linearly polarized beam (e.g., s-polarized beam) S203 as a second linearly polarized beam S205 back toward the waveplate 213. In some embodiments, the second linearly polarized beam S205 may have a wavelength of $\lambda_0$, a second polarization, and a second wavefront. In some embodiments, the second polarization of the second linearly polarized beam S205 may be orthogonal to the first polarization of the first linearly polarized beam S203, e.g., the second linearly polarized beam S205 may be a p-polarized light. In some embodiments, the second wavefront of the second linearly polarized beam S205 may substantially match with the first wavefront of the first linearly polarized beam S203. For example, the second wavefront of the second linearly polarized beam S205 may be substantially the same as the first wavefront of the first linearly polarized beam S203.

The second linearly polarized beam S205 may be incident onto the waveplate 213 from a second side of the waveplate 213. That is, the first linearly polarized beam S203 and the second linearly polarized beam S205 may propagate towards (or be incident onto) the waveplate 213 from different (e.g., opposite) sides of the waveplate 213. The waveplate 213 may be configured to convert the second linearly polarized beam (e.g., p-polarized beam) S205 to a second circularly polarized beam S207 having a handedness that is the same as the handedness of the first circularly polarized beam S201. For example, the second circularly polarized beam S207 may be an RHCP beam. The handedness is defined as the direction (clockwise or counter-clockwise) in which the electric field vector of a circularly polarized beam rotates, with respect to the point of view of a receiver toward which the circularly polarized beam propagates. The second circularly polarized beam S207 may have a wavelength of $\lambda_0$ and the second wavefront. In other words, the waveplate 213 and the reflector 211 together may convert the first circularly polarized beam S201 to the second circularly polarized beam S207 propagating in a direction opposite to the propagation direction of the first circularly polarized beam S201. The first circularly polarized beam S201 and the second circularly polarized beam S207 may have the same handedness, substantially matching wavefronts, and opposite propagation direction.

The first circularly polarized beam S201 and the second circularly polarized beam S207 may interfere with one another within a spatial region. For illustrative purposes, FIG. 2A shows a portion of the spatial region, and the portion is denoted by a dashed zone 214. For discussion purposes, the spatial region in which the two circularly polarized beams S201 and S207 interfere with one another may also be referred to as a beam interference zone 214. In some embodiments, the superposition of the first circularly polarized beam S201 and the second circularly polarized beam S207 in the beam interference zone 214 may result in a superposed wave that has a substantially uniform intensity and a varying linear polarization in the beam interference zone 214. For example, the linear polarization of the superposed wave may have a spatially varying polarization direction within the beam interference zone 214. In other words, the superposed wave may have a linear polarization with an orientation (or a polarization direction) that is spatially varying within the beam interference zone 214. Arrows 218 represent the electric field vector and the vibration direction of the electric field vector of the superposed wave. The arrows 218 also represent the linear polarization direction of the superposed wave. In the present disclosure, a pattern of the spatially varying orientation (or polarization direction) of the linear polarization of the superposed wave or a pattern of the varying linear polarization of the superposed wave may be referred to as a polarization interference pattern 212. That is, the superposition of the two circularly polarized beams S201 and S207 may result in the polarization interference pattern 212. In other words, the two circularly polarized beams S201 and S207 may interfere with one another to generate the polarization interference pattern 212. In some embodiments, a pitch of the polarization interference pattern 212 may be defined as a distance over which the orientations (or polarization directions) of the linear polarization exhibit a rotation by 180 degrees relative to a reference orientation (or polarization direction).

For the purpose of illustrating the polarization interference in the beam interference zone 214, a recording medium layer is not shown in FIG. 2A. It is understood that the recording medium layer may be disposed in the beam interference zone 214, such that the polarization interference pattern may be recorded in the recording medium layer. The recording medium layer may be supported by a substrate (also not shown in FIG. 2A).

In the embodiment shown in FIG. 2A, the waveplate 213 may be a flat waveplate, and the reflector 211 may be a flat mirror. Thus, the second circularly polarized beam S207 may be a collimated plane wave, and the second wavefront of the second circularly polarized beam S207 may be a planar wavefront. The first circularly polarized beam S201 and the second circularly polarized beam S207 may be configured such that the polarization interference pattern 212 generated based on the interference between the two beams includes a periodically varying orientation of the linear polarization. For example, the orientation of the linear polarization may vary in a Z-axis direction. Such a polarization interference pattern 212, e.g., a pattern of the periodic, spatial variation of the orientation of the linear polarization, may define a grating pattern. A pitch of the polarization interference pattern 212 may be half of the wavelength $\lambda_0$ of the first circularly polarized beam S201 or the second circularly polarized beam S207.

Figure 2B:
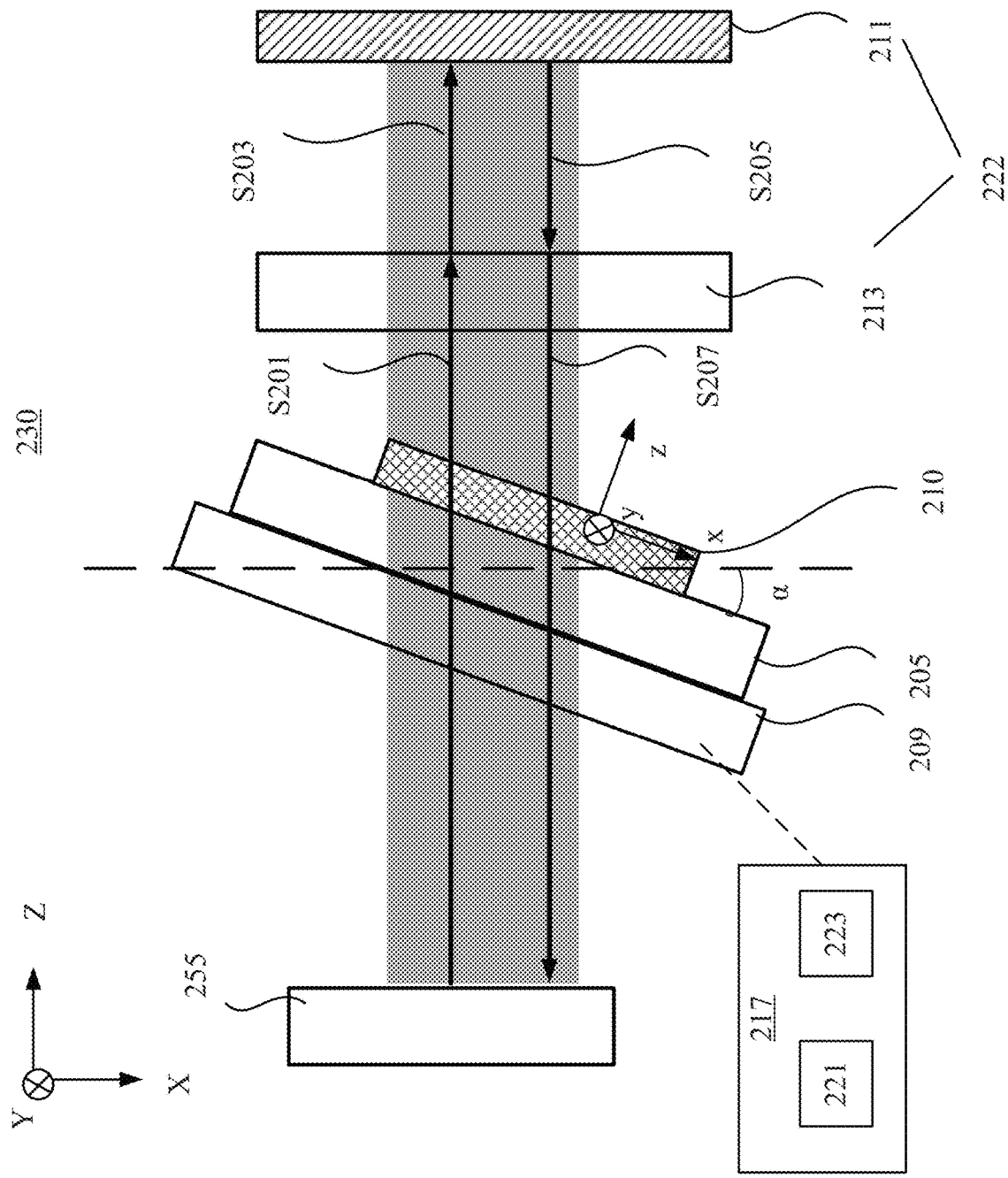
FIG. 2B schematically illustrates a system for generating a polarization interference, according to an embodiment of the present disclosure.

In some embodiments, the polarization interference pattern 212 may be recorded in a recording medium layer disposed in the beam interference zone 214. The first circularly polarized beam S201 and the second circularly polarized beam S207 may also be referred to as a first recording beam and a second recording beam, respectively. The wavelength $\lambda_0$ of the first circularly polarized beam S201 or the second circularly polarized beam S207 may also be referred to as a recording wavelength. The recording wavelength $\lambda_0$ may be configured to be within an absorption band of the recording medium layer. FIG. 2B schematically illustrates an X-Z sectional view of a system 230 configured to generate the polarization interference pattern 212 (not shown in FIG. 2B) and record the polarization interference pattern 212 in a recording medium layer 210, according to an embodiment of the present disclosure. The system 230 may include elements, structures, and/or functions that are the same as or similar to those included in the system 200 shown in FIG. 2A. Descriptions of the same or similar elements, structures, and/or functions can refer to the above descriptions rendered in connection with FIG. 2A.

As shown in FIG. 2B, the recording medium layer 210 may be disposed on a substrate 205. The substrate 205 provided with the recording medium layer 210 may be disposed between the light outputting element 255 and the waveplate 213. The substrate 205 and the reflector 211 may be disposed at opposite sides of the waveplate 213. In some embodiments, the recording medium layer 210 may be disposed at a side of the substate 205 facing the waveplate 213. In some embodiments, the recording medium layer 210 may be disposed at a side of the substate 205 opposite to a side facing the waveplate 213. The two recoding beams S201 and S207 (e.g., circularly polarized light beams) may propagate towards the recording medium layer 210 from different (e.g., opposite) sides of the recording medium layer 210.

The substrate 205 may provide support and protection to various layers, films, and/or structures formed thereon. In some embodiments, the substrate 205 may be at least partially transparent in a wavelength range including the recording wavelength Xo. In some embodiments, the substrate 205 may also be at least partially transparent in the visible wavelength range (e.g., about 380 nm to about 700 nm). In some embodiments, the substrate 205 may also be at least partially transparent in at least a portion of the infrared ("IR") band (e.g., about 700 nm to about 2 mm). The substrate 205 may include a suitable material that is at least partially transparent to lights of the above-listed wavelength ranges, such as, a glass, a plastic, a sapphire, or a combination thereof, etc. The substrate 205 may be rigid, semi-rigid, flexible, or semi-flexible. The substrate 205 may include a flat surface or a curved surface, on which the different layers or films may be formed. In some embodiments, the substrate 205 may be a part of another optical element or device (e.g., another opto-electrical element or device). For example, the substrate 205 may be a solid optical lens, a part of a solid optical lens, or a light guide (or waveguide), etc. In some embodiments, the substrate 205 may be used to fabricate, store, or transport the fabricated an LCPH element. In some embodiments, the substrate 205 may be detachable or removable from the fabricated LCPH element after the LCPH element is fabricated or transported to another place or device. That is, the substrate 205 may be used in fabrication, transportation, and/or storage to support the LCPH element provided on the substrate 205, and may be separated or removed from the LCPH element when the fabrication of the LCPH element is completed, or when the LCPH element is to be implemented in an optical device. In some embodiments, the substrate 205 may not be separated from the LCPH element.

For illustrative purposes, in the embodiment shown in FIG. 2B, the substate 205 is shown as a flat substate, and the recording medium layer 210 is shown as being disposed at the side of the substate 205 facing the waveplate 213. In some embodiments, the substrate 205, on which the recording medium layer 210 is disposed, may be mounted on a movable stage 209. The movable stage 209 may be configured to be translatable and/or rotatable, thereby translating the substrate 205 (on which the recording medium layer 210 is disposed) in one or more directions (e.g., in the X-axis direction, Y-axis direction, and/or Z-axis direction), and/or rotating the substrate 205 around one or more rotation axes (e.g., the yaw, roll, and/or pitch axes) defined locally with respect to the movable stage 209.

In some embodiments, a controller 217 may be communicatively coupled with the movable stage 209, and may control the operations and/or movements of the movable stage 209. The controller 217 may include a processor or processing unit 221. The processor 221 may by any suitable processor, such as a central processing unit ("CPU"), a graphic processing unit ("GPU"), etc. The controller 217 may include a storage device 223. The storage device 223 may be a non-transitory computer-readable medium, such as a memory, a hard disk, etc. The storage device 223 may be configured to store data or information, including computer-executable program instructions or codes, which may be executed by the processor 221 to perform various controls or functions according to the methods or processes disclosed herein.

The recording medium layer 210 may include a polarization sensitive recording medium. For example, the recording medium layer 210 may include an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under a polarized irradiation, such as a polarization interference pattern generated based on two interfering beams. Referring to FIG. 2A and FIG. 2B, when exposed to the superposed wave of the two circularly polarized light beams S201 and S207, molecules (or fragments) and/or photo-products of the recording medium layer 210 may be aligned according to the orientations of the linear polarization of the superposed wave. In other words, the recording medium layer 210 may be optically patterned according to the polarization interference pattern. For example, in the embodiment shown in FIG. 2A and FIG. 2B, when exposed to the polarization interference pattern 212, the molecules (or fragments) and/or photo-products of the recording medium layer 210 may be aligned to have an in-plane orientation pattern similar to that shown in FIG. 1B. The orientation pattern of the optic axis of the recording medium layer 210 may define a grating pattern in the recording medium layer 210. In some embodiments, the pitch of the grating pattern recorded at a plane of the recording medium layer 210 (e.g., an x-y plane) (or a sample pitch) may depend on the recording wavelength $\lambda_0$ and a rotation angle $\alpha$ of the recording medium layer 210. The rotation angle $\alpha$ may be defined as an angle between the plane of the recording medium layer 210 (e.g., an x-y plane) and the wavefront of the recording beam S201 or S207. For example, the sample pitch may be proportional to the recording wavelength $\lambda_0$, and inversely proportional to a sine function of the rotation angle $\alpha$ of the recording medium layer 210, i.e., the sample pitch=$k*\lambda_0/\sin(\alpha)$, where k may be a value independent of $\lambda_0$ and $\alpha$. In some embodiments, k=1/2.

When the recording wavelength $\lambda_0$ is fixed, as the rotation angle $\alpha$ increases, an area of the recording medium layer 210 that is exposed to the polarization interference pattern 214 (referred to as an exposure area) may increase, and the pitch of the grating pattern or the sample pitch may decrease. For example, when the rotation angle $\alpha$ of the recording medium layer 210 is 0 degree, i.e., the plane of the recording medium layer 210 (e.g., x-y plane) is parallel to the wavefront of the recording beam S201 or S207, the pitch of the grating pattern may be infinity. When the rotation angle $\alpha$ of the recording medium layer 210 is 90 degrees, i.e., the plane of the recording medium layer 210 (e.g., x-y plane) is parapedicular to the wavefront of the recording beam S201 or S207, the pitch of the grating pattern may be half of the recording wavelength Xo. In some embodiments, the pitch of the grating pattern recorded at the plane of the recording medium layer 210 (e.g., x-y plane) may be the in-plane pitch $P_{in}$ shown in FIG. 1B. Thus, when the recording wavelength $\lambda_0$ is fixed, through adjusting the rotation angle $\alpha$ of the recording medium layer 210 via, e.g., translating and/or rotating the movable stage 209, grating patterns with different pitches may be recorded at the recording medium layer 210. Through controlling the movable stage 209 to translate and rotate the substate 205 on which the recording medium layer 210 is disposed, multiple grating patterns of different pitches may be recorded in different regions of the recording medium layer 210 through multiple exposures. Compared to conventional technologies, the build space and build cost of the disclosed system may be reduced, and the complexity of reconfiguring the disclosed system for fabricating various LCPH gratings with different pitches may be significantly reduced. LCPH gratings with substantially small pitches (e.g., 200 nm to 800 nm) may be fabricated through configuring the rotation angle α of the recording medium layer 210 and the recoding wavelength Xo.

In the embodiments shown in FIGS. 2A and 2B, the light outputting element 255 may be a light source configured to emit a beam having the wavelength of $\lambda_0$, which may be within an absorption band of the recording medium layer 210. In some embodiments, the light outputting element 255 may be an optical element other than a light source, and an additional light source may be included in the system 200 or 230. The light source may emit a light toward the light outputting element 255. The light outputting element 255 may transmit, diffract, or reflect the light toward the beam interference zone 214, where the recording medium layer 210 is located. In some embodiments, the beam output from the light source (e.g., the light outputting element 255) may be an ultra-violet ("UV"), violet, blue, or green beam. In some embodiments, the beam output from the light source may be a diverging beam. In some embodiments, the light source may be a laser light source, e.g., a laser diode, configured to emit a laser beam (e.g., a blue laser beam with a center wavelength of about 460 nm). In some embodiments, the system 200 or 230 may include a beam conditioning device (or spatial filtering device) configured to condition (e.g., polarize, expand, collimate, filter, remove noise from, etc.) the beam received from the light source to be a collimated beam with a predetermined beam size and a predetermined polarization, e.g., the first circularly polarized beam S201. In some embodiments, the light outputting element 255 may be the beam conditioning device, and an additional light source may be included in the system 200 or 230. In some embodiments, the beam conditioning device may include one or more lenses and a pinhole aperture arranged in an optical series, configured to expand and collimate the beam received from the light source as a collimated beam with a predetermined beam size. In some embodiments, the beam conditioning device may further include one or more optical elements (e.g., a polarizer, and/or a waveplate, etc.,) configured to change the polarization of the beam received from the light source, and output the beam with a predetermined polarization. In some embodiments, the light outputting element 255 may include both a light source and a light conditioning device. In some embodiments, the system 200 or 230 may include one or more light deflecting elements, such as a reflector (e.g., a mirror) configured to reflect the beam output from the beam conditioning device as a beam toward the recording medium layer 210.

Figure 2C:
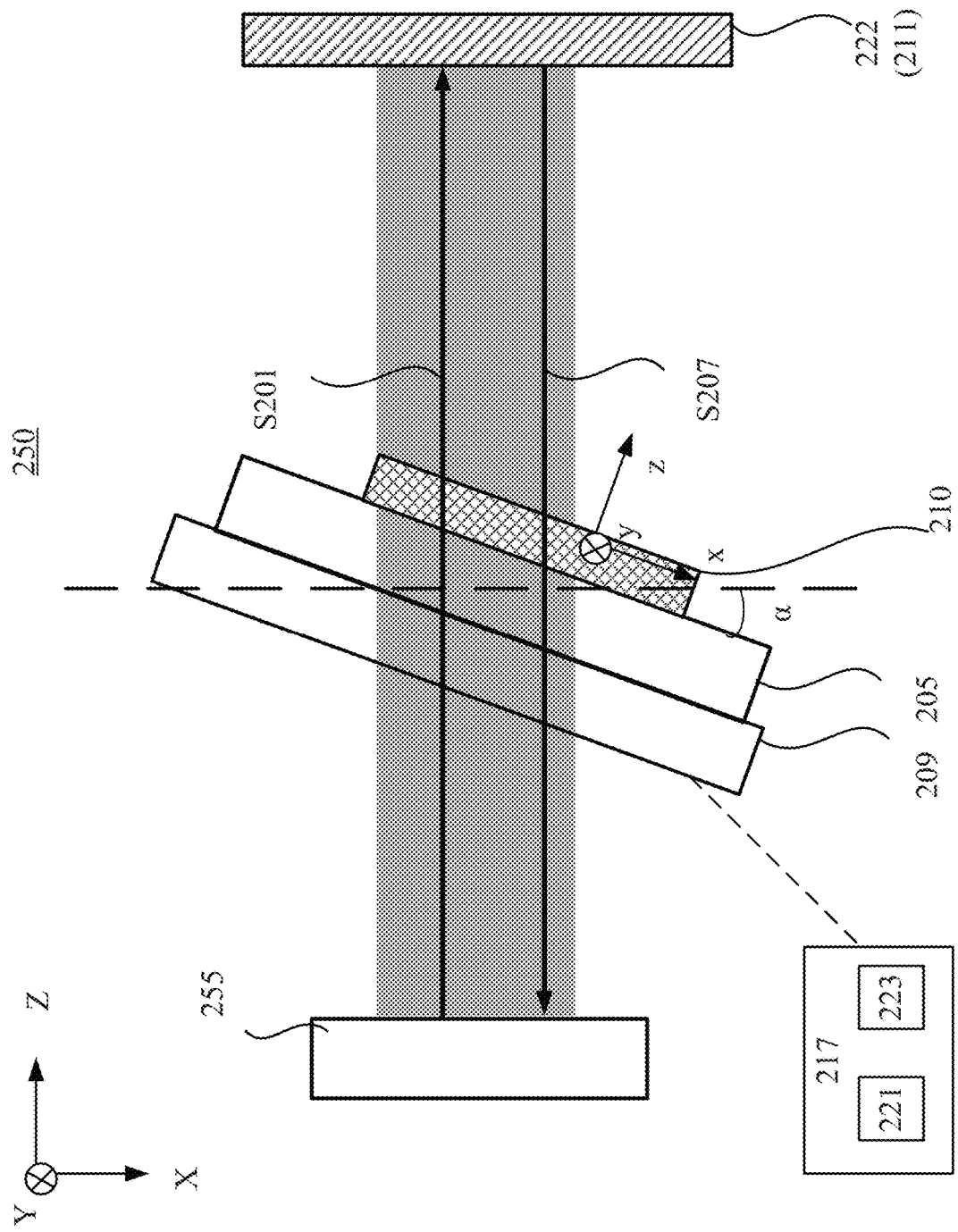
FIG. 2C schematically illustrates a system for generating a polarization interference, according to an embodiment of the present disclosure.

FIG. 2C schematically illustrates an X-Z sectional view of a system 250 configured to generate the polarization interference pattern 212 (not shown in FIG. 2C) and record the polarization interference pattern in the recording medium layer 210, according to an embodiment of the present disclosure. The system 250 may include elements, structures, and/or functions that are the same as or similar to those included in the system 200 shown in FIG. 2A, or the system 230 shown in FIG. 2B. Descriptions of the same or similar elements, structures, and/or functions can refer to the above descriptions rendered in connection with FIG. 2A or FIG. 2B. In the embodiment shown in FIG. 2C, the reflector 211 may be configured to selectively reflect (e.g., retro-reflect) a circularly polarized input beam having a predetermined handedness as a circularly polarized reflected beam having the same handedness. For example, the reflector 211 may include a circularly reflective polarizer (e.g., a reflective polarizer including cholesteric liquid crystals) configured to substantially reflect a circularly polarized input beam having a first handedness as a circularly polarized reflected beam having the first handedness, and substantially transmit a circularly polarized input beam having a second handedness that is opposite to the first handedness. In addition, the wavefront of the circularly polarized reflected beam having the first handedness may substantially match with the wavefront of the circularly polarized input beam having the first handedness. For example, the wavefront of the circularly polarized reflected beam having the first handedness may be substantially the same as the wavefront of the circularly polarized input beam having the first handedness. In such an embodiment, the waveplate 213 that is included in the system 200 shown in FIG. 2A or the system 230 shown in FIG. 2B may be omitted. That is, the reflective assembly 222 may include the reflector 211, and may not include the waveplate 213.

For discussion purposes, in the embodiment shown in FIG. 2C, the reflector 211 may be configured to substantially reflect a right-handed circularly polarized ("RHCP") beam as an RHCP beam, and substantially transmit a left-handed circularly polarized ("LHCP") beam. Thus, the reflector 211 may be configured to reflect the first circularly polarized beam (e.g., RHCP beam) S201 as the second circularly polarized beam (e.g., RHCP beam) S207. The second wavefront of the second circularly polarized beam (e.g., RHCP beam) S207 may substantially match with the first wavefront of the first circularly polarized beam (e.g., RHCP beam) S201. The first circularly polarized beam (e.g., RHCP beam) S201 and the second circularly polarized beam (e.g., RHCP beam) S207 may propagate toward the recording medium layer 210 from different (e.g., opposite) sides of the recording medium layer 210, which may be located within the beam interference zone 214. The first circularly polarized beam (e.g., RHCP beam) S201 and the second circularly polarized beam (e.g., RHCP beam) S207 may interfere with one another to generate a polarization interference pattern in the beam interference zone 214, within which the recording medium layer 210 is disposed. The polarization interference pattern may be recorded in the recording medium layer 210, such that the orientation of the optic axis of the recording medium layer 210 may be configured according to the polarization interference pattern, as described above in connection with FIG. 2A and FIG. 2B.

FIG. 3A to FIG. 5B illustrate systems configured to generate a polarization interference pattern and record the polarization interference pattern in a recording medium layer, according to various embodiments of the present disclosure. The systems shown in FIG. 3A to FIG. 5B may be configured to generate a polarization interference pattern defining a lens pattern and record the polarization interference pattern in the recording medium layer. The lens pattern may be a spherical lens pattern, an aspherical lens pattern, a cylindrical lens pattern, or a freeform lens pattern, etc. The system shown in FIG. 6 may be configured to generate a polarization interference pattern defining any suitable in-plane orientation pattern, and record the polarization interference pattern in the recording medium layer. In some embodiments, the systems shown in FIG. 3A to FIG. 6 may include a light outputting element, a lens assembly, a reflective assembly arranged in an optical series. In some embodiments, the reflective assembly may include a waveplate and a reflector. The waveplate may be disposed between the lens assembly and the reflector. The lens assembly may be disposed between the light outputting element and the reflective assembly. In some embodiments, the waveplate may be omitted from the reflective assembly.

The lens assembly may be any suitable lens assembly, such as a spherical lens assembly, an aspherical lens assembly, a cylindrical lens assembly, or a freeform lens assembly, etc. To generate a circularly polarized beam having a non-planar wavefront, the lens assembly may include at least one of a spatial light modulator ("SLM"), a first lens (e.g., a master lens), or a second lens (that may also function as a substrate to support the recording medium layer disposed thereon during a recording process). In some embodiments, when the lens assembly includes at least one of an SLM or a master lens, the system may also include a flat substrate (for discussion purposes, the flat substrate may be regarded as part of the lens assembly). In some embodiments, the lens assembly may include more two or more master lenses.

The lens assembly may be configured to convert a collimated circularly polarized beam having a planar wavefront to a first recording beam. The first recording beam may be a first circularly polarized beam having a first non-planar wavefront, such as a spherical wavefront, an aspherical wavefront, a cylindrical wavefront, or a freeform wavefront, etc. The reflective assembly including the waveplate and the reflector may be configured to receive the first recording beam, and output a second recording beam that is a second circularly polarized beam having a second non-planar wavefront. In some embodiments, the first recording beam and the second recording beam may have the same handedness. In some embodiments, the second non-planar wavefront of the second recording beam may substantially match with the first non-planar wavefront of the first recording beam. The first recording beam and the second recording beam may propagate toward the recording medium layer disposed within the beam interference zone from two different sides (e.g., opposite sides) of the recording medium layer (or the beam interference zone). The first recording beam and the second recording beam may interference with one another in the beam interference zone, within which the recording medium layer is disposed. The interference between the recording beams may generate a polarization interference pattern, to which the recording medium layer is exposed. Molecules (or fragments) and/or photo-products of the recording medium layer may be aligned according to the polarization interference pattern. For example, when exposed to the polarization interference pattern generated by two recording beams, the molecules (or fragments) and/or photo-products of the recording medium layer may be aligned to have an in-plane orientation pattern similar to that shown in FIGS. 1C and 1D.

Figure 3A:
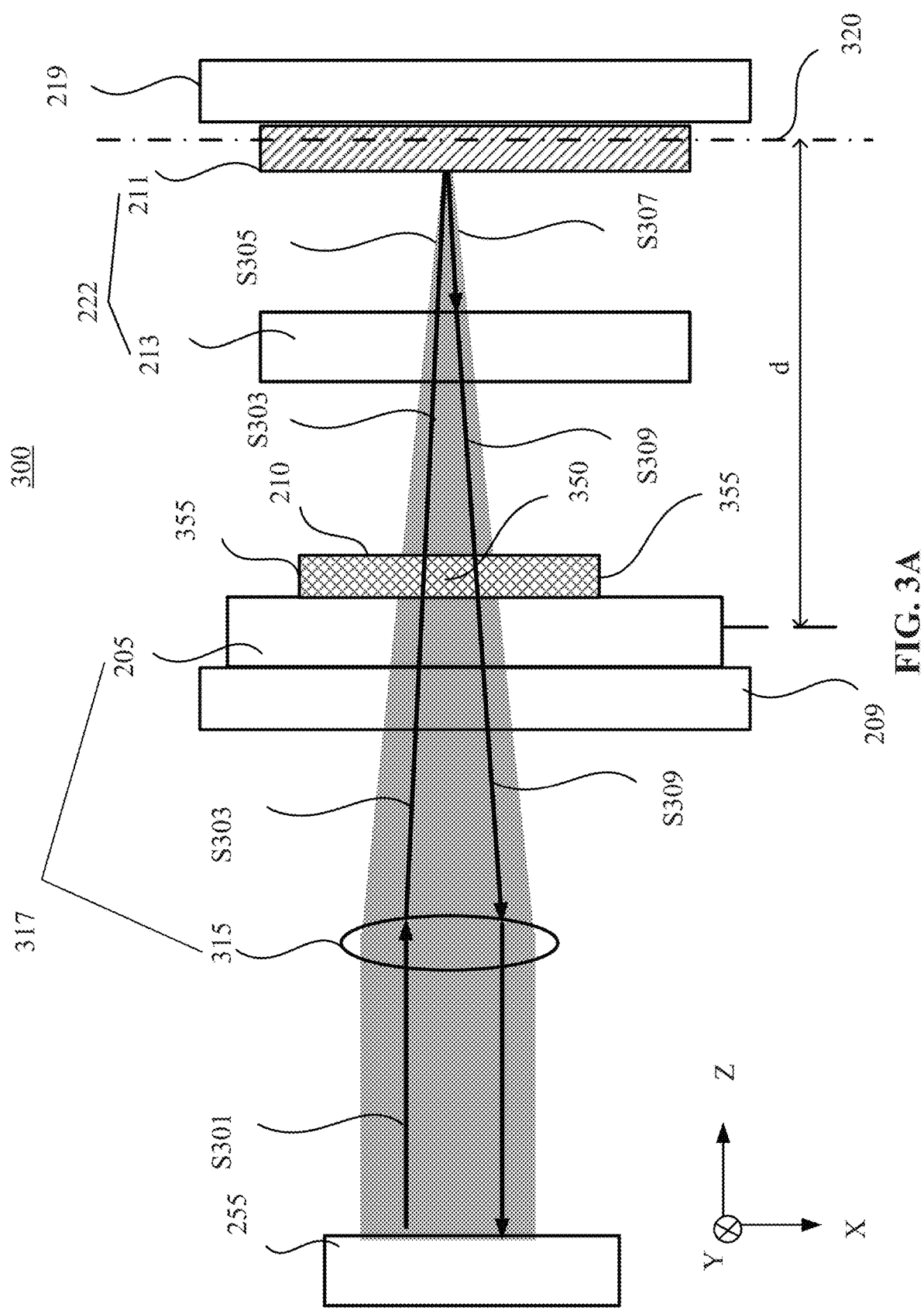
FIG. 3A schematically illustrates a system for generating a polarization interference, according to an embodiment of the present disclosure.

FIG. 3A schematically illustrates an X-Z sectional view of a system 300 configured to generate a polarization interference pattern and record the polarization interference pattern in the recording medium layer 210, according to an embodiment of the present disclosure. The system 300 may include elements, structures, and/or functions that are the same as or similar to those included in the system 200 shown in FIG. 2A, the system 230 shown in FIG. 2B, or the system 250 shown in FIG. 2C. Descriptions of the same or similar elements, structures, and/or functions can refer to the above descriptions rendered in connection with FIG. 2A, FIG. 2B, or FIG. 2C.

As shown in FIG. 3A, the system 300 may include the light outputting element 255, a lens assembly 317, the waveplate 213, and the reflector 211 arranged in an optical series. The waveplate 213 may be disposed between the lens assembly 317 and the reflector 211. The lens assembly 317 may be disposed between the light outputting element 255 and the reflective assembly 222 including the waveplate 213 and the reflector 211. The lens assembly 317 may include a master lens 315 and the substrate 205 on which the recording medium layer 210 is disposed. In the embodiment shown in FIG. 3A, for illustrative purpose, the substrate 205 is shown as a flat substate. The substrate 205 may not provide an optical power to an incident beam. The substrate 205 may be disposed between the master lens 315 and the waveplate 213. The waveplate 213 may be disposed between the master lens 315 and the reflector 211, or between the substrate 205 and the reflector 211. The recording medium layer 210 may be disposed at a side of the substate 205 facing the waveplate 213, or a side of the substate 205 facing the master lens 315. In the embodiment shown in FIG. 3A, the recording medium layer 210 may be disposed at a side of the substate 205 facing the waveplate 213.

The master lens 315 may be any suitable lens for generating a non-planar wavefront, such as a spherical lens, an aspherical lens, a cylindrical lens, or a freeform lens, etc. The master lens 315 may include a suitable material. For example, the master lens 315 may be a glass lens, a polymer lens, a plastic lens, or a PBP lens, etc. The master lens 315 may be a converging lens having a positive optical power, a diverging lens having a negative optical power, or a freeform lens include regions having positive optical powers and/or regions having negative optical powers. In the embodiment shown in FIG. 3A, the master lens 315 is shown as a converging spherical lens (also referred to as a convex lens) for illustrative purpose. The master lens 315 may be configured to converge or focus a collimated circularly polarized beam (e.g., RHCP beam) S301 output from the light outputting element 255 as a first circularly polarized beam (e.g., an RHCP beam) S303. The circularly polarized beam (e.g., an RHCP beam) S303 may have a first wavefront (e.g., a first spherical wavefront), and may be a convergent beam. The first wavefront (e.g., first spherical wavefront) may be a convergent wavefront. The first circularly polarized beam (e.g., RHCP beam) S303 having the first wavefront (e.g., first spherical wavefront) may be referred to as a first recording beam S303. The waveplate (e.g., QWP) 213 may be configured to transmit the first circularly polarized beam (e.g., RHCP beam) S303 as a first linearly polarized beam (e.g., an s-polarized beam) S305 having the first wavefront (e.g., first spherical wavefront). The first linearly polarized beam S305 output from the waveplate 213 may propagate toward the reflector 211. In some embodiments, the reflector 211 may be configured with a flat reflective surface. In some embodiments, the reflector 211 may be configured with a curved reflective surface.

The reflector 211 may be disposed at or adjacent a focal plane 320 of the lens assembly 317. As the substate 205 is a flat substate, the focal plane 320 of the lens assembly 317 may be substantially the same as a focal plane of the master lens 315, and the focal length of the lens assembly 317 may be substantially the same as the focal length of the master lens 315. For discussion purposes, both of the focal plane of the lens assembly 317 and the focal plane of the master lens 315 may be referred to as 320, and both of the focal length of the lens assembly 317 and the focal length of the master lens 315 may be referred to as $f_0$. In some embodiments, a distance between the reflector 211 and the master lens 315 may be substantially equal to the focal length $f_0$ of the master lens 315.

In some embodiments, the reflector 211 may be mounted on a movable stage 219. The movable stage 219 may be translatable and/or rotatable. For example, in some embodiments, the movable stage 219 may be translatable in one or more linear directions, thereby translating or moving the reflector 211 in the one or more linear directions. In some embodiments, the movable stage 219 may be rotatable around one or more local axes of the movable stage 219, such as an axis of rotation passing through the center of the movable stage 219, thereby rotating the reflector 211 around the axis of rotation of the movable stage 219. In some embodiments, a controller (e.g., the controller 217 shown in FIG. 2B) may be communicatively coupled with the movable stage 219, and may control the operations and/or movements of the movable stage 219.

The reflector 211 may be configured to reflect (e.g., retro-reflect) the first linearly polarized beam (e.g., s-polarized beam) S305 as a second linearly polarized beam (e.g., a p-polarized beam) S307 back toward the waveplate 213. The second linearly polarized beam S307 may have a second wavefront (e.g., a second spherical wavefront) substantially matching with the first wavefront (e.g., first spherical wavefront) of the first linearly polarized beam S203. For example, the second wavefront (e.g., second spherical wavefront) of the second linearly polarized beam S307 may be substantially the same as the first wavefront (e.g., first spherical wavefront) of the first linearly polarized beam S305. The waveplate 213 may be configured to transmit the second linearly polarized beam (e.g., p-polarized beam) S307 as a second circularly polarized beam (e.g., an RHCP beam) S309 having the second wavefront (e.g., second spherical wavefront). The second circularly polarized beam (e.g., RHCP beam) S309 having the second wavefront (e.g., second spherical wavefront) may be referred to as a second recording beam S309.

The first recording beam S303 and the second recording beam S309 may propagate toward the recording medium layer 210 from two different sides (e.g., opposite sides) of the recording medium layer 210. The first recording beam S303 and the second recording beam S309 may interference with one another in the beam interference zone 214, within which the recording medium layer 210 is disposed, to generate a superposed wave. The orientations of local wavefronts of the superposed wave may vary across a surface (e.g., within an X-Y plane) of the substrate 205 disposed within the beam interference zone 214, hence different portions of the recording medium layer 210 may be exposed to different portions of the superposed wave having different local wavefronts. When exposed to a polarization interference pattern generated in the beam interference zone 214, the molecules (or fragments) and/or photo-products of the recording medium layer 210 may be aligned to have an in-plane orientation pattern. In some embodiments, the pitch of the in-plane orientation pattern recorded at a plane of the recording medium layer 210 (e.g., an x-y plane) may depend on an angle between a surface of the recording medium layer 210 (e.g., a surface parallel to the plane) and the local wavefront. In the embodiment shown in FIG. 3A, the pitch of the in-plane orientation pattern recorded at the plane of the recording medium layer 210 (e.g., the x-y plane) may increase in a plurality of radial directions from a center 350 of the recording medium layer 210 toward a periphery 355 of the recording medium layer 210. The periphery 355 of the recording medium layer 210 may be within the X-Y plane. Such an in-plane orientation pattern recorded at the plane of the recording medium layer 210 (e.g., X-Y plane) may be similar to that shown in FIG. 1C. That is, in some embodiments, the orientation pattern of the optic axis of the recording medium layer 210 may define a lens pattern.

In some embodiments, a focal length f of a lens fabricated based on the patterned recording medium layer 210 (also referred to as a sample focal length f) may depend on the recoding wavelength $\lambda_0$, an operating wavelength $\lambda$ (that is a wavelength of a beam incident onto the fabricated lens when the lens is implemented in an application), and a distance d between the substrate 205 and the focal plane 320 of the master lens 315 (or a distance D1 between the substrate 205 and the reflector 211). In some embodiments, the distance D1 may be the same as the distance d, e.g., when the reflector 211 is located at the focal plane 320. In some embodiments, the distance D1 may be smaller than the distance d, e.g., when the reflector 211 is located in front of the focal plane 320 (or to the left of the focal plane 320 in the view shown in FIG. 3A). In some embodiments, the distance D1 may be larger than the distance d, e.g., when the reflector 211 is located behind the focal plane 320 (or to the right of the focal plane 320 in the view shown in FIG. 3A). In these two embodiments, the focal length f of a lens fabricated based on the patterned recording medium layer 210 (also referred to as a sample focal length f) may depend on the recoding wavelength $\lambda 0$, an operating wavelength A (that is a wavelength of a beam incident onto the fabricated lens when the lens is implemented in an application), and the distance D1 between the substrate 205 and the reflector 211. In some embodiments, when the reflector 211 is disposed within a predetermined distance (e.g., ±5% of distanced) from the focal plane 320, the reflector 211 may be deemed as being disposed adjacent the focal plane 320. For illustrative and discussion purposes, the distance D1 is presumed to be the same as the distance d, meaning that the reflector 211 is located at the focal plane 320. The distance d between the substrate 205 and the focal plane 320 of the master lens 315 (or the distance D1 between the substrate 205 and the reflector 211) may be equal to or smaller than the focal length $f_0$ of the master lens 315. For example, the sample focal length f may be proportional to the recoding wavelength $\lambda_0$ and the distance d, and inversely proportional to the operating wavelength A. When the recoding wavelength $\lambda_0$ and the operating wavelength $\lambda$ are fixed, as the distance d between the substrate 205 and the focal plane 320 of the master lens 315 (or between the substrate 205 and the reflector 211) decreases, the power to which the recording medium layer 210 is exposed may increase, and the sample focal length f may decrease. That is, an optical power of the lens fabricated based on the patterned recording medium layer 210 may increase. Thus, through changing the distance d between the substrate 205 and the focal plane 320 of the master lens 315 (or changing the distance D1 between the substrate 205 and the reflector 211), e.g., via the movable stage 209 on which the substrate 205 is mounted, lenses with different optical powers may be fabricated based on the patterned recording medium layer 210. Compared to conventional technologies, the build space and build cost of the disclosed system may be reduced, and the complexity of reconfiguring the disclosed system for fabricating various LCPH lenses with different optical powers (e.g., positive optical powers for RHCP input beams) may be significantly reduced.

Figure 3B:
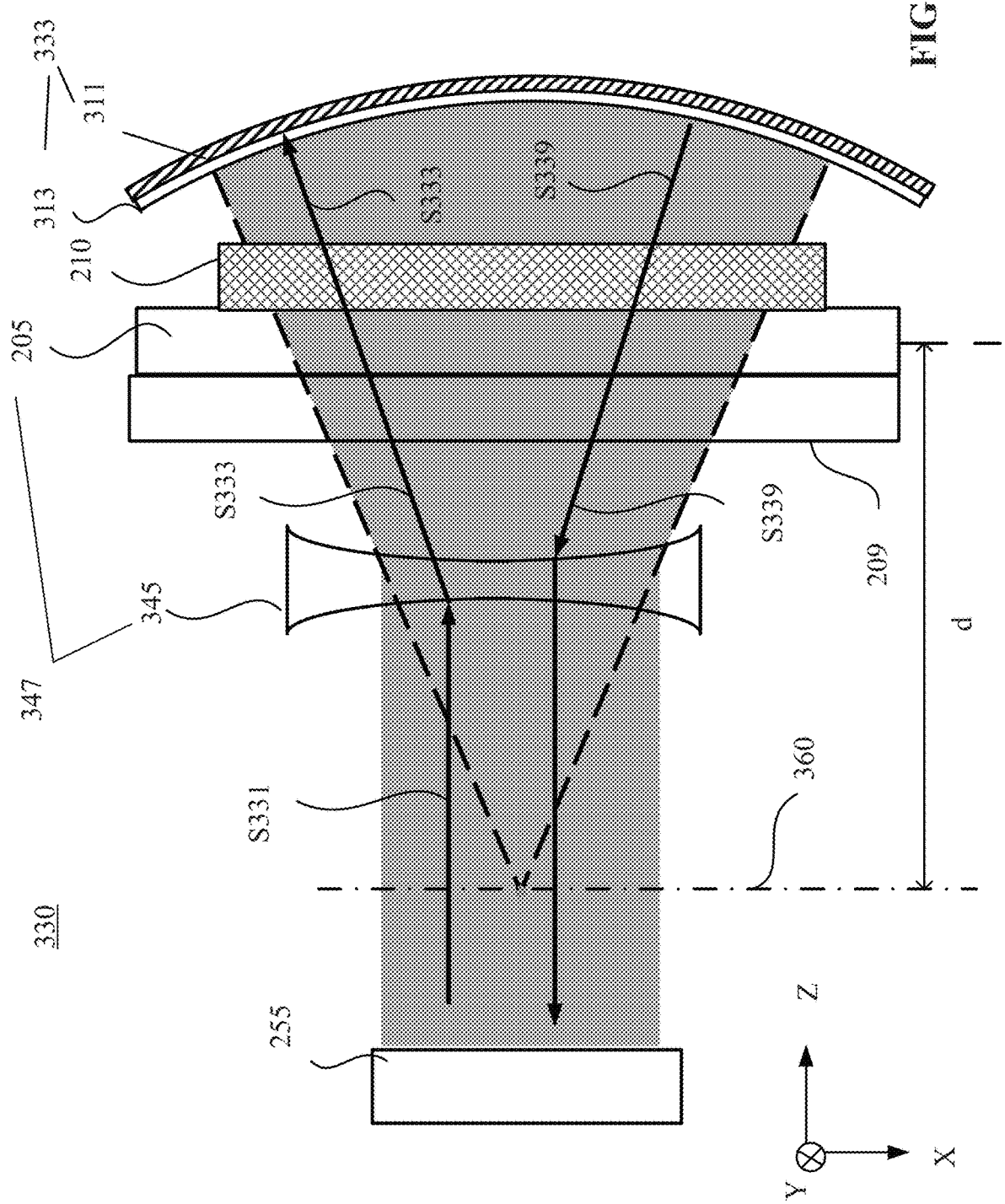
FIG. 3B schematically illustrates a system for generating a polarization interference, according to an embodiment of the present disclosure.

FIG. 3B schematically illustrates an X-Z sectional view of a system 330 configured to generate a polarization interference pattern and record the polarization interference pattern in the recording medium layer 210, according to an embodiment of the present disclosure. The system 330 may include elements, structures, and/or functions that are the same as or similar to those included in the system 200 shown in FIG. 2A, the system 230 shown in FIG. 2B, the system 250 shown in FIG. 2C, or the system 300 shown in FIG. 3A. Descriptions of the same or similar elements, structures, and/or functions can refer to the above descriptions rendered in connection with FIG. 2A, FIG. 2B, FIG. 2C, or FIG. 3A.

As shown in FIG. 3B, the system 330 may include the light outputting element 255, a lens assembly 347, a waveplate 313, and a reflector 311 arranged in an optical series. The waveplate 313 and the reflector 311 may form a reflective assembly 333. The waveplate 213 may be disposed between the lens assembly 347 and the reflector 311. The lens assembly 347 may be disposed between the light outputting element 255 and the reflective assembly 333. The lens assembly 347 may include a master lens 345 and the substrate 205, on which the recording medium layer 210 is disposed. In the embodiment shown in FIG. 3B, the substrate 205 is shown as a flat substate for illustrative purpose. The waveplate 313 may be disposed between the master lens 345 and the reflector 311, or between the substrate 205 and the reflector 211. The recording medium layer 210 may be disposed at a side of the substate 205 facing the waveplate 313, or a side of the substate 205 facing the master lens 345. In the embodiment shown in FIG. 3B, for illustrative purpose, the recording medium layer 210 is shown as being disposed at a side of the substate 205 facing the waveplate 313. In some embodiments, the reflector 311 may be a retro-reflector, which may be configured to reflect a beam with minimum scattering. The waveplate 313 may be similar to the waveplate 213 shown in FIG. 2A, FIG. 2B, and FIG. 3A. The reflector 311 may be similar to the reflector 211 shown in FIG. 2A, FIG. 2B, and FIG. 3A. Descriptions of the waveplate 313 and the reflector 311 can refer to the above descriptions rendered in connection with FIG. 2A, FIG. 2B, and FIG. 3A.

In the embodiment shown in FIG. 3B, the master 345 may be a diverging spherical lens (also referred to as a concave lens). The master 345 may be configured to diverge or defocus a collimated circularly polarized beam (e.g., RHCP beam) S331 output from the light outputting element 255 as a first circularly polarized beam (e.g., an RHCP beam) S333 having a first wavefront (e.g., a first spherical wavefront). The first circularly polarized beam (e.g., RHCP beam) S333 may be a divergent beam. The first wavefront (e.g., first spherical wavefront) may be a divergent wavefront. The first circularly polarized beam (e.g., RHCP beam) S333 having the first wavefront (e.g., the first spherical wavefront) may be referred to as a first recording beam S333.

The waveplate (e.g., QWP) 313 and the reflector 311 included in the reflective assembly 333 may be configured to receive the first circularly polarized beam (e.g., RHCP beam) S333 output from the master lens 345, and reflect back toward the master lens 345 a second circularly polarized beam (e.g., an RHCP beam) S339. For example, the waveplate (e.g., QWP) 313 may be configured to transmit the first circularly polarized beam (e.g., RHCP beam) S333 as a first linearly polarized beam (e.g., an s-polarized beam) (not shown in FIG. 3B) toward the reflector 311. The first linearly polarized beam (e.g., an s-polarized beam) may have the first wavefront (e.g., first spherical wavefront).

The waveplate 313 and the reflector 311 may be configured to have curved shapes. For example, as shown in FIG. 3B, the reflector 311 may be configured with a curved reflective surface, such as a concave mirror. In some embodiments, the waveplate (e.g., QWP) 313 may be configured with a shape that substantially matches with the shape of the reflector 311. In the embodiment shown in FIG. 3B, the reflector 311 may be configured with a shape that substantially matches with the shape of the first wavefront (e.g., divergent wavefront) of the first circularly polarized beam S333 or the first linearly polarized beam, such that the reflector 311 may retro-reflect the first linearly polarized beam (e.g., s-polarized beam) back to toward the waveplate 313 as a second linearly polarized beam (e.g., a p-polarized beam) (not shown in FIG. 3B).

In some embodiments, the second linearly polarized beam propagating from the reflector 311 toward the waveplate 313 may have a second wavefront (e.g., a second spherical wavefront) substantially matching with the first wavefront (e.g., first spherical wavefront) of the first linearly polarized beam or the first circularly polarized beam S333. The second wavefront (e.g., second spherical wavefront) may be a divergent wavefront. For example, the second wavefront (e.g., second spherical wavefront) of the second linearly polarized beam may be substantially the same as the first wavefront (e.g., first spherical wavefront) of the first linearly polarized beam or the first circularly polarized beam S333. The waveplate 313 may be configured to transmit the second linearly polarized beam (e.g., p-polarized beam) as a second circularly polarized beam (e.g., an RHCP beam) S339 having the second wavefront (e.g., second spherical wavefront). The second circularly polarized beam (e.g., RHCP beam) S339 having the second wavefront (e.g., second spherical wavefront) may be referred to as a second recording beam S339. The first recording beam S333 and the second recording beam S339 may propagate toward the recording medium layer 210 from two different sides (e.g., opposite sides) of the recording medium layer 210, which may be disposed within a beam interference zone (not labelled, which is similar to the beam interference zone 214). The first recording beam S333 and the second recording beam S339 may interference with one another in the beam interference zone to generate a polarization interference pattern, to which the recording medium layer 210 is exposed.

As the substate 205 is a flat substate, a virtual focal plane 360 of the lens assembly 347 may be substantially the same as a virtual focal plane of the master lens 345, and the focal length of the lens assembly 347 may be substantially the same as the focal length of the master lens 345. For discussion purposes, both of the virtual focal plane of the lens assembly 347 and the virtual focal plane of the master lens 345 may be referred to as 360. In some embodiments, a focal length f of a lens fabricated based on the patterned recording medium layer 210 (or sample focal length f) may depend on the recoding wavelength $\lambda_0$, an operating wavelength A (that is a wavelength of a beam incident onto the fabricated lens when the lens is implemented in an application), and a distance d between the substrate 205 and the virtual focal plane 360 of the master lens 345. For example, the sample focal length f may be proportional to recoding wavelength $\lambda_0$ and the distance d, and inversely proportional to the operating wavelength A.

When the recoding wavelength $\lambda_0$ and the operating wavelength A are fixed, as the distance d decreases, the sample focal length f may decrease. That is, an optical power of the lens fabricated based on the patterned recording medium layer 210 may increase. Thus, through changing the distance d between the substrate 205 and the virtual focal plane 360 of the master lens 345, e.g., via the movable stage 209 on which the substrate 205 is mounted, lenses with different optical powers may be fabricated based on the patterned recording medium layer 210. The system 330 shown in FIG. 3B may provide an expanded recording area for the recording medium layer 210. Compared to conventional technologies, the build space and build cost of the disclosed system may be reduced, and the complexity of reconfiguring the disclosed system for fabricating various LCPH lenses with different optical powers (e.g., negative optical powers for RHCP input beams) may be significantly reduced.

Figure 4A:
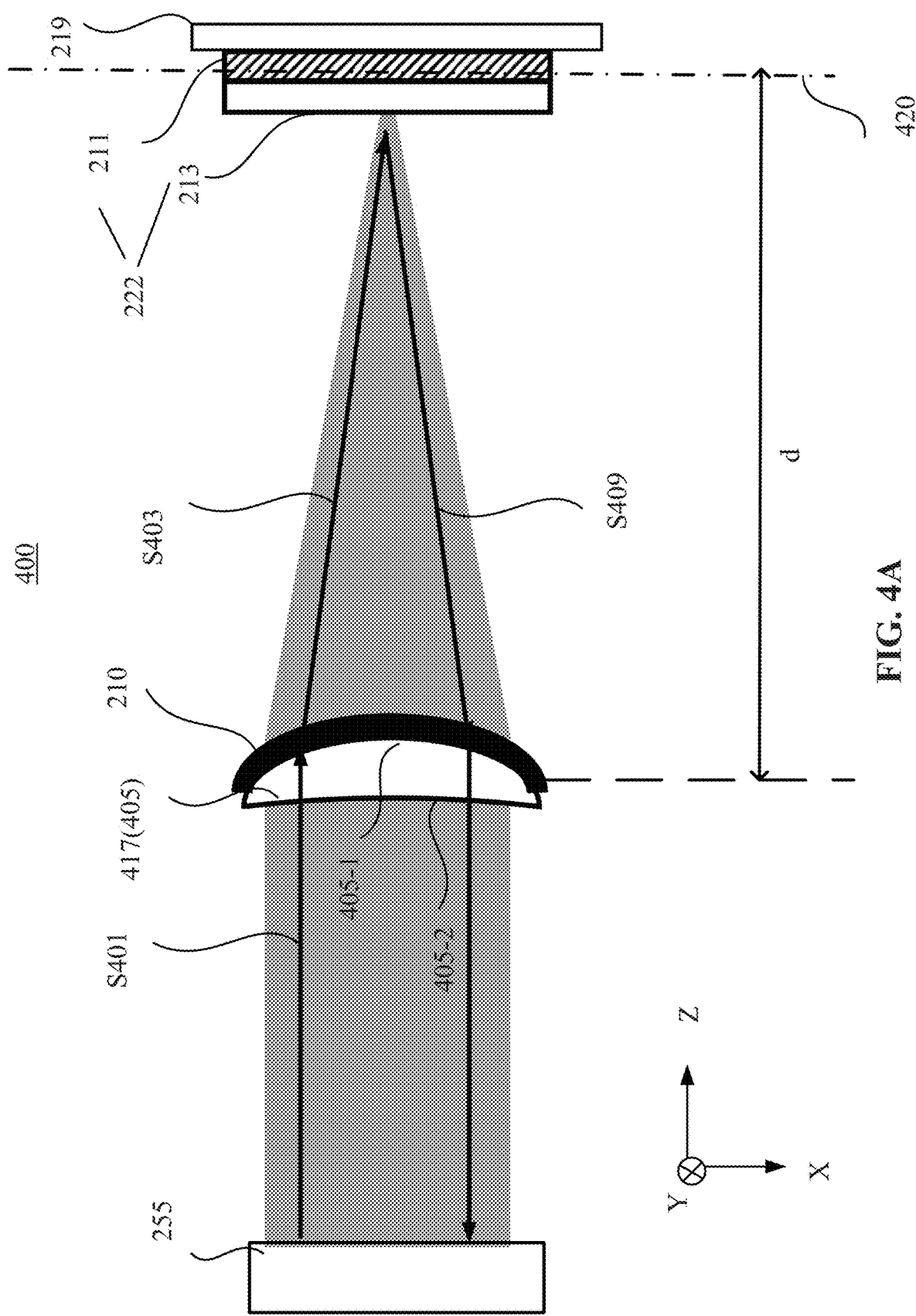
FIG. 4A schematically illustrates a system for generating a polarization interference, according to an embodiment of the present disclosure.

FIG. 4A schematically illustrates an X-Z sectional view of a system 400 configured to generate a polarization interference pattern and record the polarization interference pattern in the recording medium layer 210, according to an embodiment of the present disclosure. The system 400 may include elements, structures, and/or functions that are the same as or similar to those included in the system 200 shown in FIG. 2A, the system 230 shown in FIG. 2B, the system 250 shown in FIG. 2C, the system 300 shown in FIG. 3A, or the system 330 shown in FIG. 3B. Descriptions of the same or similar elements, structures, and/or functions can refer to the above descriptions rendered in connection with FIG. 2A, FIG. 2B, FIG. 2C, FIG. 3A, or FIG. 3B.

As shown in FIG. 4A, the system 400 may include the light outputting element 255, a lens assembly 417, the waveplate 213, and the reflector 211 arranged in an optical series. The waveplate 213 and the reflector 211 may form the reflective assembly 222. The waveplate 213 may be disposed between the lens assembly 417 and the reflector 211. The lens assembly 417 may be disposed between the light outputting element 255 and the reflective assembly 222. The lens assembly 417 may not include a flat substrate. Instead, the lens assembly 417 may include a converging lens 405, which also functions as a substrate to support the recording medium layer 210 during a recording process. The recording medium layer 210 may be disposed at a surface of the lens 405. The lens 405 may be any suitable lens, such as a spherical lens, an aspherical lens, a cylindrical lens, or a freeform lens, etc. In other words, the lens 405 may provide lens function similar to the master lens 315 shown in FIG. 3A.

The lens 405 may have a first surface 405-1 at one side, and a second surface 405-2 at an opposite side. The recording medium layer 210 may be disposed at the first surface 405-1. The first surface 405-1 may face the waveplate 213. That is, the recording medium layer 210 may be disposed at the side of the lens 405 facing the waveplate 213. At least one of the first surface 405-1 or the second surface 405-2 of the lens 405 may be a curved surface. In the embodiment shown in FIG. 4A, the lens 405 may have a focal plane 420. The focal plane 420 of the lens 405 may be substantially the same as a focal plane of the lens assembly 417, and the focal length of the lens 405 may be substantially the same as the focal length the lens assembly 417. For discussion purposes, both of the focal plane of the lens assembly 417 and the focal plane of the lens 405 may be referred to as 420, and both of the focal length of the lens assembly 417 and the focal length of the lens 405 may be referred to as $f_0$. The reflector 211 may be disposed at or adjacent the focal plane 420 of the lens 405. A distance between the reflector 211 and the lens 405 may be substantially equal to the focal length $f_0$ of the lens 405. In some embodiments, the reflector 211 may be mounted on the movable stage 219. The movable stage 219 may be translatable and/or rotatable. Although not shown in FIG. 4A, in some embodiments, the lens 405 (and the recording medium 210 mounted thereon) may be mounted on a movable stage, similar to the movable stage 209 shown in FIG. 2B.

The lens 405 may be configured to converge or focus a collimated circularly polarized beam (e.g., RHCP beam) S401 output from the light outputting element 255 as a first circularly polarized beam (e.g., an RHCP beam) S403 having a first wavefront (e.g., a first spherical wavefront). The first circularly polarized beam (e.g., RHCP beam) S403 may be a convergent beam. The first wavefront (e.g., first spherical wavefront) may be a convergent wavefront. The first circularly polarized beam (e.g., RHCP beam) S403 having the first wavefront (e.g., the first spherical wavefront) may be referred to as a first recording beam S403. The waveplate (e.g., QWP) 213 and the reflector 211 may be configured to receive the first circularly polarized beam (e.g., RHCP beam) S403 from the lens 405, and reflect back toward the lens 405 a second circularly polarized beam (e.g., an RHCP beam) S409. The polarization conversions of the first circularly polarized beam (e.g., RHCP beam) S403 when propagating through the waveplate (e.g., QWP) 213 toward the reflector 211, when reflected by the reflector 211 back to the waveplate (e.g., QWP) 213, and when propagating through the waveplate (e.g., QWP) 213 toward the lens 405 are not explained in detail. Descriptions of the polarization conversions of the first circularly polarized beam (e.g., RHCP beam) S403 can refer to the above descriptions rendered in connection with FIG. 2A, FIG. 2B, FIG. 2C, FIG. 3A, or FIG. 3B.

The second circularly polarized beam (e.g., RHCP beam) S409 may have a second wavefront (e.g., a second spherical wavefront) substantially matching with the first wavefront (e.g., first spherical wavefront) of the first circularly polarized beam (e.g., RHCP beam) S403. The second wavefront (e.g., second spherical wavefront) may be a convergent wavefront. For example, the second wavefront (e.g., second spherical wavefront) may be substantially the same as the first wavefront (e.g., first spherical wavefront). The second circularly polarized beam (e.g., RHCP beam) S409 may be referred to as a second recording beam S409. The first recording beam S403 and the second recording beam S409 may propagate toward the recording medium layer 210 from two different sides (e.g., opposite sides) of the recording medium layer 210. The first recording beam S403 and the second recording beam S409 may interference with one another in the beam interference zone (not labelled, similar to the beam interference zone 214) to generate a polarization interference pattern, to which the recording medium layer 210 is exposed.

A focal length f of a lens fabricated based on the patterned recording medium layer 210 (or a sample focal length f) may depend on the recoding wavelength $\lambda_0$, an operating wavelength A (that is a wavelength of a beam incident onto the fabricated lens when the lens is implemented in an application), a radius of curvature $r_1$ of the first surface 405-1 of the lens 405, a radius of curvature $r_1$ of the second surface 405-2 of the lens 405, and a distance d between the lens 405 and the focal plane 420 of the lens 405 (or between the lens 405 and the reflector 211). The recoding medium layer 210 may be disposed at the first surface 405-1 of the lens 405, and the radius of curvature $r_1$ of the first surface 405-1 of the lens 405 may also be referred to as a radius of curvature r of a sample surface. In the embodiment shown in FIG. 4A, the first surface 405-1 of the lens 405 may be a curved surface (e.g., convex surface), and the second surface 405-2 of the lens 405 may be a flat surface. The radius of curvature $r_2$ of the second surface 405-2 of the lens 405 may be infinity. In such an embodiment, the sample focal length f may depend on the recoding wavelength $\lambda_0$, the operating wavelength), the radius of curvature r of the sample surface, and the distance d between the lens 405 and the focal plane 420 of the lens 405 (or between the lens 405 and the reflector 211). For example, the sample focal length f may be calculated as $f=d*\lambda_0*r/[2*\lambda*(r+d)]$. In some embodiments, when the recoding wavelength $\lambda_0$ and the operating wavelength A are fixed, through changing the radius of curvature r of the sample surface (e.g., the radius of curvature $r_1$ of the first surface of the lens 405 and/or the radius of curvature $r_2$ of the second surface of the lens 405), lenses with different optical powers may be fabricated based on the patterned recording medium layer 210. Compared to conventional technologies, the build space and build cost of the disclosed system may be reduced, and the complexity of reconfiguring the disclosed system for fabricating various LCPH lenses with different optical powers (e.g., positive optical powers for RHCP input beams) may be significantly reduced.

Figure 4B:
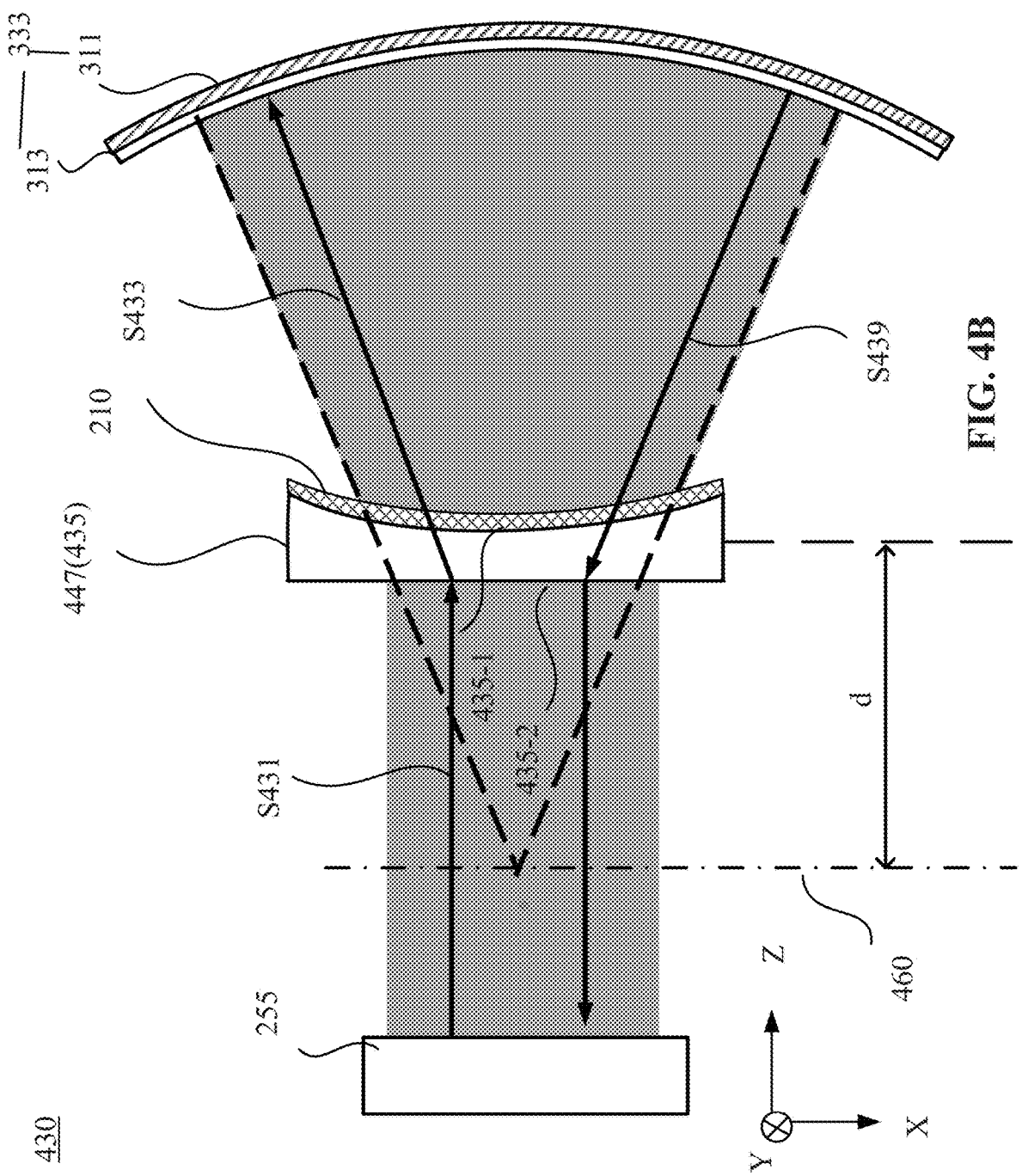
FIG. 4B schematically illustrates a system for generating a polarization interference, according to an embodiment of the present disclosure.

FIG. 4B schematically illustrates an X-Z sectional view of a system 430 configured to generate a polarization interference pattern and record the polarization interference pattern in the recording medium layer 210, according to an embodiment of the present disclosure. The system 400 may include elements, structures, and/or functions that are the same as or similar to those included in the system 200 shown in FIG. 2A, the system 230 shown in FIG. 2B, the system 250 shown in FIG. 2C, the system 300 shown in FIG. 3A, the system 330 shown in FIG. 3B, or the system 400 shown in FIG. 4A. Descriptions of the same or similar elements, structures, and/or functions can refer to the above descriptions rendered in connection with FIG. 2A, FIG. 2B, FIG. 2C, FIG. 3A, FIG. 3B, or FIG. 4A.

As shown in FIG. 4B, the system 430 may include the light outputting element 255, a lens assembly 447, the waveplate 313, and the reflector 311 arranged in an optical series. The waveplate 313 may be disposed between the lens assembly 447 and the reflector 311. The waveplate 313 and the reflector 311 may form the reflective assembly 333. The lens assembly 447 may be disposed between the light outputting element 255 and the reflective assembly 333. The lens assembly 447 may include one lens, e.g., a diverging lens 435, which also functions as a substrate for supporting the recording medium layer 210 disposed thereon. For example, the recording medium layer 210 may be disposed at a surface of the diverging lens 435. The lens 435 may be any suitable lens, such as a spherical lens, an aspherical lens, a cylindrical lens, or a freeform lens, etc. In this embodiment, the lens 435 on which the recording medium layer 210 is disposed may function as a master lens (similar to the master lens 345 shown in FIG. 3B) to diverge an input beam.

The lens 435 may have a first surface 435-1 on which the recording medium layer 210 is disposed, and a second surface 435-2 opposite to the first surface. The first surface 435-1 of the lens 435 may face the waveplate 313. That is, the recording medium layer 210 may be disposed at a side of the lens 435 facing the waveplate 313. At least one of the first surface 435-1 or the second surface 435-2 of the lens 435 may be a curved surface. In the embodiment shown in FIG. 4B, the lens 435 may have a virtual focal plane 460. The virtual focal plane 460 of the lens 435 may be substantially the same as a virtual focal plane of the lens assembly 447, and the focal length of the lens 435 may be substantially the same as the focal length the lens assembly 447. For discussion purposes, both of the virtual focal plane of the lens assembly 447 and the virtual focal plane of the lens 435 may be referred to as 460, and both of the focal length of the lens assembly 447 and the focal length of the lens 435 may be referred to as $f_0$.

As shown in FIG. 4B, the lens 435 may be configured to diverge or defocus a collimated circularly polarized beam (e.g., RHCP beam) S431 output from the light outputting element 255 as a first circularly polarized beam (e.g., an RHCP beam) S433 having a first wavefront (e.g., a first spherical wavefront). The first circularly polarized beam (e.g., RHCP beam) S433 may be a divergent beam. The first wavefront (e.g., first spherical wavefront) may be a divergent wavefront. The first circularly polarized beam (e.g., RHCP beam) S433 having the first wavefront (e.g., the first spherical wavefront) may be referred to as a first recording beam S433. The waveplate (e.g., QWP) 313 and the reflector 311 together may be configured to receive the first circularly polarized beam (e.g., RHCP beam) S433 from the lens 435, and output a second circularly polarized beam (e.g., an RHCP beam) S439 back toward the lens 435. The polarization conversions of the first circularly polarized beam (e.g., RHCP beam) S433 when propagating through the waveplate (e.g., QWP) 313 toward the reflector 311, when reflected by the reflector 311 back to the waveplate (e.g., QWP) 313, and when propagating through the waveplate (e.g., QWP) 313 toward the lens 435 are not explained in detail. Descriptions of the polarization conversions of the first circularly polarized beam (e.g., RHCP beam) S433 can refer to the above descriptions rendered in connection with FIG. 2A, FIG. 2B, FIG. 2C, FIG. 3A, or FIG. 3B.

In the embodiment shown in FIG. 4B, the reflector 311 may be configured with a shape that substantially matches with the shape of the first wavefront (e.g., a divergent wavefront) of the first circularly polarized beam S433, such that the reflector 311 may retro-reflect a linearly polarized beam incident onto the reflector 311. Thus, the second circularly polarized beam (e.g., RHCP beam) S439 may have a second wavefront (e.g., a second spherical wavefront) substantially matching with the first wavefront (e.g., first spherical wavefront) of the first circularly polarized beam (e.g., RHCP beam) S433. For example, the second wavefront (e.g., second spherical wavefront) may be substantially the same as the first wavefront (e.g., first spherical wavefront). The second wavefront (e.g., second spherical wavefront) may be a divergent wavefront. The second circularly polarized beam (e.g., RHCP beam) S439 may be referred to as a second recording beam S439. The first recording beam S433 and the second recording beam S439 may propagate toward the recording medium layer 210 from two different sides of the recording medium layer 210. The recording medium layer 210 may be disposed within a beam interference zone (not labelled, similar to the beam interference zone 214). The first recording beam S433 and the second recording beam S439 may interference with one another in the beam interference zone to generate a polarization interference pattern, to which the recording medium layer 210 is exposed. The polarization interference pattern may be recorded in the recording medium layer 210.

A focal length f of a lens fabricated based on the patterned recording medium layer 210 (or a sample focal length f) may depend on the recoding wavelength $\lambda_0$, an operating wavelength $\lambda$ (that is a wavelength of a beam incident onto the fabricated lens), a radius of curvature $r_1$ of the first surface 435-1 of the lens 435, a radius of curvature $r_2$ of the second surface 435-2 of the lens 435, and a distance d between the lens 435 and the virtual focal plane 460 of the lens 435. The recoding medium layer 210 may be disposed at the first surface 435-1 of the lens 435, and the radius of curvature $r_1$ of the first surface 435-1 of the lens 435 may also be referred to as a radius of curvature r of a sample surface. In the embodiment shown in FIG. 4B, the first surface 435-1 of the lens 435 may be a curved surface (e.g., a concave surface), and the second surface 435-1 of the lens 435 may be a flat surface. The radius of curvature $r_2$ of the second surface of the lens 435 may be infinity. In such an embodiment, the sample focal length f may depend on the recoding wavelength $\lambda_0$, the operating wavelength), the radius of curvature r of the sample surface, and the distance d between the lens 435 and the virtual focal plane 460 of the lens 435. For example, the focal length f of a lens fabricated based on the patterned recording medium layer 210 may be calculated as $f=d*\lambda_0*r/[2*\lambda*(r+d)]$. In some embodiments, when the recoding wavelength $\lambda_0$ and the operating wavelength $\lambda$ are fixed, through changing the radius of curvature r of the sample surface (e.g., the radius of curvature $r_1$ of the first surface of the lens 435 and/or the radius of curvature $r_2$ of the second surface of the lens 435), lenses with different optical powers may be fabricated based on the patterned recording medium layer 210. Compared to conventional technologies, the build space and build cost of the disclosed system may be reduced, and the complexity of reconfiguring the disclosed system for fabricating various LCPH lenses with different optical powers (e.g., negative optical powers for RHCP input beams) may be significantly reduced.

Figure 5A:
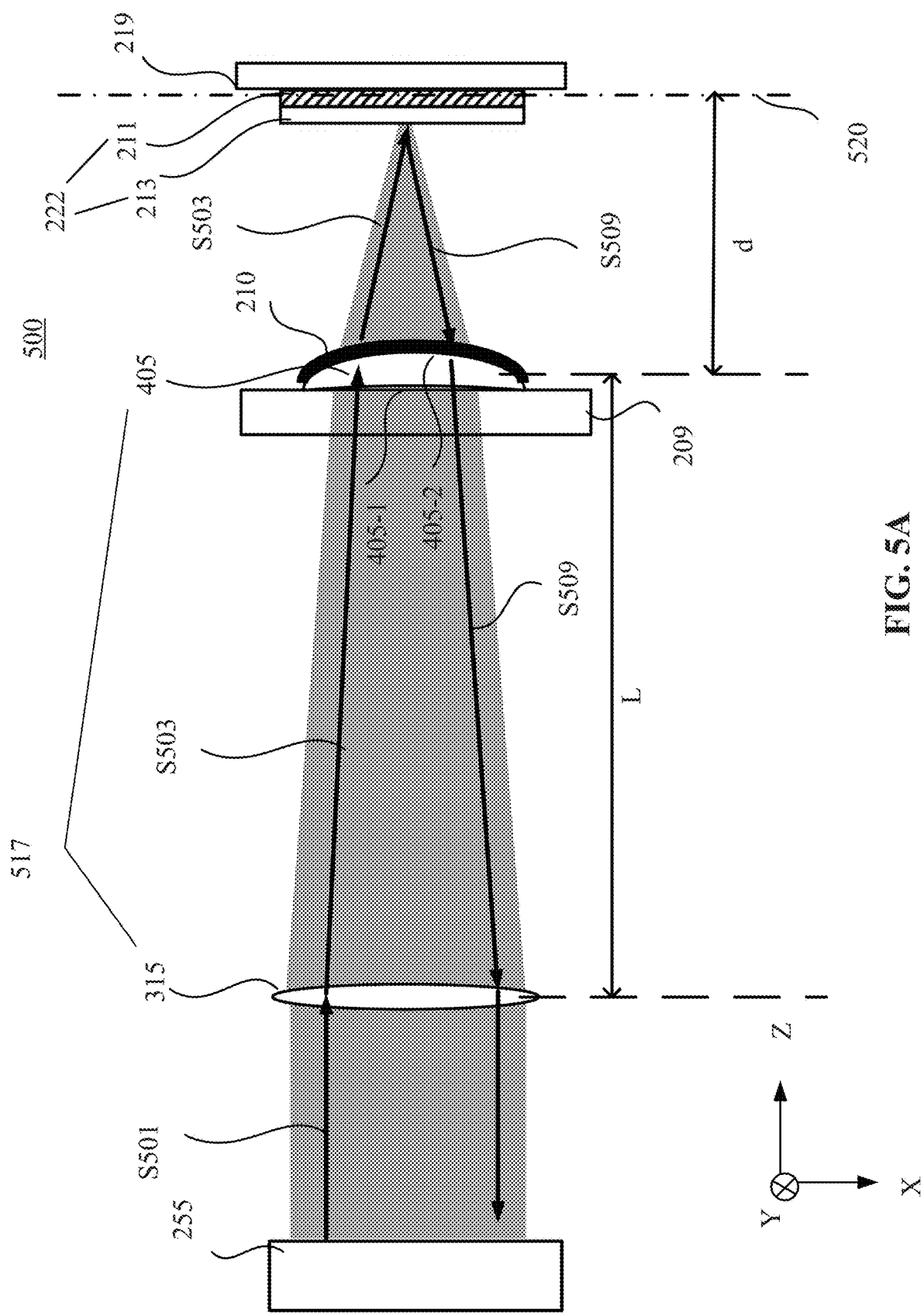
FIG. 5A schematically illustrates a system for generating a polarization interference, according to an embodiment of the present disclosure.
Figure 5B:
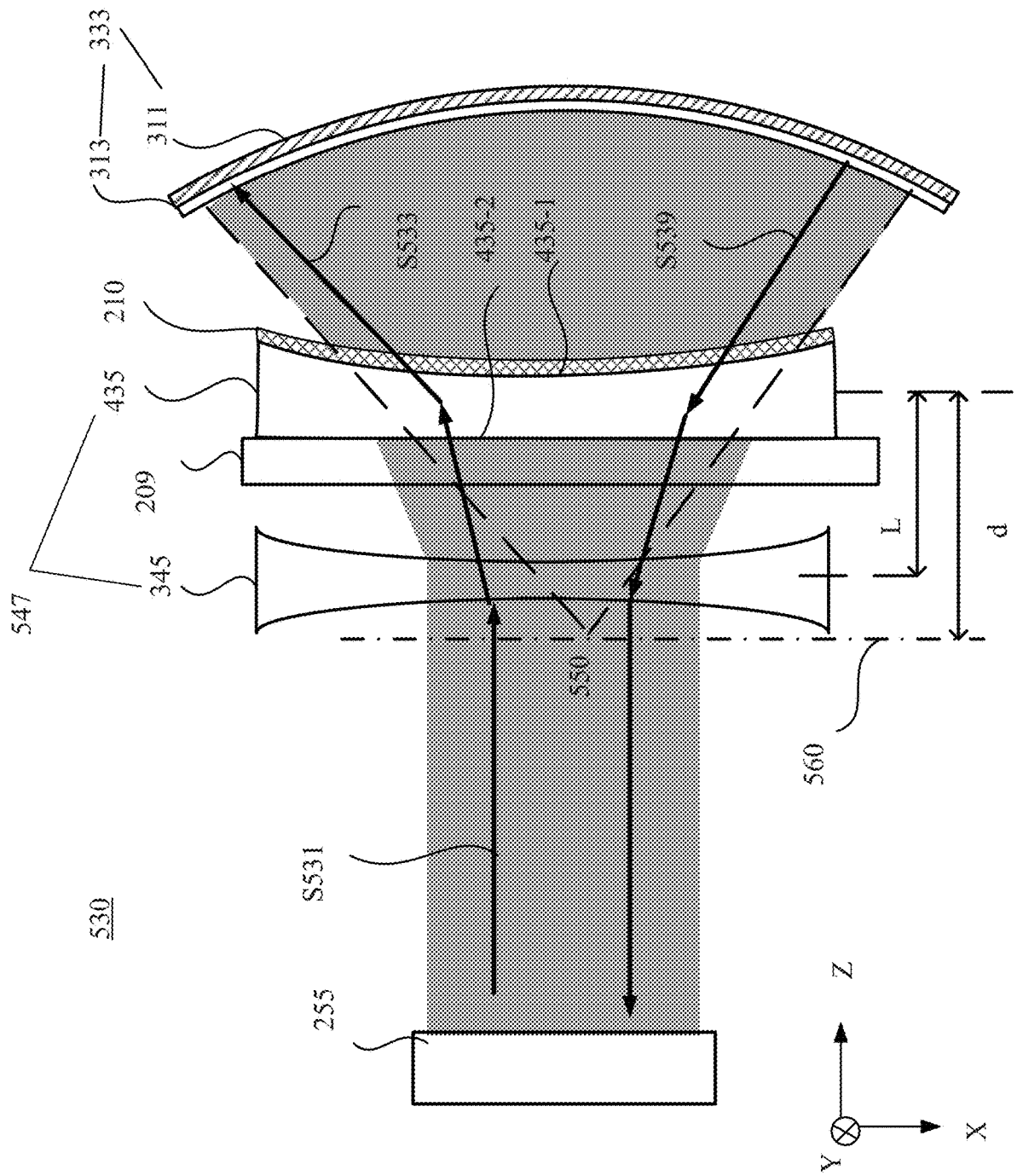
FIG. 5B schematically illustrates a system for generating a polarization interference, according to an embodiment of the present disclosure.

FIG. 5A schematically illustrates an X-Z sectional view of a system 500 configured to generate a polarization interference pattern and record the polarization interference pattern in the recording medium layer 210, according to an embodiment of the present disclosure. FIG. 5B schematically illustrates an X-Z sectional view of a system 530 configured to generate a polarization interference pattern and record the polarization interference pattern in the recording medium layer 210, according to an embodiment of the present disclosure. The system 500 or 530 may include elements, structures, and/or functions that are the same as or similar to those included in the system 200 shown in FIG. 2A, the system 230 shown in FIG. 2B, the system 250 shown in FIG. 2C, the system 300 shown in FIG. 3A, the system 330 shown in FIG. 3B, the system 400 shown in FIG. 4A, or the system 430 shown in FIG. 4B. Descriptions of the same or similar elements, structures, and/or functions can refer to the above descriptions rendered in connection with FIG. 2A, FIG. 2B, FIG. 2C, FIG. 3A, FIG. 3B, FIG. 4A, or FIG. 4B. Each of the system 500 shown in FIG. 5A and the system 530 shown in FIG. 5B may include a lens assembly configured to generate a divergent or convergent beam. The lens assembly may include a master lens and a curved substrate on which the recording medium layer 210 is disposed. The positions of the master lens and the curved substrate may be exchangeable. In some embodiments, the lens assembly may include more than one master lenses.

As shown in FIG. 5A, the system 500 may include the light outputting element 255, a lens assembly 517, the waveplate 213, and the reflector 211 arranged in an optical series. The waveplate 213 and the reflector 211 may be form the reflective assembly 222. The lens assembly 517 may be disposed between the light outputting element 255 and the reflective assembly 222. The lens assembly 517 may include a first lens (e.g., the master lens 315) and a second lens (e.g., the lens 405 that also functions as a substrate for supporting the recording medium layer 210 disposed thereon). The lens 405 may be disposed between the master lens 315 and the waveplate 213. The recording medium layer 210 may be disposed at a side of the lens 405 facing the waveplate 213, e.g., the second surface 405-2 of the lens 405. In the embodiment shown in FIG. 5A, the master lens 315 may be a converging lens, and the lens 405 may also be a converging lens. The lens assembly 517 may be a converging lens assembly having a focal plane 520. In some embodiments, the reflector 211 may be configured to be disposed at or adjacent the focal plane 520. When the reflector 211 is disposed within a predetermined distance from the focal plane 520, the reflector 211 may be regarded as being disposed adjacent the focal plane 520. In some embodiments, the predetermined distance may be ±5% of the distance d. In some embodiments, the reflector 211 may be mounted on the movable stage 219. The movable stage 219 may be translatable and/or rotatable to adjust a position and/or rotation of the reflector 211. As the position of the focal pane 520 changes, the position of the reflector 211 may be changed accordingly, e.g., via the movable stage 219. In some embodiments, the lens 405 on which the recording medium layer 210 is disposed may be mounted on the movable stage 209. The movable stage 209 may be translatable and/or rotatable to adjust a position and/or rotation of the lens 405 on which the recording medium layer 210 is disposed. For example, a distance L between the lens 405 and the master lens 315 may be adjustable via, e.g., the movable stage 209 on which the lens 405 is mounted.

The lens assembly 517 may be configured to converge or focus a collimated circularly polarized beam (e.g., RHCP beam) S501 output from the light outputting element 255 as a first circularly polarized beam (e.g., an RHCP beam) S503 having a first wavefront (e.g., a first spherical wavefront). The first circularly polarized beam (e.g., RHCP beam) S503 may be a convergent beam. The first wavefront (e.g., first spherical wavefront) may be a convergent wavefront. The first circularly polarized beam (e.g., RHCP beam) S503 having the first wavefront (e.g., the first spherical wavefront) may be referred to as a first recording beam S503. The waveplate (e.g., QWP) 213 and the reflector 211 together may be configured to receive the first circularly polarized beam (e.g., RHCP beam) S503 from the substrate 405, and output a second circularly polarized beam (e.g., an RHCP beam) S509 back toward the substate 405. The polarization conversions of the first circularly polarized beam (e.g., RHCP beam) S503 when propagating through the waveplate (e.g., QWP) 213 toward the reflector 211, when reflected by the reflector 211 back to the waveplate (e.g., QWP) 213, and when propagating through the waveplate (e.g., QWP) 213 toward the substate 405 are not explained in detail. Descriptions of the polarization conversions of the first circularly polarized beam (e.g., RHCP beam) S503 can refer to the above descriptions rendered in connection with FIG. 2A, FIG. 2B, FIG. 2C, FIG. 3A, or FIG. 3B.

The second circularly polarized beam (e.g., RHCP beam) S509 may have a second wavefront (e.g., a second spherical wavefront) substantially matching with the first wavefront (e.g., first spherical wavefront) of the first circularly polarized beam (e.g., RHCP beam) S503. The second wavefront (e.g., second spherical wavefront) may be a convergent wavefront. For example, the second wavefront (e.g., second spherical wavefront) may be substantially the same as the first wavefront (e.g., first spherical wavefront). The second circularly polarized beam (e.g., RHCP beam) S509 may be referred to as a second recording beam S509. The first recording beam S503 and the second recording beam S509 may propagate toward the recording medium layer 210 from two different sides (e.g., opposite sides) of the recording medium layer 210. The first recording beam S503 and the second recording beam S509 may interference with one another in a beam interference zone (not labelled, similar to the beam interference zone 214) to generate a polarization interference pattern, to which the recording medium layer 210 is exposed. The polarization interference pattern may be recorded in the recording medium layer 210.

In some embodiments, a focal length f of a lens fabricated based on the patterned recording medium layer 210 (or a sample focal length f) may depend on the recoding wavelength $\lambda_0$, an operating wavelength A (that is a wavelength of an interfering beam), a radius of curvature $r_1$ of the first surface 405-1 of the substate 405, a radius of curvature $r_2$ of the second surface 405-2 of the substate 405, and a distance d between the lens 405 and the focal plane 520 of the lens assembly 517 (or between the lens 405 and the reflector 211). The recoding medium layer 210 may be disposed at the first surface 405-1 of the lens 405, and the radius of curvature $r_1$ of the first surface 405-1 of the substate 405 may also be referred to as a radius of curvature r of a sample surface. In the embodiment shown in FIG. 5A, the first surface 405-1 of the substate 405 may be a curved surface, and the second surface 405-2 of the substate 405 may be a flat surface. The radius of curvature $r_2$ of the second surface 405-2 of the substate 405 may be regarded as infinity. In such an embodiment, the sample focal length f may depend on the recoding wavelength $\lambda_0$, the operating wavelength), the radius of curvature r of the sample surface, and the distance d between the lens 405 and the focal plane 520 of the lens assembly 517 (or the distance D1 between the lens 405 and the reflector 211). For example, in some embodiments, the sample focal length f may be calculated as $f=d*\lambda_0*r/[2*\lambda*(r+d)]$.

In some embodiments, when an optical power (or a focal length) of the lens assembly 517 is changed, the position of the focal plane 520 of the lens assembly 517 may be changed. Accordingly, the distance d between the lens 405 and the focal plane 520 of the lens assembly 517 (or between the lens 405 and the reflector 211) may be changed. Thus, when the recoding wavelength $\lambda_0$, the operating wavelength $\lambda$, and the radius of curvature r of the sample surface are fixed, the sample focal length f may be changed accordingly. Thus, through varying the optical power (or focal length) of the lens assembly 517, various lenses with different optical powers may be fabricated based on the patterned recording medium layer 210.

In some embodiments, the optical power (or focal length) of the lens assembly 517 may be adjustable through changing the distance L between the master lens 315 and the lens 405, the optical power of the master lens 315, and/or the optical power of the lens 405. For example, when the optical power of the master lens 315 and the optical power of the lens 405 are fixed, the optical power (or focal length) of the lens assembly 517 may be adjustable through changing the distance L between the master lens 315 and the lens 405. When the distance L between the master lens 315 and the lens 405, and the optical power of the lens 405 are fixed, the optical power (or focal length) of the lens assembly 517 may be adjustable through changing the optical power of the master lens 315, e.g., replacing the master lens 315 by another master lens having a different optical power. In some embodiments, the master lens 315 may have a variable optical power, e.g., the master lens 315 may have an adjustable shape. Compared to conventional technologies, the build space and build cost of the disclosed system may be reduced, and the complexity of reconfiguring the disclosed system for fabricating various LCPH lenses with different optical powers (e.g., positive optical powers for RHCP input beams) may be significantly reduced.

In the embodiment shown in FIG. 5B, the system 530 may include the light outputting element 255, a lens assembly 547, and a reflective assembly 333 disposed in an optical series. The lens assembly 547 may include a first lens (e.g., a master lens 345) and a second lens (e.g., the diverging lens 435). The reflective assembly 333 may include the waveplate 313 and the reflector 311. The lens assembly 547 may be disposed between the light outputting element 255 and the reflective assembly 333. The waveplate 313 may be disposed between the lens assembly 547 and the reflector 311. The lens 435 may also function as a substrate to support the recording medium layer 210, which may be disposed at a surface of the lens 435. The lens 435 on which the recording medium layer 210 is disposed may be disposed between the master lens 345 and the waveplate 313. The recording medium layer 210 may be disposed at a side of the lens 435 facing the waveplate 313, e.g., the first surface 435-1 of the lens 435. In the embodiment shown in FIG. 5B, the master lens 345 may be a diverging lens, and the lens 435 may also be a diverging lens. The lens assembly 547 may be a diverging lens assembly having a virtual focal plane 560 and a virtual focal point 550.

The lens assembly 547 may diverge a collimated circularly polarized beam (e.g., RHCP beam) S531 output from the light outputting element 255 as a first circularly polarized beam (e.g., an RHCP beam) S533 having a first wavefront (e.g., a first spherical wavefront). The first circularly polarized beam (e.g., RHCP beam) S533 may be a divergent beam. The first wavefront (e.g., first spherical wavefront) may be a divergent wavefront. The first circularly polarized beam (e.g., RHCP beam) S533 having the first wavefront (e.g., the first spherical wavefront) may be referred to as a first recording beam S533. The extensions of diverging rays of the first circularly polarized beam (e.g., RHCP beam) S533 may intersect at the virtual focal point 550 of the lens assembly 547.

The waveplate (e.g., QWP) 313 and the reflector 311 together may be configured to receive the first circularly polarized beam (e.g., RHCP beam) S533 from the lens 435, and output a second circularly polarized beam (e.g., an RHCP beam) S539 back toward the lens 435. The polarization conversions of the first circularly polarized beam (e.g., RHCP beam) S533 when propagating through the waveplate (e.g., QWP) 313 toward the reflector 311, when reflected by the reflector 311 back to the waveplate (e.g., QWP) 313, and when propagating through the waveplate (e.g., QWP) 313 toward the lens 435 are not explained in detail. Descriptions of the polarization conversions of the first circularly polarized beam (e.g., RHCP beam) S533 can refer to the above descriptions rendered in connection with FIG. 2A, FIG. 2B, FIG. 2C, FIG. 3A, or FIG. 3B.

In the embodiment shown in FIG. 5B, the reflector 311 may be configured with a shape that substantially matches with the shape of the first wavefront (e.g., divergent wavefront) of the first circularly polarized beam S533, such that the reflector 311 may retro-reflect a linearly polarized beam incident onto the reflector 311. Thus, the second circularly polarized beam (e.g., RHCP beam) S539 may have a second wavefront (e.g., a second spherical wavefront) substantially matching with the first wavefront (e.g., first spherical wavefront) of the first circularly polarized beam (e.g., RHCP beam) S533. The second wavefront (e.g., second spherical wavefront) may be a divergent wavefront. For example, the second wavefront (e.g., second spherical wavefront) may be substantially the same as the first wavefront (e.g., first spherical wavefront). The second circularly polarized beam (e.g., RHCP beam) S539 may be referred to as a second recording beam S539. The first recording beam S533 and the second recording beam S539 may propagate toward the recording medium layer 210 from two different sides (e.g., opposite sides) of the recording medium layer 210. The first recording beam S533 and the second recording beam S539 may interference with one another in a beam interference zone (not labelled, similar to the beam interference zone 214) to generate a polarization interference pattern, to which the recording medium layer 210 is exposed.

In some embodiments, a focal length f of a lens fabricated based on the patterned recording medium layer 210 (or a sample focal length f) may depend on the recoding wavelength $\lambda_0$, an operating wavelength A (that is a wavelength of an interfering beam), a radius of curvature $r_1$ of the first surface 435-1 of the lens 435, a radius of curvature $r_2$ of the second surface 435-2 of the lens 435, and a distance d between the lens 435 and the virtual focal plane 560 of the lens assembly 547. The recoding medium layer 210 may be disposed on the first surface 435-1 of the lens 435, and the radius of curvature $r_1$ of the first surface 435-1 of the lens 435 may also be referred to as a radius of curvature r of a sample surface. In the embodiment shown in FIG. 5B, the first surface 435-1 of the lens 435 may be a curved surface, and the second surface 435-2 of the lens 435 may be a flat surface. The radius of curvature $r_2$ of the second surface 435-2 of the lens 435 may be regarded as infinity. In such an embodiment, the sample focal length f may depend on the recoding wavelength $\lambda_0$, the operating wavelength), the radius of curvature r of the sample surface, and the distance d between the lens 435 and the virtual focal plane 560 of the lens assembly 547. For example, the sample focal length f may be calculated as $f=d*\lambda_0*r/[2*\lambda*(r+d)]$.

In some embodiments, when an optical power (or a focal length) of the lens assembly 547 is changed, the position of the virtual focal plane 560 of the lens assembly 547 may be changed. Accordingly, the distance d between the lens 435 and the virtual focal plane 560 of the lens assembly 547 may be changed. Thus, when the recoding wavelength $\lambda_0$, the operating wavelength $\lambda$, and the radius of curvature r of the sample surface are fixed, the sample focal length f may be changed accordingly. Thus, through varying the optical power (or focal length) of the lens assembly 547, various lenses with different optical powers may be fabricated based on the patterned recording medium layer 210.

In some embodiments, the optical power (or focal length) of the lens assembly 547 may be adjustable through changing the distance L between the master lens 345 and the lens 435, the optical power of the master lens 345, and/or the optical power of the lens 435. For example, when the optical power of the master lens 345 and the optical power of the lens 435 are fixed, the optical power (or focal length) of the lens assembly 547 may be adjustable through changing the distance L between the master lens 345 and the lens 435. When the distance L between the master lens 345 and the lens 435, and the optical power of the lens 435 are fixed, the optical power (or focal length) of the lens assembly 547 may be adjustable through changing the optical power of the master lens 345, e.g., replacing the master lens 345 by another master lens having a different optical power. In some embodiments, the master lens 345 may have a variable optical power, e.g., the master lens 345 may have an adjustable shape. Compared to conventional technologies, the build space and build cost of the disclosed system may be reduced, and the complexity of reconfiguring the disclosed system for fabricating various LCPH lenses with different optical powers (e.g., negative optical powers for RHCP input beams) may be significantly reduced.

A focal length f of a lens fabricated based on the patterned recording medium layer 210 may depend on the recoding wavelength $\lambda_0$, an operating wavelength A (that is a wavelength of a beam incident onto the fabricated lens), a radius of curvature $r_1$ of the first surface of the substrate 435, a radius of curvature $r_2$ of the second surface of the substrate 435, and a distance d between the lens 435 and the virtual focal plane 560 of the diverging lens assembly including the master lens 345 and the lens 435 (or distance D1 between the lens 435 and the reflector 211). In the embodiment shown in FIG. 5A, the first surface of the substrate 435 may be a curved surface (e.g., a convex surface), and the second surface of the substrate 435 may be a flat surface. The radius of curvature $r_2$ of the second surface of the substrate 435 may be regarded as infinity. In such an embodiment, the focal length f of a lens fabricated based on the patterned recording medium layer 210 may depend on the recoding wavelength $\lambda_0$, the operating wavelength), the radius of curvature $r_1$ of the first surface of the lens 435, and the distance d between the lens 435 and the virtual focal plane 560 of the diverging lens assembly including the master lens 345 and the lens 435 (or the distance D1 between the lens 435 and the reflector 211). For example, the focal length f of a lens fabricated based on the patterned recording medium layer 210 may be calculated as $f=d*\lambda_0*r_1[2*\lambda*(r_1+d)]$.

In some embodiments, when an optical power (or a focal length F) of the diverging lens assembly including the master lens 345 and the lens 435 is changed, the position of the virtual focal plane 560 of the diverging lens assembly including the master lens 345 and the lens 435 may be changed. Accordingly, the distance d between the lens 435 and the virtual focal plane 560 of the diverging lens assembly including the master lens 345 and the lens 435 (or the distance D1 between the lens 435 and the reflector 211) may be changed. Thus, the focal length f of a lens fabricated based on the patterned recording medium layer 210 may be changed accordingly, when the recoding wavelength $\lambda_0$ and the operating wavelength), the radius of curvature $r_1$ of the first surface of the substrate 435 and the radius of curvature $r_2$ of the second surface of the substrate 435 are fixed. Thus, through varying the optical power (or focal length F) of the diverging lens assembly including the master lens 345 and the lens 435, various lenses with different optical powers may be fabricated based on the patterned recording medium layer 210.

In some embodiments, the optical power (or focal length F) of the diverging lens assembly including the master lens 345 and the lens 435 may be adjustable through changing the distance L between the master lens 345 and the lens 435, the optical power of the master lens 345, and/or the optical power of the lens 435. For example, when the optical power of the master lens 345 and the optical power of the lens 435 are fixed, the optical power (or focal length F) of the diverging lens assembly including the master lens 345 and the lens 435 may be adjustable through changing the distance L between the master lens 345 and the lens 435. When the distance L between the master lens 345 and the lens 435 and the optical power of the lens 435 are fixed, the optical power (or focal length F) of the diverging lens assembly including the master lens 345 and the lens 435 may be adjustable through changing the optical power of the master lens 345, e.g., replacing the master lens 345 by another master lens having a different optical power. In some embodiments, the master lens 345 may have a variable optical power, e.g., the master lens 345 may have an adjustable shape.

Referring to FIG. 3B, FIG. 4B, and FIG. 5B, the reflector 311 may be a curved reflector configured to retro-reflect a linearly polarized beam. In some embodiments, the reflector 311 may be configured to selectively reflect (e.g., retro-reflect) a circularly polarized input beam having a predetermined handedness as a circularly polarized reflected beam having the same handedness. For example, the reflector 311 may include a circularly reflective polarizer (e.g., a reflective polarizer including cholesteric liquid crystals) configured to configured to substantially reflect a circularly polarized input beam having a first handedness as a circularly polarized reflected beam having the first handedness, and substantially transmit a circularly polarized input beam having a second handedness that is opposite to the first handedness. In addition, the wavefront of the circularly polarized reflected beam having the first handedness may substantially match with the wavefront of the circularly polarized input beam having the first handedness. For example, the wavefront of the circularly polarized reflected beam having the first handedness may be substantially the same as the wavefront of the circularly polarized input beam having the first handedness. In such an embodiment, the waveplate 313 that is included in the system 330 shown in FIG. 3B, the system 430 shown in FIG. 4B, or the system 530 shown in FIG. 5B may be omitted. That is, the reflective assembly may include the reflector, and does not include the waveplate 313.

Figure 6:
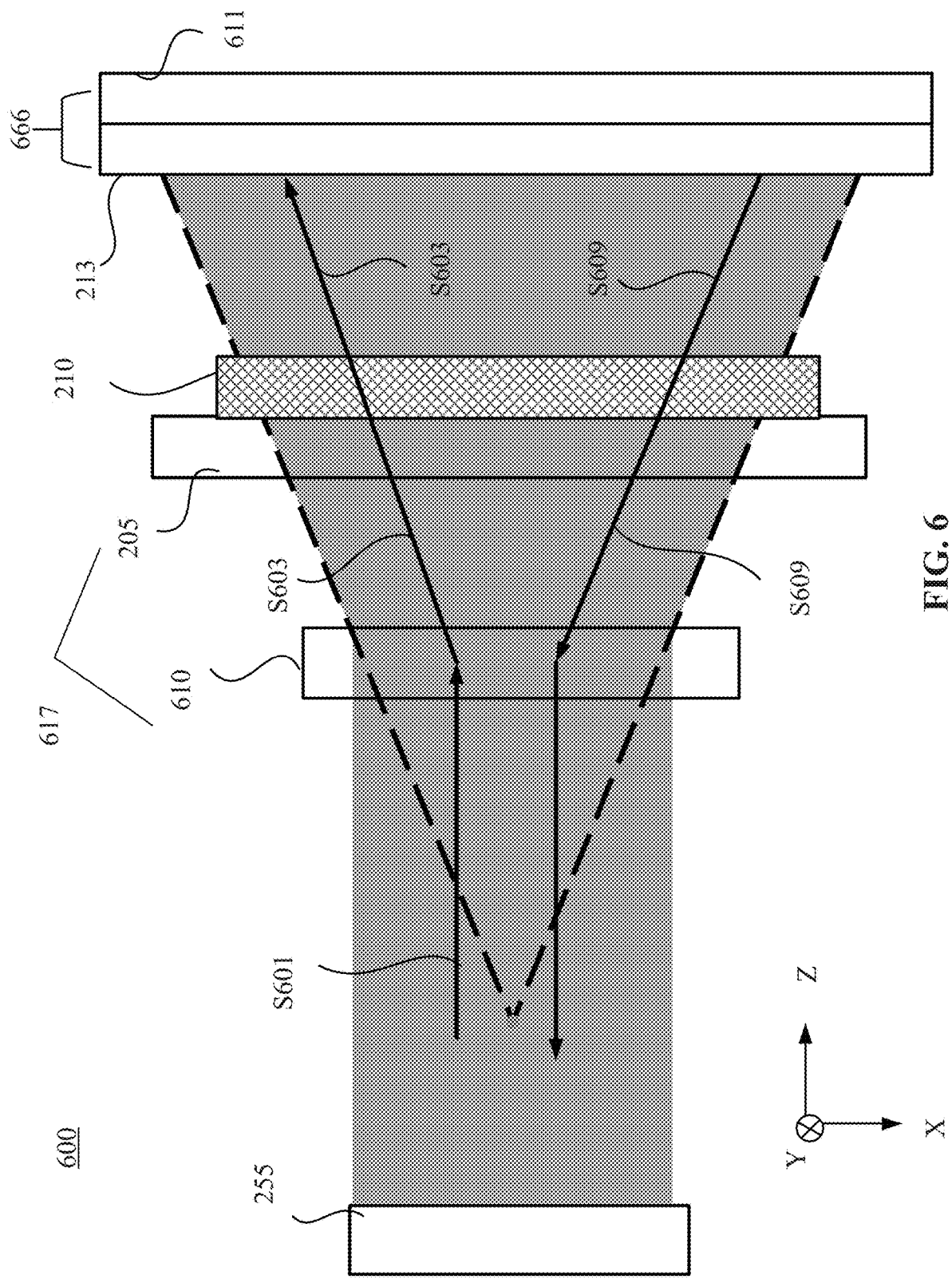
FIG. 6 schematically illustrates a system for generating a polarization interference, according to an embodiment of the present disclosure.

FIG. 6 schematically illustrates an X-Z sectional view of a system 600 configured to generate a polarization interference pattern and record the polarization interference pattern in the recording medium layer 210, according to an embodiment of the present disclosure. The system 600 may include elements, structures, and/or functions that are the same as or similar to those included in the system 200 shown in FIG. 2A, the system 230 shown in FIG. 2B, the system 250 shown in FIG. 2C, the system 300 shown in FIG. 3A, the system 330 shown in FIG. 3B, the system 400 shown in FIG. 4A, the system 430 shown in FIG. 4B, the system 500 shown in FIG. 5A, or the system 530 shown in FIG. 5B. Descriptions of the same or similar elements, structures, and/or functions can refer to the above descriptions rendered in connection with FIG. 2A, FIG. 2B, FIG. 2C, FIG. 3A, FIG. 3B, FIG. 4A, FIG. 4B, FIG. 5A, or FIG. 5B.

As shown in FIG. 6, the system 600 may include the light outputting element 255, a lens assembly 617, the waveplate 213, and a reflector 611 arranged in an optical series. The waveplate 213 and the reflector 611 may be referred to as a reflective assembly 666. The waveplate 213 may be disposed between the lens assembly 617 and the reflector 611. The lens assembly 617 may be disposed between the light outputting element 255 and the reflective assembly 666. The lens assembly 617 may include a first SLM 610 and the substate 205. The reflector 611 may include a second SLM (also referred to as 611 for discussion purposes). The waveplate 213 may be disposed between the first SLM 610 and the second SLM 611. The substate 205 on which the recording medium layer 210 is disposed may be disposed between the first SLM 610 and the waveplate 213. In the embodiment shown in FIG. 6, the recording medium layer 210 may be disposed at a side of the substate 205 facing the waveplate 213. In some embodiments, the recording medium layer 210 may be disposed at a side of the substate 205 opposite to a side facing the waveplate 213. In the embodiment shown in FIG. 6, the substate 205 may be a flat substate, and the waveplate 213 may be a flat waveplate. In some embodiments, the substate 205 may be a curved substate, such as the substate 405 shown in FIG. 4A or the substate 435 shown in FIG. 4B. In some embodiments, the waveplate 213 may be a curved waveplate. In some embodiments, the lens assembly 617 may also include one or more master lenses disposed between the first SLM 610 and the substate 205, or between the substate 205 and the second SLM 611. In some embodiments, the first SLM 610 may be disposed between the one or more master lenses and the substate 205.

The first SLM 610 or the second SLM 611 may be any suitable SLM. For example, the first SLM 610 or the second SLM 611 may include an LC material. In some embodiments, the first SLM 610 or the second SLM 611 may include a translucent or reflective LC micro-display. In some embodiments, the first SLM 610 or the second SLM 611 may include a vertical aligned nematic, parallel aligned nematic, or twisted nematic micro-display cell. In some embodiments, the first SLM 610 or the second SLM 611 may be electrically programmed to modulate the beam based on a fixed spatial ("pixel") pattern. In the embodiment shown in FIG. 6, the first SLM 610 may be a transmissive SLM configured to operate at a wavelength range at least covering the recording wavelength $\lambda_o$. The first SLM 610 may be configured to modulate an input beam to have any suitable wavefront, e.g., a spherical wavefront, an aspherical wavefront, a cylindrical wavefront, or a freeform wavefront, etc. The second SLM 610 may be a reflective SLM configured to operate at a wavelength range at least covering the recording wavelength Xo. In some embodiments, the second SLM 610 may be configured to retro-reflect a first linearly polarized beam having a first polarization direction and a first wavefront as a second linearly polarized beam having a second polarization direction and a second wavefront. The second polarization direction may be orthogonal to the first polarization direction. In some embodiments, the second wavefront may substantially match with the first wavefront. For example, the second wavefront may be substantially the same as the first wavefront.

The first SLM 610 may be configured to modulate a collimated circularly polarized beam (e.g., RHCP beam) S601 having a planar wavefront as a first circularly polarized beam (e.g., an RHCP beam) S603 having a first wavefront (e.g., a first freeform wavefront), and output the first circularly polarized beam (e.g., RHCP beam) S603 toward the substate 205, the waveplate 213, and the second SLM 611. The first circularly polarized beam (e.g., RHCP beam) S603 having the first wavefront (e.g., first freeform wavefront) may be referred to as a first recording beam S603. The substate 205, the recording medium layer 210, and the waveplate 213 are presumed to substantially maintain the wavefront of a beam while transmitting the beam. The waveplate (e.g., QWP) 213 and the second SLM 611 together may be configured to receive the first circularly polarized beam (e.g., RHCP beam) S603 from the substate 205, and output a second circularly polarized beam (e.g., an RHCP beam) S609 back toward the substate 205. The polarization conversions of the first circularly polarized beam (e.g., RHCP beam) S603 when propagating through the waveplate (e.g., QWP) 213 toward the second SLM 611, when reflected by the second SLM 611 back to the waveplate (e.g., QWP) 213, and when propagating through the waveplate (e.g., QWP) 213 toward the substate 205 are not explained in detail. Descriptions of the polarization conversions can refer to the above descriptions rendered in connection with FIG. 2A, FIG. 2B, FIG. 2C, FIG. 3A, or FIG. 3B.

The second SLM 611 may be configured to modulate the first circularly polarized beam (e.g., RHCP beam) S603, such that the second circularly polarized beam (e.g., RHCP beam) S609 may have a second wavefront (e.g., a second freeform wavefront) substantially matching with the first wavefront (e.g., first freeform wavefront) of the first circularly polarized beam (e.g., RHCP beam) S603. For example, the second wavefront (e.g., second freeform wavefront) may be substantially the same as the first wavefront (e.g., first freeform wavefront). The second circularly polarized beam (e.g., RHCP beam) S609 may be referred to as a second recording beam S609. The first recording beam S603 and the second recording beam S609 may propagate toward the recording medium layer 210 from two different sides (e.g., opposite sides) of the recording medium layer 210. The first recording beam S603 and the second recording beam S609 may interference with one another in a beam interference zone (not labelled, similar to the beam interference zone 214) to generate a polarization interference pattern, to which the recording medium layer 210 is exposed. Thus, through configuring the first SLM 610 and the second SLM 611, the first recording beam S603 and the second recording beam S609 may interference with one another in the beam interference zone to generate any desirable polarization interference pattern, which may be recorded in the recording medium layer 210.

In some embodiments, the second SLM 611 may be configured to selectively modulate and reflect (e.g., retro-reflect) a circularly polarized input beam having a predetermined handedness as a circularly polarized reflected beam having the same handedness. For example, the second SLM 611 may include cholesteric liquid crystals. The second SLM 611 may be configured to modulate a circularly polarized input beam having a first handedness, substantially reflect the circularly polarized input beam having the first handedness as a circularly polarized reflected beam having the first handedness, and substantially transmit a circularly polarized input beam having a second handedness that is opposite to the first handedness. In addition, the wavefront of the circularly polarized reflected beam having the first handedness may substantially match with the wavefront of the circularly polarized input beam having the first handedness. For example, the wavefront of the circularly polarized reflected beam having the first handedness may be substantially the same as the wavefront of the circularly polarized input beam having the first handedness. In such an embodiment, the waveplate 213 may be omitted. That is, the reflective assembly 666 may include the SLM 611, and may not include the waveplate 213.

FIGS. 2B-6 illustrate various systems for generating a polarization interference pattern and recording the polarization interference pattern in the recording medium layer 210. The system may be used for surface recoding when the recording medium layer 210 includes a surface recording medium, or volume recoding when the recording medium layer 210 includes a volume recording medium. In some embodiments, the systems may include a light outputting element, a lens assembly, a waveplate, and a reflector arranged in an optical series. The lens assembly may at least include a substate on which the recording medium layer 210 is disposed. The substate may be a flat substrate or a curved substate. For example, in the embodiment shown in FIG. 2B, the lens assembly may include the flat substate 205 on which the recording medium layer 210 is disposed. In the embodiments shown in FIGS. 3A and 3B, the lens assembly may include the master lens 315 or 345, and the flat substate 205 on which the recording medium layer 210 is disposed. In the embodiments shown in FIGS. 4A and 4B, the lens assembly may include the curved substate 405 or 435 on which the recording medium layer 210 is disposed. In the embodiments shown in FIGS. 5A and 5B, the lens assembly may include both the master lens 315 or 345 and the curved substate 405 or 435 on which the recording medium layer 210 is disposed. In the embodiment shown in FIG. 6, the lens assembly may also include the first SLM 610 and the flat substate 205 on which the recording medium layer 210 is disposed. Although not shown, in some embodiments, the lens assembly may include the first SLM 610 and the curved substate 405 or 435 on which the recording medium layer 210 is disposed. In some embodiments, the lens assembly may include the first SLM 610, the master lens 315 or 345, and the flat substate 205. In some embodiments, the lens assembly may include the first SLM 610, the master lens 315 or 345, and the curved substate 405 or 435.

For discussion purposes, FIGS. 2A-6 show the two recording beams are RHCP beams, and the fabricated LCPH elements may provide an optical effect primarily to an RHCP input beam, e.g., a diffraction effect, a focusing or defocusing effect, etc. In some embodiments, the two recording beams may be configured to be LHCP beams, and the fabricated LCPH elements may provide an optical effect primarily to an LHCP input beam, e.g., a diffraction effect, a focusing or defocusing effect, etc. For discussion purposes, FIGS. 2A-6 show that the two recording beams are circularly polarized beams having the same handedness. In some embodiments, the two recording beams may include a circularly polarized beam and an elliptically polarized beam having the same handedness, or two elliptically polarized beams having the same handedness. In other words, the two recording beams may include two polarized beams having the same handedness, and each recording beam may be a circularly polarized beam or an elliptically polarized beam. Referring to FIGS. 2A-6, with the disclosed systems, the same polarization interference pattern or different polarization interference patterns may be recorded in different regions or portions of the recording medium layer 210 through multiple exposures. In some embodiments, the same polarization interference pattern may be recorded at different portions of the recording medium layer 210 to obtain LCPH element of any suitable, desirable sizes. In some embodiments, different polarization interference patterns may be recorded at different portions of the recording medium layer 210. For example, between two exposures, the recording portions may be changed by adjusting the position and/or the orientation of the recording medium layer 210 relative to an input beam of the system (e.g., the beam S201, the beam S301, the beam S331, the beam S401, the beam S431, the beam S501, the beam S531, or the beam S601). For example, the movable stage 209 may be controlled by the controller 217 to translate and/or rotate to adjust the position and/or the orientation of the recording medium layer 210 relative to the input beam of the system.

In some embodiments, between two exposures of the recording medium layer 210, the polarization interference pattern may be changed. In some embodiments, changing the polarization interference pattern may include changing the rotation angle α of the recording medium layer 210 from a first rotation angle to a second, different rotation angle. In some embodiments, the movable stage 209 on which the reflector 207 is mounted may be controlled by the controller 217 to rotate to change the rotation angle α of the recording medium layer 210. In some embodiments, when the system includes a lens assembly, changing the polarization interference pattern may include changing a distance between the substrate on which the recording medium layer 210 is disposed and a focal plane (or virtual focal plane) of the lens assembly, from a first distance to a second, different distance. In some embodiments, the movable stage 209 on which the reflector 207 is mounted may be controlled by the controller 217 to translate to change the distance between the substrate on which the recording medium layer 210 is disposed and the focal plane (or virtual focal plane) of the lens assembly. In some embodiments, when the lens assembly includes both a master lens and a curved substate, changing the polarization interference pattern may include changing a distance between the master lens and the curved substate, from a first distance to a second, different distance. In some embodiments, changing the polarization interference pattern may include changing a radius of curvature of the curved substrate on which the recording medium layer 210 is disposed, from a first radius of curvature to a second, different radius of curvature.

In some embodiments, changing the polarization interference pattern may include changing an optical power of the master lens, from a first optical power to a second, different optical power. In some embodiments, changing an optical power of the master lens may include changing a first master lens to a second, different master lens. In some embodiments, the master lens may have an adjustable shape, changing an optical power of the master lens may include changing a first shape of the master lens to a second, different shape of the master lens. In some embodiments, changing the polarization interference pattern may include configuring the first SLM to change a modulation of an input beam, from a first modulation to a second, different modulation. In some embodiments, changing the polarization interference pattern may include changing the recording wavelength Xo. For example, the light source of the system may be changed or controlled to emit a beam of a different wavelength. In some embodiments, changing the polarization interference pattern may include changing an opening area (or an exposed area) of the recording medium layer 210, such that a size and/a shape of the polarization interference pattern that is recorded in the polarization interference pattern may be changed. For example, an iris diaphragm may be coupled to the recording medium layer 210. In some embodiments, the controller 217 may control an adjustment mechanism coupled with the iris diaphragm to adjust an opening area of the iris diaphragm, thereby adjusting the size and/or the shape of the polarization interference pattern that is recorded into the recording medium layer 210.

In some embodiments, an orientation of the polarization interference pattern relative to the recording medium layer 210 may be changeable through changing the relative orientation between the recording medium layer 210 and the input beam of the system. For example, the movable stage 209 may be controlled by the controller 217 to rotate (e.g., around the z-axis) to change the relative orientation between the recording medium layer 210 and the input beam. Each polarization interference pattern (or pattern of the spatially varying orientation of the linear polarization) may define an orientation pattern of the optic axis of the recording medium layer 210 in the respective recording region/portion. In some embodiments, different orientation patterns of the optic axis of the recording medium layer 210 in different regions/portions may define in-plane orientation patterns with different patterns (e.g., lens pattern, grating pattern, etc.), sizes, periods, orientations, positions, and/or shapes.

The orientation of the in-plane orientation patterns may be adjustable through rotating the substrate 205, on which the recording medium layer 210 is disposed, around a predetermined locally defined rotation axis (e.g., the z-axis). That is, the orientation of the in-plane orientation patterns may be adjustable through adjusting the rotation angle of the substrate 205 that supports the recording medium layer 210 around a predetermined axis (e.g., the z-axis). The position of the in-plane orientation patterns may be adjustable through adjusting the location of the substrate 205 (and hence the location of the recording medium layer 210) with respect to the input beam. In some embodiments, the size of the in-plane orientation patterns may be adjustable through adjusting the opening area of the iris diaphragm coupled to the recording medium layer 210 or coupled to a light source.

Figure 7A:
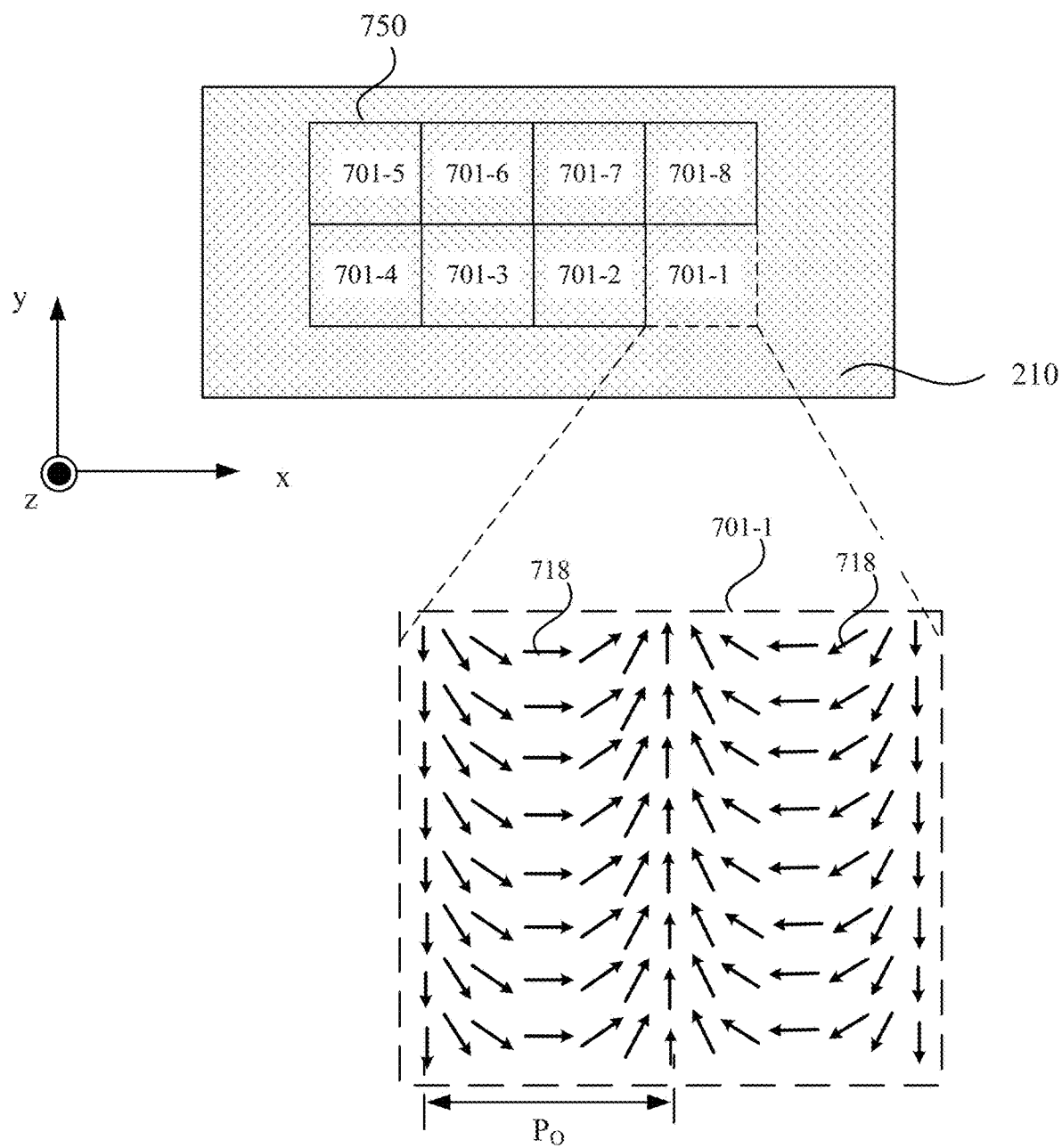
FIGS. 7A-7C schematically illustrate patterns of spatially varying orientations of a linear polarization recorded in different portions of a recording medium layer, according to various embodiments of the present disclosure.
Figure 7B:
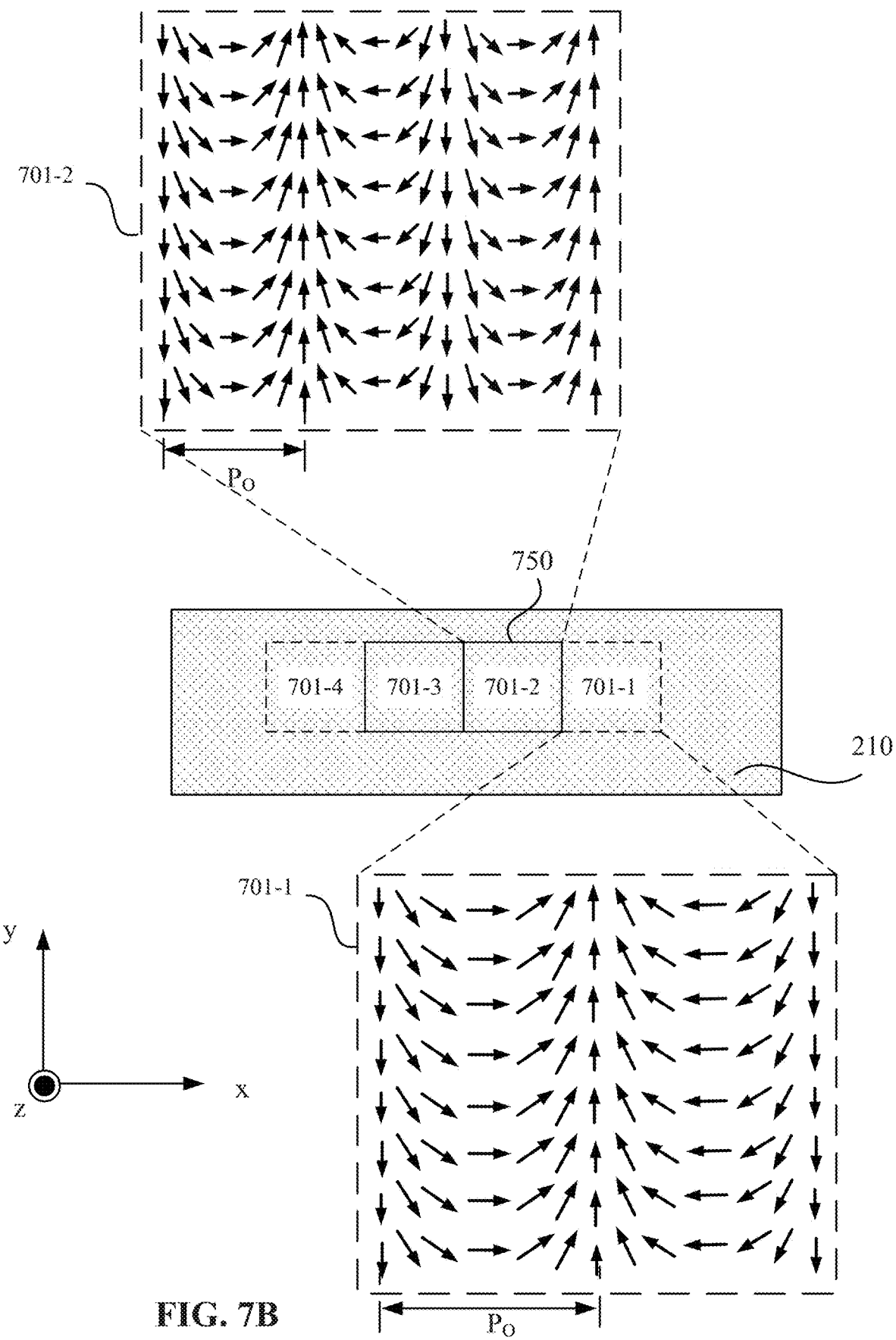
Figure 7C:
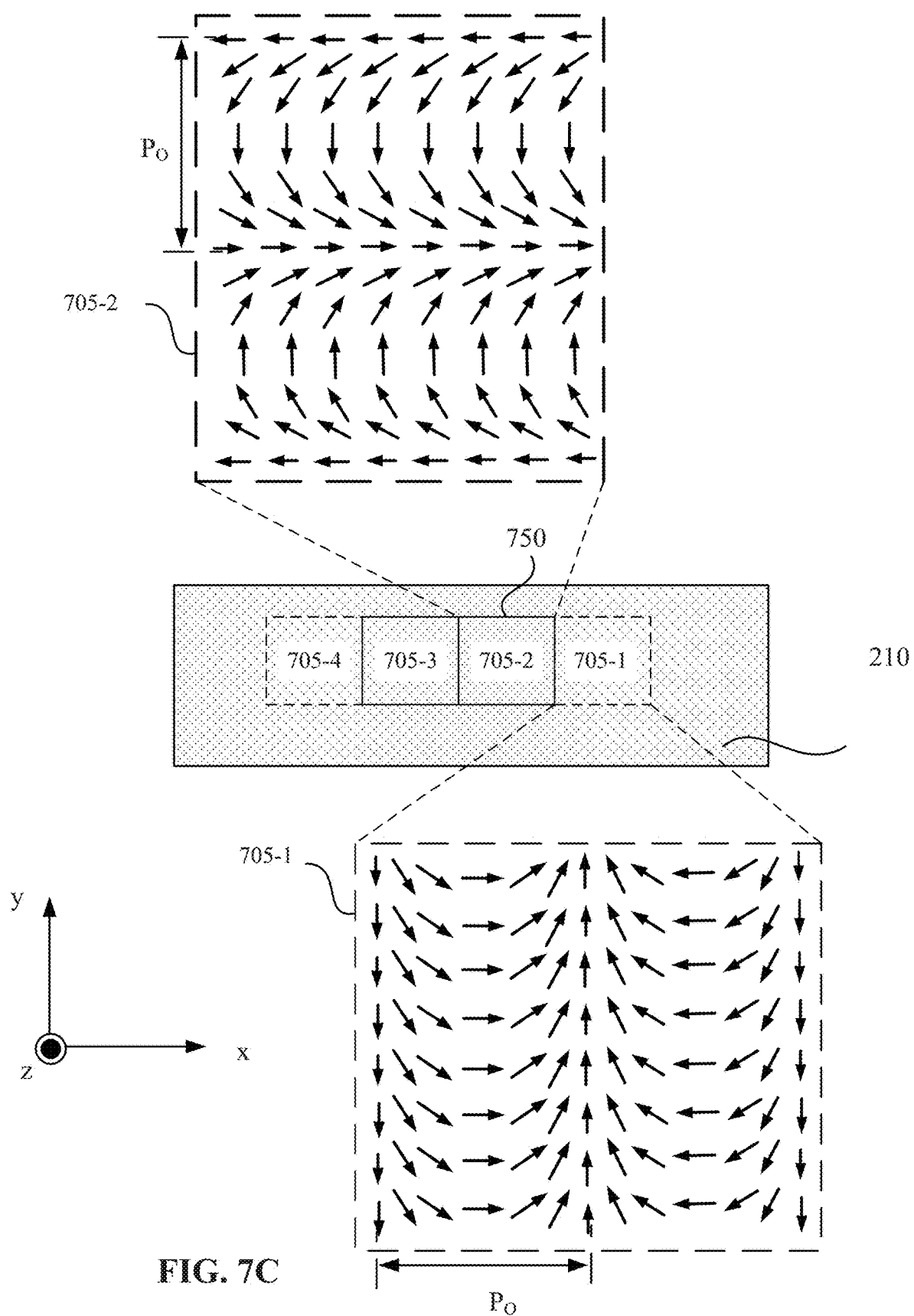

FIGS. 7A-7C schematically illustrate x-y sectional views of orientation patterns of the optic axis of the recording medium layer 210 defined in different portions of the recording medium layer 210 via one or more of embodiments of the disclosed systems, according to various embodiments of the present disclosure. For discussion purposes, in FIGS. 7A-7C, the orientation patterns of the optic axis of the recording medium layer 210 may correspond to grating patterns. For example, the orientation patterns of the optic axis of the recording medium layer 210 are defined in different portions of the recording medium layer 210 via the system 230 shown in FIG. 2B or the system 250 shown in FIG. 2C. FIGS. 7A-7C schematically illustrate the periodic variation of the orientations of the optic axis of the recording medium layer 210 in one or two portions of the of the recording medium layer 210. In FIGS. 7A-7C, the arrows 718 represent the optic axis and the orientations of the optic axis. For discussion purposes, in FIGS. 7A-7C, an opening area or aperture size of the recording medium layer 210 may be substantially the same as a size of a predetermined region 750 of the recording medium layer 210 that is exposed to the polarization interference pattern during one exposure. An opening shape or aperture shape of the recording medium layer 210 may be a shape of the predetermined region 750, e.g., a square shape, a rectangular shape, a circular shape, etc.

FIG. 7A shows a plurality of orientation patterns of the optic axis of the recording medium layer 210 defined in a plurality of different portions of the recording medium layer 210 through multiple exposures. The plurality of orientation patterns of the optic axis of the recording medium layer 210 in different portions of the recording medium layer 210 may correspond to a plurality of grating patterns having the same grating period and the same grating orientation. For example, as shown in FIG. 7A, eight orientation patterns 701-1 to 701-8 of the optic axis of the recording medium layer 210 may be defined and/or recorded in eight different portions of the recording medium layer 210 through eight exposures. For different exposures, the substrate 205 on which the recording medium layer 210 is disposed may be translated by the movable stage 209 in the x-axis direction and y-axis direction. The eight patterns 701-1 to 701-8 may be arranged in a 2D array. For illustrative purposes, FIG. 7A merely shows the periodic variation of the orientation of the optic axis in the orientation pattern 701-1. For example, the orientations of the optic axis may periodically vary in an in-plane direction, e.g., the x-axis direction. In some embodiments, a pitch $P_O$ of the orientation pattern 701-1 (the sample pitch) may be referred to as a distance in the in-plane direction, over which the orientation of the optic axis exhibits a rotation by a predetermined angle (e.g., 180°). In some embodiments, the pitch $P_O$ of the orientation pattern 701-1 may correspond to the in-plane pitch $P_{in}$ of a corresponding grating pattern. The eight orientation patterns 701-1 to 701-8 may correspond to eight grating patterns having the same size, the same in-plan pitch (or grating period), and the same grating orientation.

FIG. 7B shows a plurality of orientation patterns of the optic axis of the recording medium layer 210 defined and/or recorded in a plurality of different portions of the recording medium layer 210 through multiple exposures. The plurality of orientation patterns of the optic axis defined in different portions of the recording medium layer 210 may correspond to a plurality of grating patterns having different in-plane pitches (or grating periods) and the same grating orientation. For example, as shown in FIG. 7B, four orientation patterns 703-1 to 703-4 of the optic axis of the recording medium layer 210 may be defined in four different portions of the recording medium layer 210 through four exposures. For each exposure, the substrate 205 on which the recording medium layer 210 is disposed may be translated by the movable stage 219 in the x-axis direction. The four orientation patterns 703-1 to 703-4 may be arranged in a 1D array. At least two of the four orientation patterns 703-1 to 703-4 may have different sample pitches. For illustrative purposes, FIG. 7B shows the periodic variation of the orientations of the optic axis in the orientation pattern 703-1 and the orientation pattern 703-2. A sample pitch $P_O$ of the orientation pattern 703-1 may be different from (e.g., larger than) a sample pitch $P_O$ of the orientation pattern 703-2. Accordingly, the in-plane pitch of the grating pattern corresponding to the orientation pattern 703-1 may be different from (e.g., larger than) the in-plane pitch of the grating pattern corresponding to the orientation pattern 703-2.

FIG. 7C shows a plurality of orientation patterns of the optic axis of the recording medium layer 210 defined and/or recorded in a plurality of different portions of the recording medium layer 210 through multiple exposures. The plurality of orientation patterns of the optic axis defined in different portions (or regions) of the recording medium layer 210 may correspond to a plurality of grating patterns having different grating orientations and the same in-plane pitch (or grating period). For example, as shown in FIG. 7C, four orientation patterns 705-1 to 705-4 of the optic axis of the recording medium layer 210 may be defined in four different portions of the recording medium layer 210 through four exposures. For each exposure, the substrate 205 on which the recoding medium layer 210 is disposed may be translated by the movable stage 209 in the x-axis direction. The four orientation patterns 705-1 to 705-4 may be arranged in a 1D array. At least two of the four orientation patterns 705-1 to 705-4 may have orientations of the optic axis periodically varying in different in-plane directions. The in-plane direction in which the orientations of the optic axis periodically varying may correspond to a grating orientation of a corresponding grating pattern. For illustrative purposes, FIG. 7C shows the periodic variations of the orientations of the optic axis in the orientation pattern 705-1 and the orientation pattern 705-2. For example, the orientation pattern 705-1 may have the orientation of the optic axis periodically varying in a first in-plane direction, e.g., the x-axis direction, and the orientation pattern 705-2 may have the orientation of the optic axis periodically varying in a second, different in-plane direction, e.g., the y-axis direction. Accordingly, the grating orientation of the grating pattern corresponding to the orientation pattern 705-1 may be different from the grating orientation of the grating pattern corresponding to the orientation pattern 705-2.

FIGS. 8A-8D schematically illustrate processes for fabricating an LCPH element through one or more embodiments of the disclosed systems, such as the system 230 shown in FIG. 2B, the system 250 shown in FIG. 2C, the system 300 shown in FIG. 3A, the system 330 shown in FIG. 3B, the system 400 shown in FIG. 4A, the system 430 shown in FIG. 4B, the system 500 shown in FIG. 5A, the system 530 shown in FIG. 5B, and/or the system 600 shown in FIG. 6. The fabrication process shown in FIGS. 8A-8D may include holographic recording of an alignment pattern in a photo-aligning film, and alignment of an anisotropic material (e.g., an LC material) by the photo-aligning film. The holographic recording of an alignment pattern in a photo-aligning film may also be referred to as surface recording. This alignment process may be referred to as a surface-mediated photo-alignment. The recording medium included in the recording medium layer 1010 for a surface-mediated photo-alignment may also be referred to as a surface recording medium or surface PAM. For illustrative purposes, the substrate and different layers, films, or structures formed thereon are shown as having flat surfaces. In some embodiments, the substrate and different layers or films or structures may have curved surfaces.

Figure 8A:
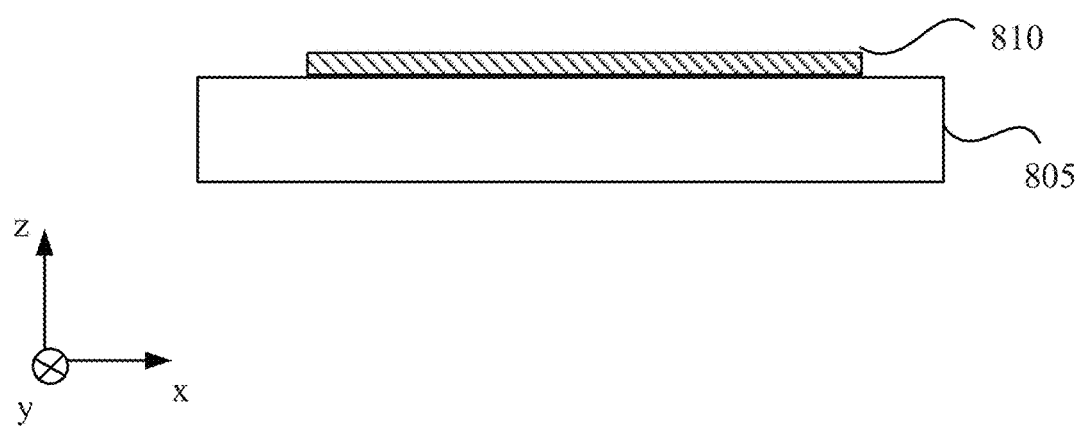
FIGS. 8A-8D schematically illustrate processes for fabricating an LCPH element, according to an embodiment of the present disclosure.

As shown in FIG. 8A, a recording medium layer 810 may be formed on a surface (e.g., a top surface) of a substrate 805 by dispensing, e.g., coating or depositing, a polarization sensitive material on the surface of the substrate 805. Thus, the recording medium layer 810 may be referred to as a recording medium layer. The polarization sensitive material included in the recording medium layer 810 may be an optically recordable and polarization sensitive material (e.g., a photo-alignment material) configured to have a photo-induced optical anisotropy when exposed to a polarized light irradiation. Molecules (or fragments) and/or photo-products of the optically recordable and polarization sensitive material may be configured to generate an orientational ordering under a polarized light irradiation. In some embodiments, the polarization sensitive material may be dissolved in a solvent to form a solution. The solution may be dispensed on the substrate 805 using any suitable solution coating process, e.g., spin coating, slot coating, blade coating, spray coating, or jet (ink-jet) coating or printing. The solvent may be removed from the coated solution using a suitable process, e.g., drying, or heating, leaving the polarization sensitive material on the substrate 805 to form the recording medium layer 810. The substrate 805 may be similar to the substrate 205.

Figure 8B:
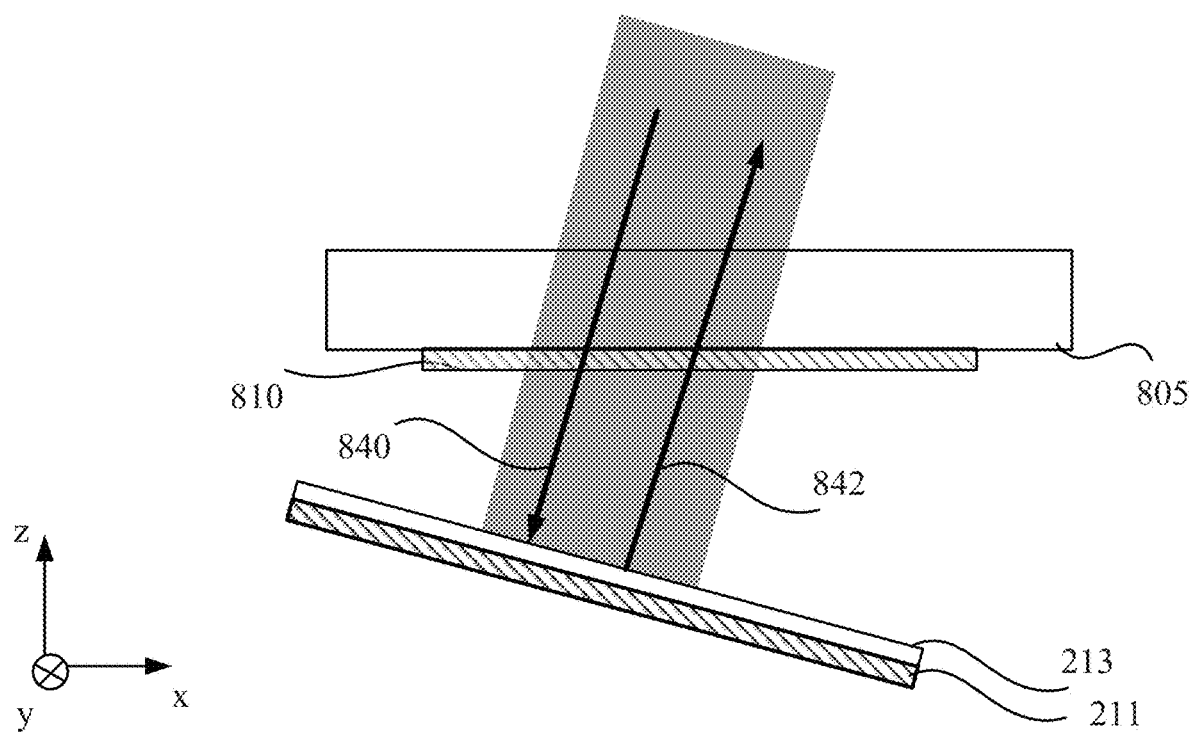

After the recording medium layer 810 is formed on the substrate 805, as shown in FIG. 8B, the recording medium layer 810 may be exposed to a polarization interference pattern generated based on two recording beams 840 and 842 (also referred to as a first recording beam 840 and a second recording beam 842). The two recording beams 840 and 842 may be two coherent circularly polarized beams with the same handedness and substantially matching wavefronts. For discussion purposes, the two recording beams 840 and 842 may represent, respectively, the beam S201 and the beam S207 shown in FIG. 2B or FIG. 2C. The recording medium layer 810 may be optically patterned when exposed to the polarization interference pattern generated based on the two recording beams 840 and 842 during the polarization interference exposure process. An orientation pattern of an optic axis of the recording medium layer 810 in an exposed region may be defined by the polarization interference pattern under which the recording medium layer 810 is exposed. In some embodiments, different regions of the recording medium layer 810 may be exposed to the same or different polarization interference patterns. The same or different orientation patterns of the optic axis of the recording medium 810 may be defined in respective exposed regions during the respective polarization interference exposure processes.

In some embodiments, the recording medium layer 810 may include elongated anisotropic photo-sensitive units (e.g., small molecules or fragments of polymeric molecules). After being subjected to a sufficient exposure of the polarization interference pattern generated based on the two recording lights 840 and 842, local alignment directions of the anisotropic photo-sensitive units may be induced in the recording medium layer 810 by the polarization interference pattern, resulting in an alignment pattern (or in-plane modulation) of an optic axis of the recording medium layer 810 due to a photo-alignment of the anisotropic photo-sensitive units. For example, the in-plane modulation of the optic axis of the recording medium layer 810 in the exposed region may correspond to a grating pattern, which may be similar to that shown in FIG. 1B. In some embodiments, multiple alignment patterns (which may be the same or different) may be recorded in different portions or regions of the recording medium layer 810 through multiple polarization interference exposure processes. In some embodiments, the handedness of the in-plane modulation (or alignment pattern) of the optic axis of the recording medium layer 810 in the exposed region may be controllable by controlling the handednesses of the recording beams 840 and 842. For example, when the recording beams 840 and 842 are RHCP beams, the handedness of the in-plane modulation (or alignment pattern) of the optic axis of the recording medium layer 810 in the exposed region may be right-handed. When the recording beam beams 840 and 842 are LHCP beams, the handedness of the in-plane modulation (or alignment pattern) of the optic axis of the recording medium layer 810 in the exposed region may be left-handed. After the recording medium layer 810 is optically patterned, the recording medium layer 810 may be referred to as a patterned recording medium layer with an alignment pattern.

Figure 8C:
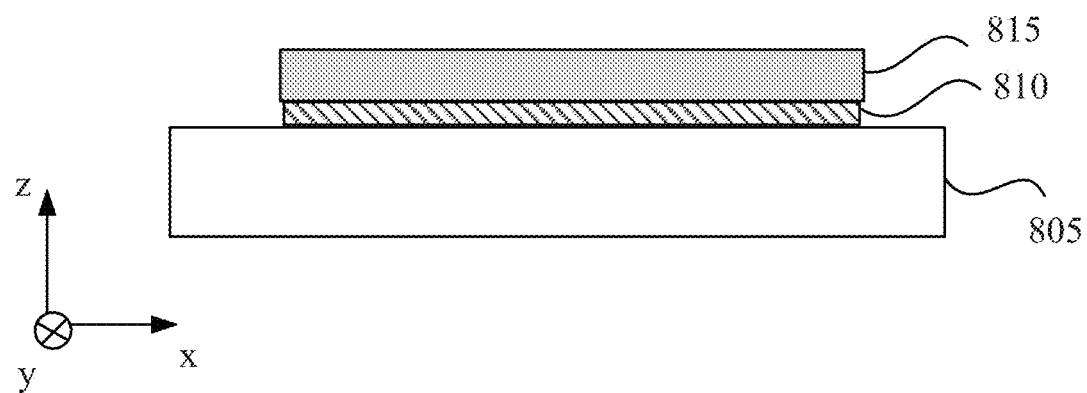

In some embodiments, as shown in FIG. 8C, a birefringent medium layer 815 may be formed on the patterned recording medium layer 810 by dispensing, e.g., coating or depositing, a birefringent medium onto the patterned recording medium layer 810. The birefringent medium may include one or more birefringent materials having an intrinsic birefringence, such as non-polymerizable LCs or polymerizable LCs (e.g., RMs). For discussion purposes, in the following descriptions, the term "liquid crystal(s)" or "LC(s)" may encompass both mesogenic and LC materials. In some embodiments, the birefringent medium may also include or be mixed with other ingredients, such as solvents, initiators (e.g., photo-initiators or thermal initiators), chiral dopants, or surfactants, etc. In some embodiments, the birefringent medium may not have an intrinsic or induced chirality. In some embodiments, the birefringent medium may have an intrinsic or induced chirality. For example, in some embodiments, the birefringent medium may include a host birefringent material and a chiral dopant doped into the host birefringent material at a predetermined concentration. The chirality may be introduced by the chiral dopant doped into the host birefringent material, e.g., chiral dopant doped into nematic LCs, or chiral reactive mesogens ("RMs") doped into achiral RMs. RMs may be also referred to as a polymerizable mesogenic or liquid-crystalline compound, or polymerizable LCs. In some embodiments, the birefringent medium may include a birefringent material having an intrinsic molecular chirality, and chiral dopants may not be doped into the birefringent material. The chirality of the birefringent medium may result from the intrinsic molecular chirality of the birefringent material. For example, the birefringent material may include chiral liquid crystal molecules, or molecules having one or more chiral functional groups. In some embodiments, the birefringent material may include twist-bend nematic LCs (or LCs in twist-bend nematic phase), in which LC directors may exhibit periodic twist and bend deformations forming a conical helix with doubly degenerate domains having opposite handednesses. The LC directors of twist-bend nematic LCs may be tilted with respect to the helical axis. Thus, the twist-bend nematic phase may be considered as the generalized case of the conventional nematic phase in which the LC directors are perpendicular to the helical axis.

In some embodiments, a birefringent medium may be dissolved in a solvent to form a solution. A suitable amount of the solution may be dispensed (e.g., coated, or sprayed, etc.) on the patterned recording medium layer 810 to form the birefringent medium layer 815. In some embodiments, the solution containing the birefringent medium may be coated on the patterned recording medium layer 810 using a suitable process, e.g., spin coating, slot coating, blade coating, spray coating, or jet (ink-jet) coating or printing. In some embodiments, the birefringent medium may be heated to remove the remaining solvent. This process may be referred to as a pre-exposure heating. The patterned recording medium layer 810 may be configured to provide a surface alignment (e.g., planar alignment, or homeotropic alignment, etc.) to optically anisotropic molecules (e.g., LC molecules, RM molecules, etc.) in the birefringent medium. For example, the patterned recording medium layer 810 may at least partially align the LC molecules or RM molecules in the birefringent medium that are in contact with the patterned recording medium layer 810 to form a grating pattern. In other words, the LC molecules or RM molecules in the birefringent medium may be at least partially aligned along the local alignment directions of the anisotropic photosensitive units in the patterned recording medium layer 810 to form the grating pattern. Thus, the grating pattern recorded in the patterned recording medium layer 810 (or the in-plane orientation pattern of the optic axis of the recording medium layer 810) may be transferred to the birefringent medium, and hence to the birefringent medium layer 815. That is, the patterned recording medium layer 810 may function as a photo-alignment material ("PAM") layer for the LCs or RMs in the birefringent medium. Such an alignment procedure may be referred to as a surface-mediated photo-alignment.

In some embodiments, after the LCs or RMs in the birefringent medium are aligned by the patterned recording medium layer 810, the birefringent medium may be heat treated (e.g., annealed) in a temperature range corresponding to a nematic phase of the LCs or RMs in birefringent medium to enhance the alignments (or orientation pattern) of the LCs and/or RMs (not shown in FIG. 8C). This process may be referred to as a post-exposure heat treatment (e.g., annealing). In some embodiments, the heat treatment of the birefringent medium may be omitted.

Figure 8D:
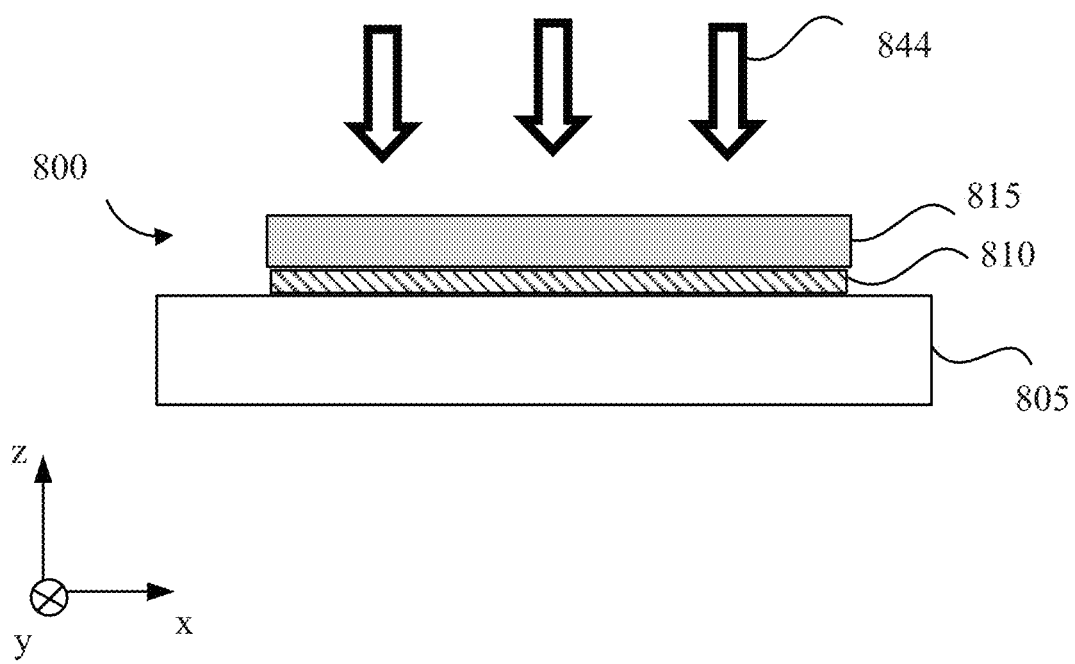

In some embodiments, when the birefringent medium includes polymerizable LCs (e.g., RMs), after the RMs are aligned by the patterned recording medium layer 810, the RMs may be polymerized, e.g., thermally polymerized or photo-polymerized, to solidify and stabilize the orientational pattern of the optic axis of the birefringent medium, thereby forming the birefringent medium layer 815. In some embodiments, as shown in FIG. 8D, the birefringent medium may be irradiated with, e.g., a UV light 844. Under a sufficient UV light irradiation, the birefringent medium may be polymerized to stabilize the orientational pattern of the optic axis of the birefringent medium. In some embodiments, the polymerization of the birefringent medium under the UV light irradiation may be carried out in air, or in an inert atmosphere formed, for example, by nitrogen, argon, carbon-dioxide, or in vacuum. Thus, an LCPH element (e.g., an LCPH grating) 800 may be obtained based on the polarization interference exposure process and surface-mediated photo-alignment. In some embodiments, the LCPH element (e.g., LCPH grating) 800 fabricated based on the fabrication processes shown in FIGS. 8A-8D may be a passive LCPH element, e.g., a passive PBP element, a passive PVH element, etc. In some embodiments, the process of thermo- or photo-polymerization of the birefringent medium may be omitted for fabricating an active LCPH element. Exemplary fabrication processes of active LCPH elements are explained in FIGS. 9A-9D.

In some embodiments, as shown in FIG. 8D, the substrate 805 and/or the recording medium layer 810 may be used to fabricate, store, or transport the LCPH element 800. In some embodiments, the substrate 805 and/or the recording medium layer 810 may be detachable or removable from other portions of the LCPH element 800 after the other portions of the LCPH element 800 are fabricated or transported to another place or device. That is, the substrate 805 and/or the patterned recording medium layer 810 may be used in fabrication, transportation, and/or storage to support the birefringent medium layer 815, and may be separated or removed from the birefringent medium layer 815 when the fabrication of the LCPH element 800 is completed, or when the LCPH element 800 is to be implemented in an optical device. In some embodiments, the substrate 805 and/or the recording medium layer 810 may not be separated from the LCPH element 800.

Figure 9A:
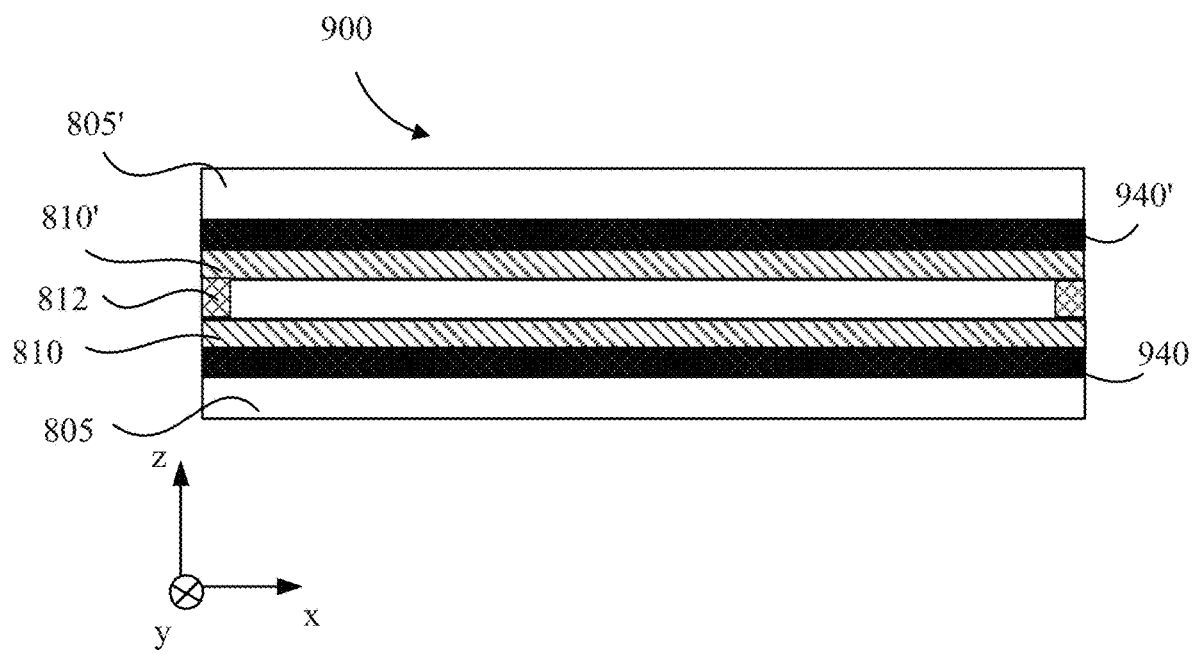
FIGS. 9A and 9B schematically illustrate processes for fabricating an LCPH element and a fabricated LCPH element, according to an embodiment of the present disclosure.
Figure 9B:
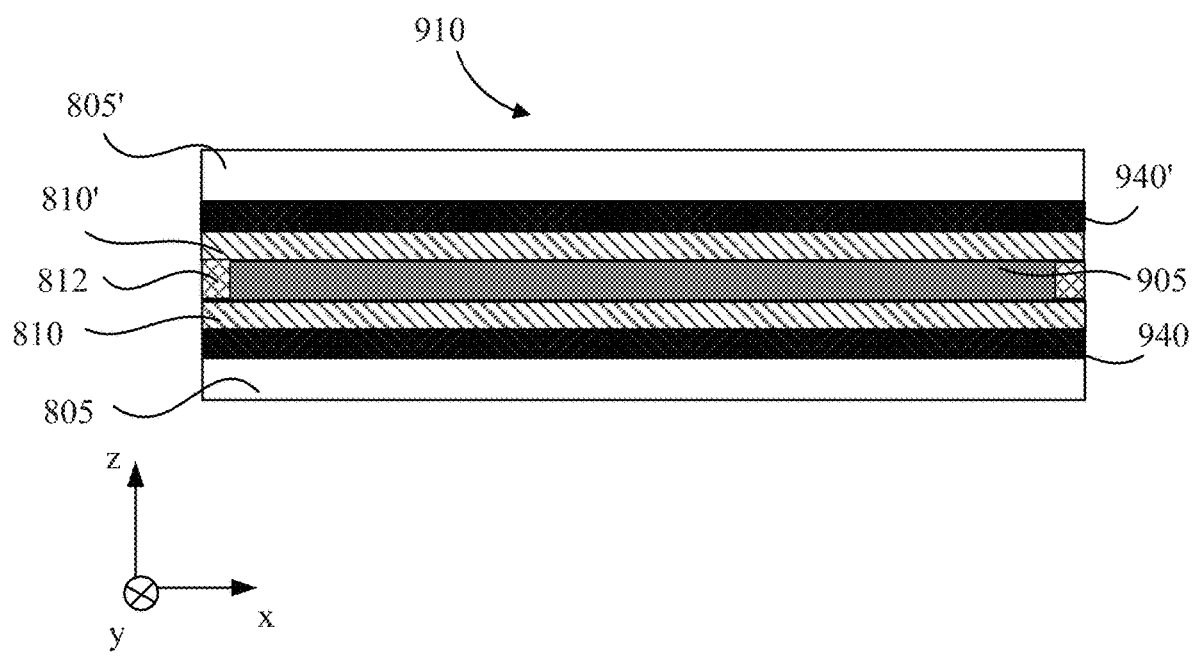

FIGS. 9A and 9B schematically illustrate processes for fabricating a LCPH element, according to an embodiment of the present disclosure. The fabrication processes shown in FIGS. 9A and 9B may include steps or processes similar to those shown in FIGS. 8A-8D. The LCPH element fabricated based on the processes shown in FIGS. 9A and 9B may include elements similar to those included in the LCPH element fabricated based on the processes shown in FIGS. 8A-8D. Descriptions of the similar steps and similar elements can refer to the descriptions rendered above in connection with FIGS. 8A-8D. The LCPH element fabricated based on the fabrication processes shown in FIGS. 9A and 9B may be an active LCPH element, such as an active PBP element or an active PVH element, etc. Although the substrate and layers are shown as having flat surfaces, in some embodiments, the substrate and layers formed thereon may have curved surfaces.

As shown in FIG. 9A, two substrates 805 and 805' (referred to as a first substrate 805 and a second substrate 805') may be assembled to form an LC cell 900. For example, the two substrates 805 and 805' may be bonded to each other via an adhesive 812 (e.g., optical adhesive 812) to form the LC cell 900. At least one (e.g., each) of the two substrates 805 and 805' may be provided with one or more conductive electrode layers and a patterned recording medium layer. For example, two conductive electrode layers 940 and 940' may be formed at opposing surfaces of the substrates 805 and 805', and two patterned recording medium layer 810 and 810' may be formed on opposing surfaces of the two conductive electrode layers 940 and 940'. The patterned recording medium layers 810 and 810' may be fabricated at the opposing surfaces of the conductive electrode layers 940 and 940' following steps or processes similar to those shown in FIGS. 8A and 8B. The conductive electrode layer 940 or 940' may be transmissive and/or reflective at least in the same spectrum band as the substrate 805 or 805'. The conductive electrode layer 940 or 940' may be a planar continuous electrode layer or a patterned electrode layer. As shown in FIG. 9A, a gap or space may exist between the patterned recording medium layers 810 and 810'.

After the LC cell 900 is assembled, as shown in FIG. 9B, active LCs that are reorientable by an external field, e.g., an electric field, may be filled into the LC cell 900, i.e., into the space formed between the patterned recording medium layers 810 and 810', forming an active LC layer 905. The patterned recording medium layer 810 or 810' may function as a PAM layer for the active LCs filled into the LC cell 900, such that the active LCs may be at least partially aligned by the patterned recording medium layer 810 or 810'. The patterned recording medium layer 810 or 810' may also be referred to as PAM layer 810 or 810'. The LC cell 900 filled with the active LCs may be sealed via, e.g., the adhesive 812, and an active LCPH element 910 may be obtained. The active LCPH 910 may be switchable by a voltage applied to the conductive electrode layers 940 and 940'. For example, the switching of the active LCPH 910 may be controlled by a controller (not shown) similar to the controller 217 shown in FIG. 2B.

For illustrative purposes, FIGS. 9A and 9B show that the patterned recording medium layers 810 and 810' (or PAM layers 810 and 810') may be disposed at opposing inner surfaces of the two substrates 805 and 805'. In some embodiments, each of the PAM layers 810 and 810' disposed at the two substates 805 and 805' may be configured to provide a planar alignment (or an alignment with a small pretilt angle). The PAM layers 810 and 810' may provide parallel or anti-parallel surface alignments. In some embodiments, the PAM layers 810 and 810' disposed at the two substates 805 and 805' may be configured to provide hybrid surface alignments. For example, the PAM layer 810 disposed at the substate 805 may be configured to provide a planar alignment (or an alignment with a small pretilt angle), and the PAM layer 810' disposed at the other substate 805' may be configured to provide a homeotropic alignment. Although not shown, in some embodiments, only one of the substrates 805 and 805' may be provided with the PAM layer 810 or 810'.

For illustrative purposes, FIGS. 9A and 9B show that conductive electrode layers 940 and 940' may be disposed at the two substrates 805 and 805'. The conductive electrode layer (940 or 940') may be disposed between the patterned recording medium layer (810 or 810') and the substrate (805 or 805'). In the embodiment shown in FIGS. 9A and 9B, each of the conductive electrode layers 940 and 940' may be a continuous planar electrode layer. A driving voltage may be applied to the conductive electrode layers 940 and 940' to generate a vertical electric field to reorient the LC molecules, thereby switching the optical properties of the active LCPH element 910. As shown in FIG. 9B, the conductive electrode layers 940 and 940' may be disposed at two sides of the active LC layer 905.

Figure 9C:
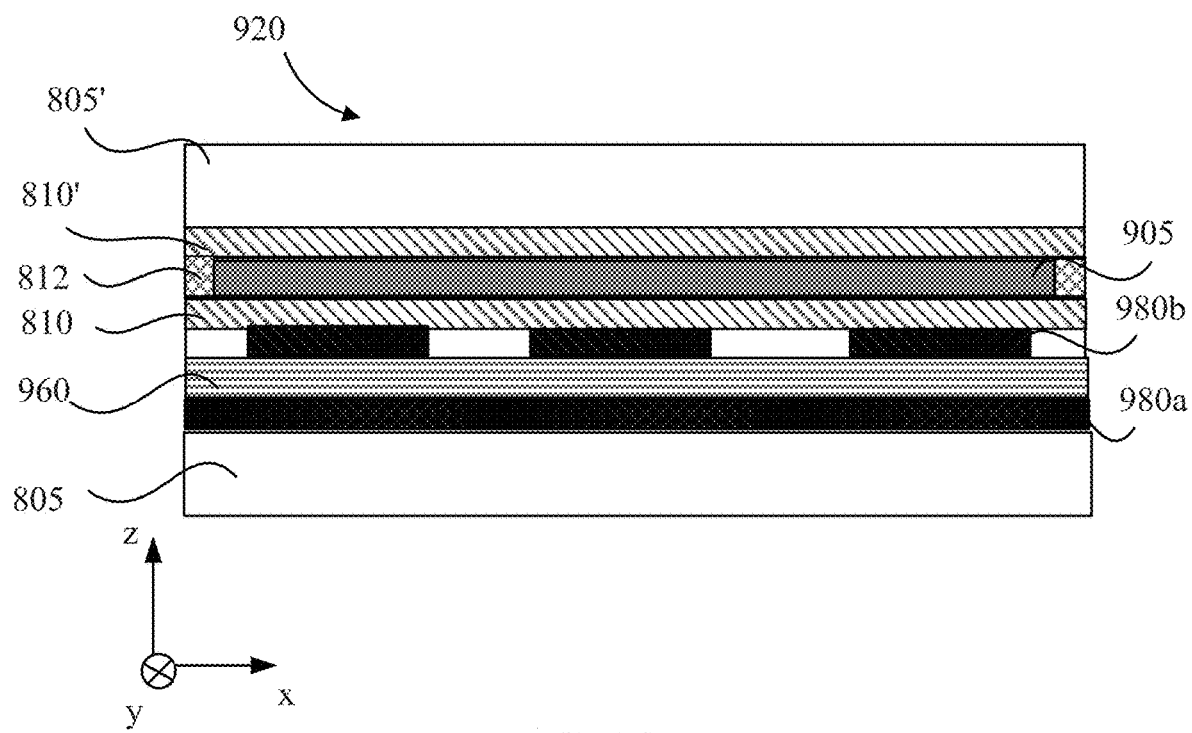
FIG. 9C schematically illustrates processes for fabricating an LCPH element and a fabricated LCPH element, according to an embodiment of the present disclosure.

In some embodiments, the two conductive electrode layers 940 and 940' may be disposed at the same side of the active LC layer 905. For example, as shown in FIG. 9C, two substates 805 and 805' may be assembled to form an LC cell 920. One substrate 805' (e.g., an upper substrate) may not be provided with a conductive electrode layer, while the other substrate 805 (e.g., a lower substrate) may be provide with two conductive electrode layers (e.g., 980a and 980b) and an electrically insulating layer 960 disposed between the two conductive electrode layers. In other words, the two conductive electrode layers 980a and 980b may be disposed at the same side of the active LC layer 905. The two conductive electrode layers 980a and 980b may be a continuous planar electrode layer 980a and a patterned electrode layer 980b. The patterned electrode layer 980b may include a plurality of striped electrodes arranged in parallel in an interleaved manner. After the LC cell 920 is filled with active LCs to form the active LC layer 905, an active LCPH element 925 may be obtained. A voltage may be applied between the continuous planar electrode layer 980a and the patterned electrode layer 980b disposed at the same side of the active LC layer 905 to generate a horizontal electric field to reorient the LC molecules, thereby switching the optical properties of the fabricated active LCPH element 925.

Figure 9D:
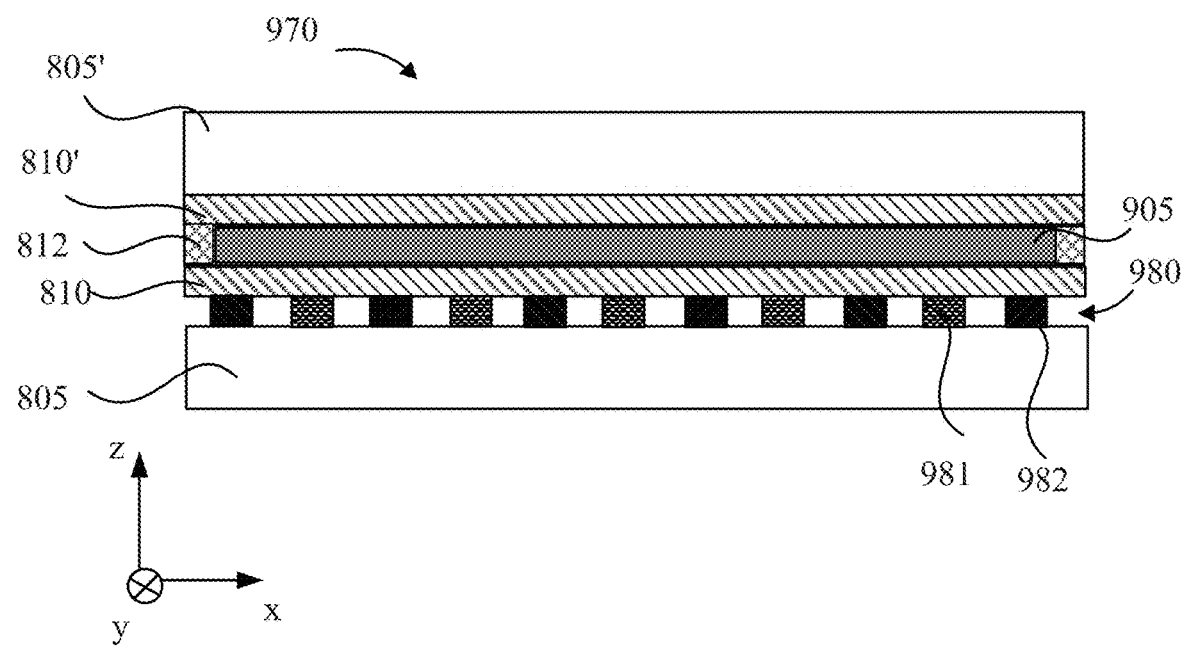
FIG. 9D schematically illustrates processes for fabricating an LCPH element and a fabricated LCPH element, according to an embodiment of the present disclosure.

In some embodiments, as shown in FIG. 9D, two substates 805 and 805' may be assembled to form an LC cell 970. One substrate 805' (e.g., an upper substrate) may not be provided with a conductive electrode layer, while the other substrate 805 (e.g., a lower substrate) may be provide with a conductive electrode layer 980. The conductive electrode layer 980 may include interdigitated electrodes, which may include two individually addressable comb-like microelectrode arrays 981 and 982. After the LC cell 960 is filled with active LCs to form the active LC layer 905, an active LCPH element 975 may be obtained. A voltage may be applied between the microelectrode arrays 981 and 982 disposed at the same side of the active LC layer 905 to generate a horizontal electric field to reorient the LC molecules in the active LC layer 905, thereby switching the optical properties of the fabricated active LCPH element 975.

Referring back to FIGS. 9A-9D, in some embodiments, the recording medium layer(s) may not be optically patterned before the LC cell is assembled. Instead, the recording medium layer(s) may be optically patterned after the LC cell is assembled. For example, two substrates 805 and 805' may be assembled to form an LC cell. At least one of the two substrates 805 and 805' may be provided with one or more conductive electrode layers and a recording medium layer (that has not been optically patterned yet). Then the LC cell may be exposed to a polarization interference pattern, which may be similar to that shown in FIG. 8B. Accordingly, the recording medium layer disposed at the substrate may be optically patterned to provide an alignment pattern. After the LC cell is filled with active LCs and sealed, an active LCPH element may be obtained.

Figure 10A:
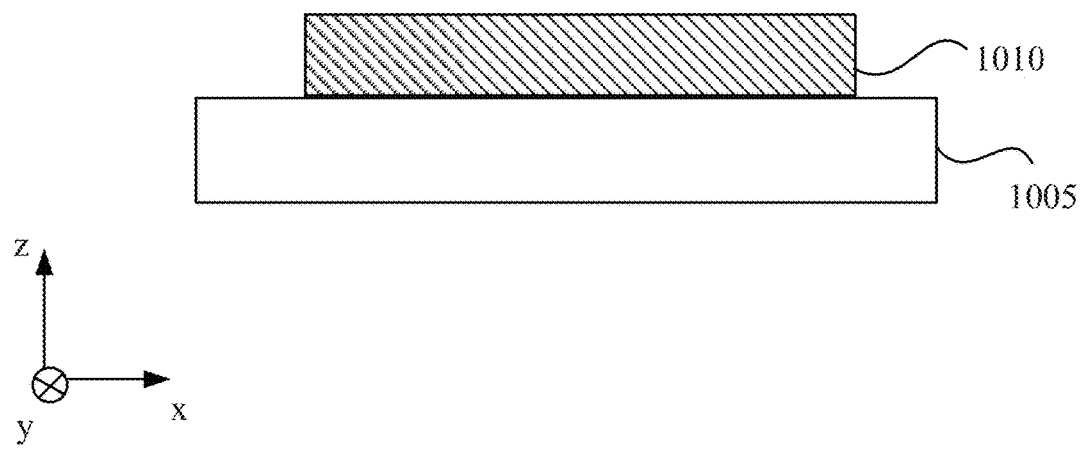
FIGS. 10A and 10B schematically illustrate processes for fabricating an LCPH element, according to an embodiment of the present disclosure.
Figure 10B:
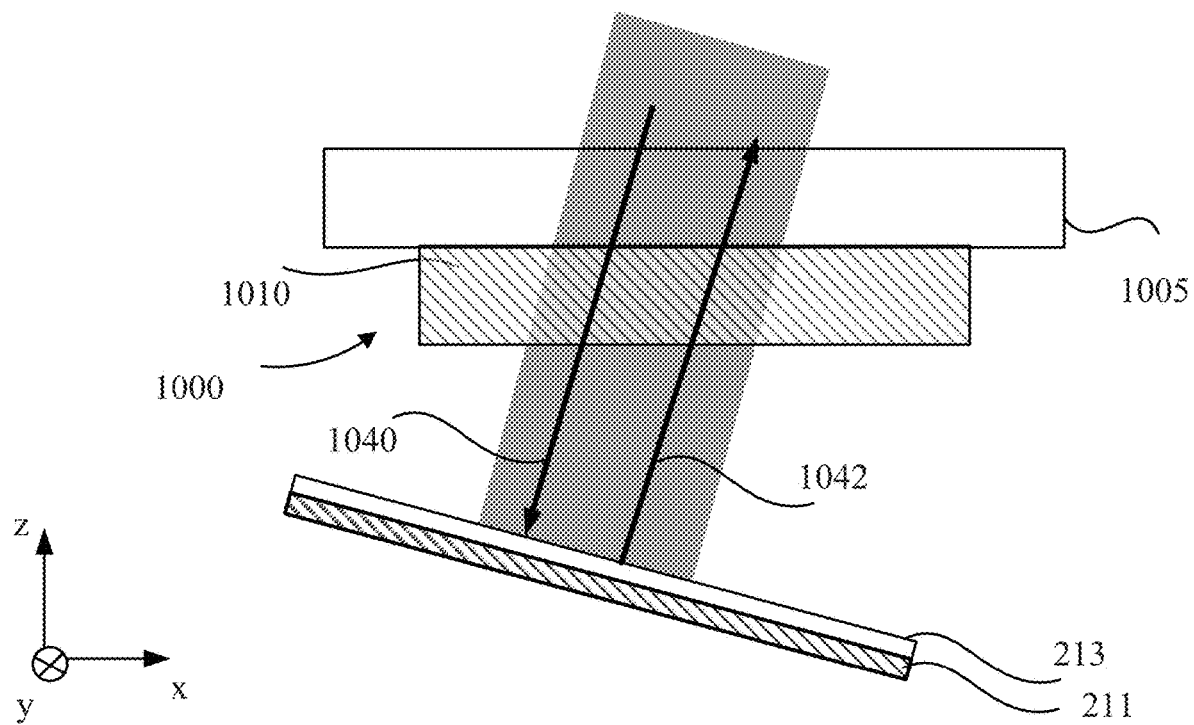

FIGS. 10A and 10B schematically illustrate processes for fabricating an LCPH element through one or more embodiments of the disclosed systems, such as the system 230 shown in FIG. 2B, the system 250 shown in FIG. 2C, the system 300 shown in FIG. 3A, the system 330 shown in FIG. 3B, the system 400 shown in FIG. 4A, the system 430 shown in FIG. 4B, the system 500 shown in FIG. 5A, the system 530 shown in FIG. 5B, or the system 600 shown in FIG. 6. The fabrication process shown in FIGS. 10A and 10B may include holographic recording and bulk-mediated photo-alignment (also referred to as volume recording). The fabrication processes shown in FIGS. 10A and 10B may include steps similar to those shown in FIGS. 8A and 8B. The LCPH element fabricated based on the processes shown in FIGS. 10A and 10B may include elements similar to the LCPH element fabricated based on the processes shown in FIGS. 4A and 4B. Descriptions of the similar steps and similar elements, structures, or functions can refer to the descriptions rendered above in connection with FIGS. 4A and 4B. The LCPH element fabricated based on the fabrication processes shown in FIGS. 10A and 10B may be a passive LCPH element, such as a transmissive PVH element having out-of-plane orientations shown in FIG. 1G. Although the substrate and layers are shown as having flat surfaces, in some embodiments, the substrate and layers formed thereon may have curved surfaces.

Similar to the embodiment shown in FIGS. 8A and 8B, the processes shown in FIGS. 10A and 10B may include dispensing (e.g., coating, depositing, etc.) a recording medium on a surface (e.g., a top surface) of a substrate 1005 to form a recording medium layer 1010. The recording medium may be a polarization sensitive recording medium. The recording medium may include an optically recordable and polarization sensitive material (e.g., a photo-alignment material) configured to have a photoinduced optical anisotropy when exposed to a polarized light irradiation. Molecules (or fragments) and/or photo-products of the optically recordable and polarization sensitive material may generate anisotropic angular distributions in a film plane of a layer of the recording medium under a polarized light irradiation. In some embodiments, the recording medium may include or be mixed with other ingredients, such as a solvent in which the optically recordable and polarization sensitive materials may be dissolved to form a solution, and photo-sensitizers. The solution may be dispensed on the substrate 1005 using a suitable process, e.g., spin coating, slot coating, blade coating, spray coating, or jet (ink-jet) coating or printing. The solvent may be removed from the coated solution using a suitable process, e.g., drying, or heating, leaving the recording medium on the substrate 1005.

After the recording medium layer 1010 is formed on the substrate 1005, as shown in FIG. 10B, the recording medium layer 1010 may be exposed to a polarization interference pattern generated based on two recording beams 1040 and 1042. The two recording beams 1040 and 1042 may be two coherent circularly polarized beams the same handedness and substantially matching wavefronts. For discussion purposes, the two recording beams 1040 and 1042 may represent, respectively, the beam S201 and the beam S207 shown in FIG. 2B or FIG. 2C. The recording medium layer 1010 may be optically patterned when exposed to the polarization interference pattern generated based on the two recording beams 1040 and 1042 during the polarization interference exposure process. An orientation pattern of an optic axis of the recording medium layer 1010 in an exposed region may be defined by the polarization interference pattern. The Bragg period in the pattered recording medium layer 1010 may be determined by the recording wavelength $\lambda_0$ and the refractive index of the recording medium layer 1010 (or recording medium). In some embodiments, the Bragg period in the pattered recording medium layer 1010 may be proportional to the recording wavelength $\lambda_0$, and inversely proportional to the refractive index of the recording medium layer 1010 (or recording medium).

In the embodiment shown in FIGS. 10A and 10B, the recording medium may include a photo-sensitive polymer. Molecules of the photo-sensitive polymer may include one or more polarization sensitive photo-reactive groups embedded in a main polymer chain or a side polymer chain. During the polarization interference exposure process of the recording medium layer 1010, a photo-alignment of the polarization sensitive photo-reactive groups may occur within (or in, inside) a volume of the recording medium layer 1010. That is, a 3D polarization field generated by the interface of the two recording beams 1040 and 1042 may be directly recorded within (or in, inside) the volume of the recording medium layer 1010. Such an alignment procedure shown in FIG. 10B may be referred to as a bulk-mediated photo-alignment. The recording medium layer 1010 for a bulk-mediated photo-alignment shown in FIG. 10B may be relatively thicker than the recording medium layer 810 for a surface-mediated photo-alignment shown in FIGS. 8A-8D. The recording medium included in the recording medium layer 1010 for a bulk-mediated photo-alignment shown in FIG. 10B may also be referred to as a volume recording medium or bulk PAM.

In the embodiment shown in FIGS. 10A and 10B, an in-plane orientation pattern of the optic axis may be directly recorded in the recording medium layer 1010 via the bulk-mediated photo-alignment in an exposed region. A step of disposing an additional birefringent medium layer on the patterned recording medium layer 1010 may be omitted. The patterned recording medium layer 1010 may function as an LCPH element 1000. In some embodiments, multiple in-plane orientation patterns of the optic axis may be recorded in different regions of the recording medium layer 1010 through multiple polarization interference exposure processes.

In some embodiments, the photo-sensitive polymer included in the recording medium layer 1010 may include an amorphous polymer, an LC polymer, etc. The molecules of the photo-sensitive polymer may include one or more polarization sensitive photo-reactive groups embedded in a main polymer chain or a side polymer chain. In some embodiments, the polarization sensitive photo-reactive group may include an azobenzene group, a cinnamate group, or a coumarin group, etc. In some embodiments, the photo-sensitive polymer may be an amorphous polymer, which may be initially optically isotropic prior to undergoing the polarization interference exposure process, and may exhibit an induced (e.g., photo-induced) optical anisotropy after being subjected to the polarization interference exposure process. In some embodiments, the photo-sensitive polymer may be an LC polymer, in which the birefringence and in-plane orientation pattern may be recorded due to an effect of photo-induced optical anisotropy. In some embodiments, the photo-sensitive polymer may be an LC polymer with a polarization sensitive cinnamate group embedded in a side polymer chain.

In some embodiments, when the recording medium layer 1010 includes an LC polymer, the patterned recording medium layer 1010 may be heat treated (e.g., annealed) in a temperature range corresponding to a liquid crystalline state of the LC polymer to enhance the photo-induced optical anisotropy of the LC polymer (not shown in FIG. 10B).

The substrate 1005 may be similar to the substrate 805 shown in FIGS. 8A-8D. In some embodiments, the substrate 1005 may be used to fabricate, store, or transport the LCPH element 1000. In some embodiments, the substrate 1005 may be detachable or removable from the LCPH element 1000 after the LCPH element 1000 is fabricated or transported to another place or device. That is, the substrate 1005 may be used in fabrication, transportation, and/or storage to support the LCPH element 1000 provided on the substrate 1005, and may be separated or removed from the LCPH element 1000 when the fabrication of the LCPH element 1000 is completed, or when the LCPH element 1000 is to be implemented in an optical device. In some embodiments, the substrate 1005 may not be separated from the LCPH element 1000.

The LCPH elements fabricated based on the disclosed processes and systems may have numerous applications in a large variety of fields, e.g., near-eye displays ("NEDs"), head-up displays ("HUDs"), head-mounted displays ("HMDs"), smart phones, laptops, televisions, vehicles, etc. For example, the LCPH elements fabricated based on the disclosed processes and systems may be implemented in various systems for augmented reality ("AR"), virtual reality ("VR"), and/or mixed reality ("MR") applications, to address accommodation-vergence conflict, to enable thin and highly efficient eye-tracking and depth sensing in space constrained optical systems, to extend the detecting range of sensors, to increase detecting resolution or accuracy of sensors, to develop optical combiners for image formation, to correct chromatic aberrations for image resolution enhancement of refractive optical elements in compact optical systems, and to improve the efficiency and reducing the size of optical systems.

Figure 11A:
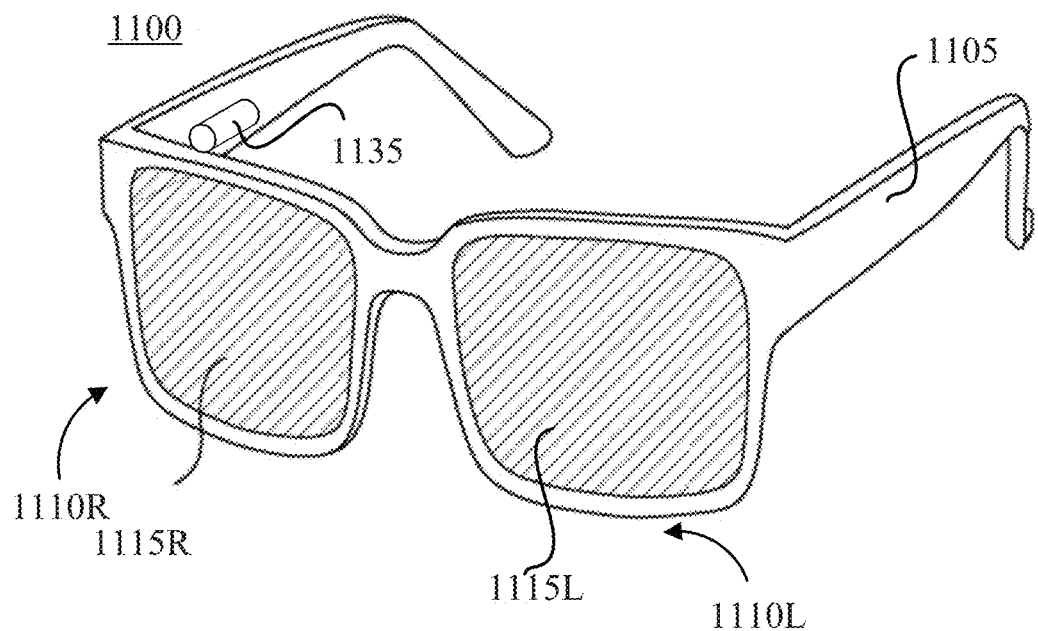
FIG. 11A illustrates a schematic diagram of a near-eye display ("NED"), according to an embodiment of the present disclosure.
Figure 11B:
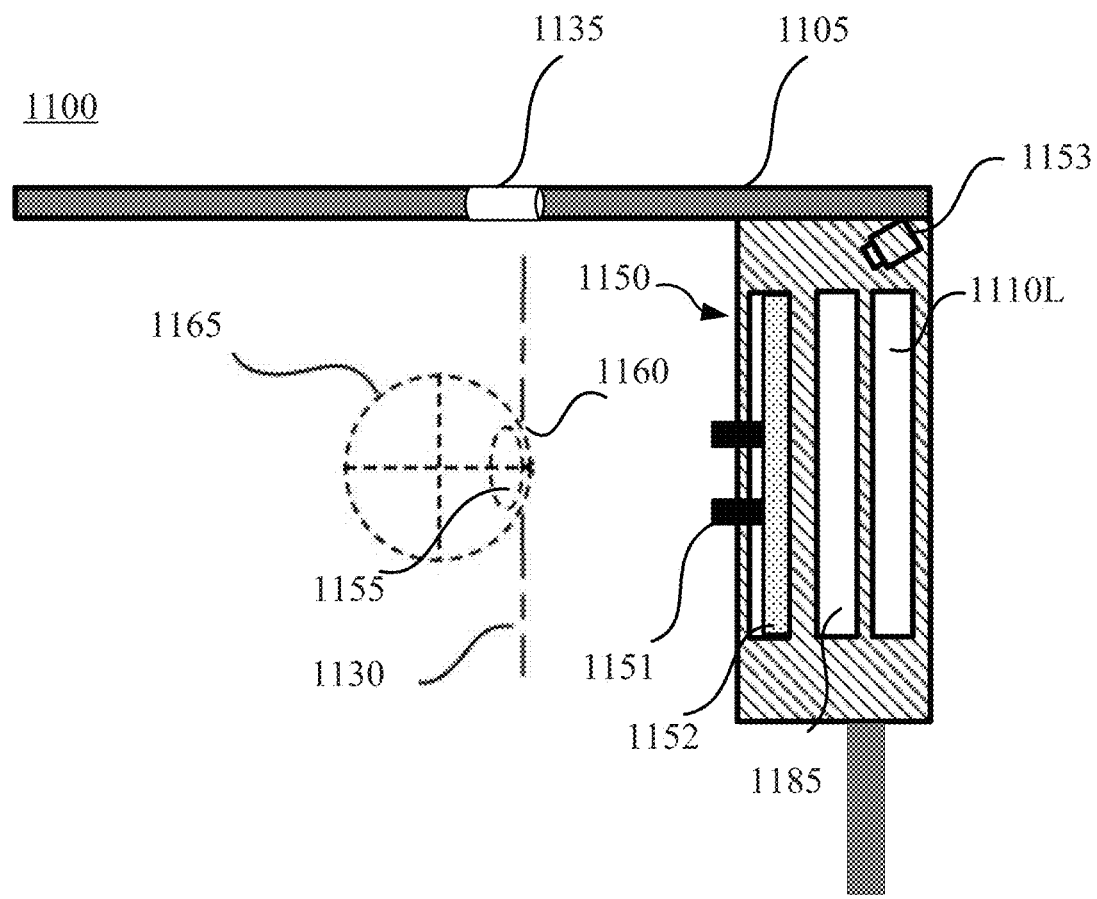
FIG. 11B illustrates a schematic cross sectional view of half of the NED shown in FIG. 11A, according to an embodiment of the present disclosure.

FIG. 11A illustrates a schematic diagram of a near-eye display ("NED") 1100 according to an embodiment of the disclosure. FIG. 11B is a cross-sectional view of half of the NED 1100 shown in FIG. 11A according to an embodiment of the disclosure. For purposes of illustration, FIG. 11B shows the cross-sectional view associated with a left-eye display system 1110L. The NED 1100 may include a controller (e.g., the controller 217), which is not shown in FIG. 11A or 11B. The NED 1100 may include a frame 1105 configured to mount to a user's head. The frame 1105 is merely an example structure to which various components of the NED 1100 may be mounted. Other suitable fixtures may be used in place of or in combination with the frame 1105. The NED 1100 may include right-eye and left-eye display systems 1110R and 1110L mounted to the frame 1105. The NED 1100 may function as a VR device, an AR device, an MR device, or any combination thereof. In some embodiments, when the NED 1100 functions as an AR or an MR device, the right-eye and left-eye display systems 1110R and 1110L may be entirely or partially transparent from the perspective of the user, which may provide the user with a view of a surrounding real-world environment. In some embodiments, when the NED 1100 functions as a VR device, the right-eye and left-eye display systems 1110R and 1110L may be opaque, such that the user may be immersed in the VR imagery based on computer-generated images.

The right-eye and left-eye display systems 1110R and 1110L may include image display components configured to project computer-generated virtual images into left and right display windows 1115L and 1115R in a field of view ("FOV"). The right-eye and left-eye display systems 1110R and 1110L may be any suitable display systems. For illustrative purposes, FIG. 11A shows that the right-eye and left-eye display systems 1110R and 1110L may include a projector 1135 coupled to the frame 1105. The projector 1135 may generate an image light representing a virtual image. In some embodiments, the right-eye and left-eye display systems 1110R and 1110L may include one or more LCPH elements fabricated based on the disclosed processes and systems. As shown in FIG. 11B, the NED 1100 may also include a lens system (or viewing optical system) 1185 and an object tracking system 1150 (e.g., eye tracking system and/or face tracking system). The lens system 1185 may be disposed between the object tracking system 1150 and the left-eye display system 1110L. The lens system 1185 may be configured to guide the image light output from the left-eye display system 1110L to an exit pupil 1160. The exit pupil 1160 may be a location where an eye pupil 1155 of an eye 1165 of the user is positioned in an eye-box region 1130 of the left-eye display system 1110L. In some embodiments, the lens system 1185 may be configured to correct aberrations in the image light output from the left-eye display system 1110L, magnify the image light output from the left-eye display system 1110L, or perform another type of optical adjustment to the image light output from the left-eye display system 1110L. The lens system 1185 may include multiple optical elements, such as lenses, waveplates, reflectors, etc. In some embodiments, the lens system 1185 may include a pancake lens configured to fold the optical path, thereby reducing the back focal distance in the NED 1100. In some embodiments, the lens system 1185 may include one or more LCPH elements fabricated based on the disclosed processes and systems. The object tracking system 1150 may include an IR light source 1151 configured to illuminate the eye 1165 and/or the face, a deflecting element 1152 configured to deflect the IR light reflected by the eye 1165, and an optical sensor 1153 configured to receive the IR light deflected by the deflecting element 1152 and generate a tracking signal. In some embodiments, the object tracking system 1150 may include one or more LCPH elements fabricated based on the disclosed processes and systems.

The present disclosure also provides methods for fabricating LCPH elements. The methods may be performed by one or more components included in the disclosed systems. FIG. 12 illustrates a flowchart showing a method 1200 for fabricating an LCPH element, according to an embodiment of the present disclosure. As shown in FIG. 12, the method 1200 may include directing a first beam to propagate through a beam interference zone toward a reflective assembly, wherein the first beam propagates toward the beam interference zone from a first side of the beam interference zone (Step 1210). In some embodiments, directing the first beam to propagate through the beam interference zone may include directing the first beam output from a light outputting element to propagate through the beam interference zone.

The method 1200 may also include reflecting, by the reflective assembly, the first beam back toward the beam interference zone as a second beam, wherein the second beam propagates toward the beam interference zone from a second side of the beam interference zone, and wherein the first beam and the second beam interfere with one another within the beam interference zone to generate a polarization interference pattern (Step 1220). In some embodiments, the first side and the second side may be opposite sides of the beam interference zone. In some embodiments, the wavefronts of the first beam and the second beam may be substantially the same. In some embodiments, the first beam and the second beam may be polarized beams having the same handedness. For example, the first beam or the second beam may be a circularly polarized beam or an elliptically polarized beam.

In some embodiments, the reflective assembly may include a reflector. In some embodiments, reflecting, by the reflective assembly, the first beam back toward the beam interference zone as the second beam may include reflecting, by the reflector included in the reflective assembly, the first beam as the second beam back toward the lens assembly. The second beam and the first beam may be polarized beam having the same handedness. In some embodiments, the reflective assembly may also include a waveplate disposed between the beam interference zone and the reflector. In some embodiments, reflecting, by the reflective assembly, the first beam back toward the beam interference zone as the second beam may include: converting, by the waveplate, the first beam to a first linearly polarized beam propagating toward the reflector; reflecting, by the reflector, the first linearly polarized beam as a second linearly polarized beam back to the waveplate; and converting, by the waveplate, the second linearly polarized beam to the second beam propagating toward the beam interference zone. The first linearly polarized beam and the second linearly polarized beam may have orthogonal polarizations with the same handedness.

In some embodiments, the first beam and the second beam may be collimated beams having a planar wavefront. In some embodiments, first beam may be substantially normally incident onto the recording medium layer. In some embodiments, the first beam may be obliquely incident onto the recording medium layer. In some embodiments, at least one of the first beam or the second beam may have a non-planar wavefront, such as a spherical wavefront, an aspherical wavefront, a cylindrical wavefront, or a freeform wavefront, etc. In some embodiments, both of the first beam and the second beam may have non-planar wavefronts. In some embodiments, the method may further include directing the first beam to propagate through a lens assembly toward the reflective assembly. In some embodiments, the lens assembly may be a converging lens assembly. The method may include converging, by the lens assembly, the first beam to have a first non-planar wavefront while transmitting the first beam. In some embodiments, the lens assembly may be a diverging lens assembly. The method may include diverging, by the lens assembly, the first beam to have a first non-planar wavefront while transmitting the first beam. In some embodiments, the lens assembly may be a freeform assembly. The method may include transmitting, by the lens assembly, the first beam to have a first non-planar wavefront.

In some embodiments, the method may include additional steps that are not shown in FIG. 12. In some embodiments, the method may include directing the first beam and the second beam toward different surfaces of a recording medium layer from different sides of the recording medium layer. The recording medium layer may be disposed within the beam interference zone. In some embodiments, the first beam may have a wavelength within an absorption band of the recoding medium layer. Thus, the recording medium layer may be exposed to the polarization interference pattern. During the exposure process, the polarization interference pattern may be recorded at (e.g., in or on) the recording medium layer to define an orientation pattern of an optic axis of the recording medium layer. For example, the orientation pattern of the optic axis of the recording medium layer may correspond to a grating pattern, or a lens pattern, etc.

In some embodiments, the recording medium layer may include a bulk photo-alignment material ("PAM") for volume recording. The bulk photo-alignment material may include a photo-sensitive polymer (or photo-polymer), e.g., an amorphous polymer, an LC polymer, etc. In some embodiments, after being exposed to the polarization interference pattern, the recording medium layer (also referred to as "exposed recording medium layer") may function as an LCPH element, such as a transmissive PVH element, etc. In some embodiments, the method may also include annealing the exposed recording medium layer in a predetermined temperature range. For example, when the recording medium layer includes an LC polymer, the predetermined temperature range may correspond to a liquid crystalline state of the LC polymer.

In some embodiments, the recording medium layer may include a surface photo-PAM for surface recording. The exposed recording medium layer may function as a surface alignment layer. The method may also include forming a birefringent medium layer on the recording medium layer. In some embodiments, the birefringent medium layer may include a birefringent medium with or without a chirality. For example, the birefringent medium layer may include at least one of LCs or RMs with or without a chirality. In some embodiments, the exposed recording medium layer may be annealed in a predetermined temperature range corresponding to a nematic phase of the LCs or RMs. In some embodiments, the method may also include polymerizing the birefringent medium layer. In some embodiments, the polymerized birefringent medium layer may function as a passive LCPH element, such as a passive PBP element, a passive PVH element (e.g., reflective PVH element), etc.

In some embodiments, the method may include recording a plurality of polarization interference patterns at (e.g., in or on) a plurality of regions or portions in the recording medium layer. The plurality of polarization interference patterns may be the same or different. For example, the recoding medium layer may be disposed on a substrate, which may be mounted on a movable stage. The movable stage may be configured to be movable to adjust at least one of a position or an orientation of the substrate (and hence the recoding medium layer), such that different portions of the recording medium layer may be positioned under an exposure of the polarization interference pattern, and the same polarization interference pattern or different polarization interference patterns may be recorded at the different portions of the recording medium layer. In some embodiments, the method may include, recording a first polarization interference pattern (defining a first grating pattern with a first pitch) at a first region or portion of the recording medium layer, with a first rotation angle ("a" as shown in FIG. 2C) of the recording medium layer; adjusting, by the movable stage, the rotation angle of the recording medium layer from the first rotation angle to a second, different rotation angle; and recording, a second polarization interference pattern (defining a second grating pattern with a second pitch) at a second region or portion of the recording medium layer.

In some embodiments, the method may include recording a first polarization interference pattern (defining a first lens pattern) at a first region or portion of the recording medium layer, with a first distance ("d" as shown in FIG. 3A, 3B, 4A, 4B, 5A, or 5B) between the recording medium layer and a focal plane (e.g., real focal plane or virtual focal plane) of the lens assembly; adjusting the distance between the recording medium layer and the focal plane of the lens assembly from the first distance to a second, different distance; and recording a second polarization interference pattern (defining a second lens pattern) at a second region or portion of the recording medium layer. In some embodiments, before adjusting the distance between the recording medium layer and the focal plane of the lens assembly from the first distance to a second, different distance, the method may further include replacing a first lens included in the lens assembly by a second, different lens. In some embodiments, before adjusting the distance between the recording medium layer and the focal plane of the lens assembly from the first distance to a second, different distance, the method may further include adjusting an optical power of the lens assembly from a first optical power, to a second, different optical power. In some embodiments, before adjusting the distance between the recording medium layer and the focal plane of the lens assembly from the first distance to a second, different distance, the method may further include adjusting an operation state of a transmissive SLM included in the lens assembly from a first operation state, to a second, different operation state.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A system, comprising:
a light outputting element configured to output a first beam propagating toward a beam interference zone from a first side of the beam interference zone;
a reflective assembly configured to reflect the first beam back as a second beam propagating toward the beam interference zone from a second side of the beam interference zone; and
a lens assembly disposed between the light outputting element and the reflective assembly,
wherein the lens assembly is a diverging lens assembly, and the reflective assembly includes a reflector having a curved reflective surface,
wherein the first beam propagating in a space between the light outputting element and the reflective assembly has a first wavefront,
wherein the second beam propagating in the same space between the light outputting element and the reflective assembly has a second wavefront,
wherein the first wavefront is the same as the second wavefront, and
wherein the first beam and the second beam interfere with one another within the beam interference zone to generate a polarization interference pattern.

2. The system of claim 1, wherein the first beam and the second beam are polarized beams having the same handedness.

3. The system of claim 1, wherein the reflective assembly includes a reflector.

4. The system of claim 3, wherein the reflective assembly also includes a waveplate.

5. The system of claim 1, wherein the lens assembly includes a lens and a substrate, the substrate is configured to support a recording medium layer disposed within the beam interference zone for recording the polarization interference pattern, and the lens is disposed between the substrate and the light outputting element.

6. The system of claim 1, wherein the lens assembly includes a first lens and a second lens, the second lens is configured to support a recording medium layer disposed within the beam interference zone for recording the polarization interference pattern, and the first lens is disposed between the second lens and the light outputting element.

7. The system of claim 1, wherein the lens assembly includes a lens configured to support a recording medium layer for recording the polarization interference pattern.

8. A system, comprising:
a light outputting element configured to output a first beam propagating toward a beam interference zone from a first side of the beam interference zone;
a reflective assembly configured to reflect the first beam back as a second beam propagating toward the beam interference zone from a second side of the beam interference zone; and
a lens assembly disposed between the light outputting element and the reflective assembly,
wherein the lens assembly includes a transmissive spatial light modulator ("SLM"), and the reflective assembly includes a reflective SLM,
wherein the first beam propagating in a space between the light outputting element and the reflective assembly has a first wavefront,
wherein the second beam propagating in the same space between the light outputting element and the reflective assembly has a second wavefront,
wherein the first wavefront is the same as the second wavefront, and
wherein the first beam and the second beam interfere with one another within the beam interference zone to generate a polarization interference pattern.

9. A method, comprising:
directing a first beam to propagate through a beam interference zone toward a reflective assembly, wherein the first beam propagates toward the beam interference zone from a first side of the beam interference zone;
directing the first beam to propagate through a lens assembly toward the reflective assembly, wherein the lens assembly includes a diverging lens assembly or a transmissive spatial light modulator ("SLM"), and the reflective assembly includes a reflector having a curved reflective surface or a reflective SLM; and
reflecting, by the reflective assembly, the first beam back toward the beam interference zone as a second beam, wherein the second beam propagates toward the beam interference zone from a second side of the beam interference zone,
wherein the first beam propagating in a space between a light outputting element and the reflective assembly has a first wavefront,
wherein the second beam propagating in the same space between the light outputting element and the reflective assembly has a second wavefront,
wherein the first wavefront is the same as the second wavefront, and
wherein the first beam and the second beam interfere with one another within the beam interference zone to generate a polarization interference pattern.

10. The method of claim 9, wherein the first beam and the second beam are polarized beams having the same handedness.

11. The method of claim 9, further comprising:
exposing a recording medium layer disposed within the beam interference zone to the polarization interference pattern to record the polarization interference pattern.

12. The method of claim 11, wherein
the recording medium layer includes a surface photo-alignment material, and
the method further comprises forming a birefringent medium layer on the recording medium layer after the polarization interference pattern is recorded in the recording medium layer.

13. The method of claim 11, wherein the recording medium layer includes a bulk photo-alignment material, and exposing the recording medium layer disposed within the beam interference zone to the polarization interference pattern includes recording the polarization interference pattern in the bulk photo-alignment material.

* * * * *